United States Patent [19]

Karsh et al.

[11] Patent Number: 5,226,163
[45] Date of Patent: Jul. 6, 1993

[54] FILE CHARACTERIZATION FOR COMPUTER OPERATING AND FILE MANAGEMENT SYSTEMS

[75] Inventors: Bruce D. Karsh, Los Altos; Robert K. Myers, Santa Cruz, both of Calif.

[73] Assignee: Silicon Graphics, Inc., Mountain View, Calif.

[21] Appl. No.: 389,836

[22] Filed: Aug. 1, 1989

[51] Int. Cl.⁵ .................... G06F 9/45; G06F 15/403
[52] U.S. Cl. ...................... 395/700; 395/155;
395/159; 395/160; 395/600; 364/280;
364/280.4; 364/282.1; 364/283.1; 364/283.3;
364/286
[58] Field of Search ............... 395/600, 700, 155, 159,
395/160; 340/700

[56] References Cited

U.S. PATENT DOCUMENTS 4,813,013 3/1989 Dunn .................................. 364/900

OTHER PUBLICATIONS

Stephen H. Kaisler, *The Design of Operating Systems for Small Computer Systems*, John Wiley & Sons, Inc., 1983, Chapter 6, pp. 424-507.

Primary Examiner—Paul V. Kulik
Attorney, Agent, or Firm—Davis & Schroeder

[57] ABSTRACT

A tool for characterization of files in a computer having an operating and file management system is described. The tool provides consistent definition and design of the functionality and appearance of icons and symbols used with operating environment programs.

22 Claims, 50 Drawing Sheets

FILE CHARACTERIZATION FOR COMPUTER OPERATING AND FILE MANAGEMENT SYSTEMS

BACKGROUND OF THE INVENTION

The present invention relates to computer operating and file management systems, particularly to improvements in tools for such systems which enhance user productivity, system management and availability of such systems to a broader spectrum of user levels of expertise. In the context of this invention a tool, is a compact computer program or routine designed to do a specific task well. Typically, several tools can be linked together to perform more complex tasks.

The present invention may be used with graphical user interfaces for use in computer systems of all types and sizes, including large scale mainframes, workstations and microcomputers, whether or not any of the computers are coupled together in a network. In particular, the present invention provides consistent characterization of system files, and the definition and design of the functionality and appearance of icons and symbols used with operating environment programs.

As more computing power is introduced into microprocessor technology and the cost- and size-per-bit of memory devices decreases, more sophisticated programs can be operated on smaller and more compact computer systems. Thus, stand alone microcomputer systems presently available are beginning to approach the speed and computing power, i.e. instruction through-put, of workstations, which, in turn, are beginning to rival main frame computers in their capacity for processing complex computing operations.

Most computer systems designed for use by sophisticated users require a high level of expertise and long hours of familiarization and setup. Typically, thorough knowledge of complex sets of non-intuitive input/output commands and procedures is required before such users can become productive. If the operating and file management systems are changed very substantially as such systems are improved and enhanced, such users must relearn new commands and techniques before becoming fully productive again. Even experts are hindered by complex mechanics of interfacing with such a system.

Nowadays workstations are often part of, or planned for use in, a network. Networks typically require system administration which in the past has been left to the most expert-level user in view of the complexities associated with management of system resources and users. However, the increasing number of workstation users whose expertise does not include system administration highlights the need to simplify network system administration. In particular, system administration tasks that involve customizing a workstation to a user's needs and preferences can and should be done by the users themselves rather than the system administrator.

Many sophisticated workstation networking systems provide disjoint mechanisms for customizing each work station. These mechanisms usually include modifying some file and following some script or simply issuing a set of commands The scripts and commands normally encrypt a set of non-intuitive options which are focused on completing only one portion of the complete task.

Textual scripts are helpful in getting the job done but lack feedback. Unless the script has good error and detection and correction features, the system manager has no immediate feedback as to whether the process really worked. In the graphical user interface of the present invention, the manager is presented with a view of all of the options and states that disks and file systems can achieve without having to know the difficult commands and procedures to achieve those states.

User acceptance of a PC-like workstation or workstation-like PC is influenced or impacted by the new user's initial impression of how easy or difficult it is to bring the system into productive use. If the system requires the user to learn a set of complex tasks and an array of non-intuitive command lines before he can be productive, he may feel that he is working for the machine rather than that the machine is working for him. Thus, presenting a "view" of the system and how it can be modified to suit the user's needs and preferences is generally regarded as more intuitive and less overwhelming than facing a set of complex input/output commands and procedures.

The popularity of graphical user interfaces, which employ graphic symbols and analog control of cursor movement instead of typewritten entry of commands and cursor keys, has grown very quickly and steadily with the introduction of personal computers for use at home and small businesses by users at all levels of expertise. A visual interface with a computer system helps users feel that their computer is friendlier and, moreover, helps the user work more efficiently and productively with the system.

A user-friendly, interactive, intuitive graphical user interface to powerful computer systems having extensive file and database management systems is advantageous for users at all levels. If such an interface provides an adaptive visual appearance and intuitive flow of information including icons for creating, accessing and manipulating system files, the entry-level (i.e. beginner) user will not be intimidated, the intermediate-level (i.e. average) user broadens his expertise faster, the advanced-level (i.e. expert) user becomes even more productive, and system administration becomes less complex and more efficient.

SUMMARY OF THE INVENTION

A tool constructed according to the principles of the present invention assists the user in managing system files and the actions associated with them by a process called file typing. If used with a graphical user interface, the tool also provides the user with control of the appearance and functionality of file icons.

The present invention is designed for use with powerful, flexible operating systems having the following fundamental characteristics:

1) Substantially, all information is stored in a hierarchy; thus, information may be organized by dividing it into various files and directories, which in turn may have subfiles and subdirectories.

2) Each workstation may support more than one user; thus, the present invention anticipates a multi-user environment.

3) The system may support very sophisticated networking software which allows users to access information on other work stations as easily as if the information was installed on that users work station; if used in a multi-user, networked system the present invention anticipates the need for system administration.

Using the file typing process of the present invention, users can characterize system files, and their associated icons, according to their individual needs and preferences. The user may also determine the functionality of the icons he derives.

Potentially, an unlimited number of possible file types can exist in a system for which the file typing process of the present invention is designed. Such file types include plain text files, formatted documents, directories, shell scripts, images, binary executables and the like. Every type of file is given an associated set of operations, often unique, that a user would most often want to perform with or on such files. The file type declarations and associated rules provide each type of file with potentially unique appearance and behavior customized to the needs and preferences of the user.

As with other systems, icons are used to view file directories, work with existing files and run applications. In addition, icons may be newly created, copied, renamed, removed, printed, transferred or rearranged. Finally, icons may be used for printing the files generated using applications and transferring files to the work-stations or various storage media such as tape. Thus, the tool of the present invention allows the user to use a mouse input device, cursor icons and pop-up menus to interact with the computer system to access sets of files and directories, set personal preferences for how the files and directories should be displayed, launch applications, use basic utility programs and organize files and directories.

The present invention is implemented under the UNIX system. UNIX is highly regarded by experts in computer science as a simple, elegant operating and file management system for use on computers having different processing power, ranging from microprocessors to mainframes, and providing a common execution environment across all of them. The system originally developed and introduced by Bell Telephone Laboratories in 1969, has become increasingly widespread. Different versions of it are supported on the equipment of several different computer system manufacturers. Details of the UNIX system are given in the references listed below which are incorporated by reference as if fully set forth herein.

Bach, M. J., "The Design of the UNIX Operating System," Prentice-Hall Software Series, Englewood Cliffs, N.J., 1986.

Bourne, S. R., "The UNIX Shell," The Bell System Technical Journal, July-August 1978, Vol. 57, No. 6, Part 2, pp. 1971-1990.

Kernighan, B. W., and R. Pike, "The UNIX Programming Environment," Prentice-Hall, Englewood Cliffs, N.J. 1984.

The version of the UNIX system for which the preferred embodiment of the present invention is implemented is called "IRIX", developed and introduced by Silicon Graphics, Inc. IRIX is described in "The IRIX Programmer's Reference Manual," Vols. I, II, III; "The IRIX System Adminstrator's Reference Manual"; The IRIX User's Reference Manual," Vols. I, II; "IRIS-4D Programmers Guide," Vols. I, II; "IRIS-4D System Administrator's Guide"; and "IRIS-4D User's Guide", which are also incorporated by reference as if fully set forth herein.

DESCRIPTION OF THE PREFERRED EMBODIMENT

Figure 1:
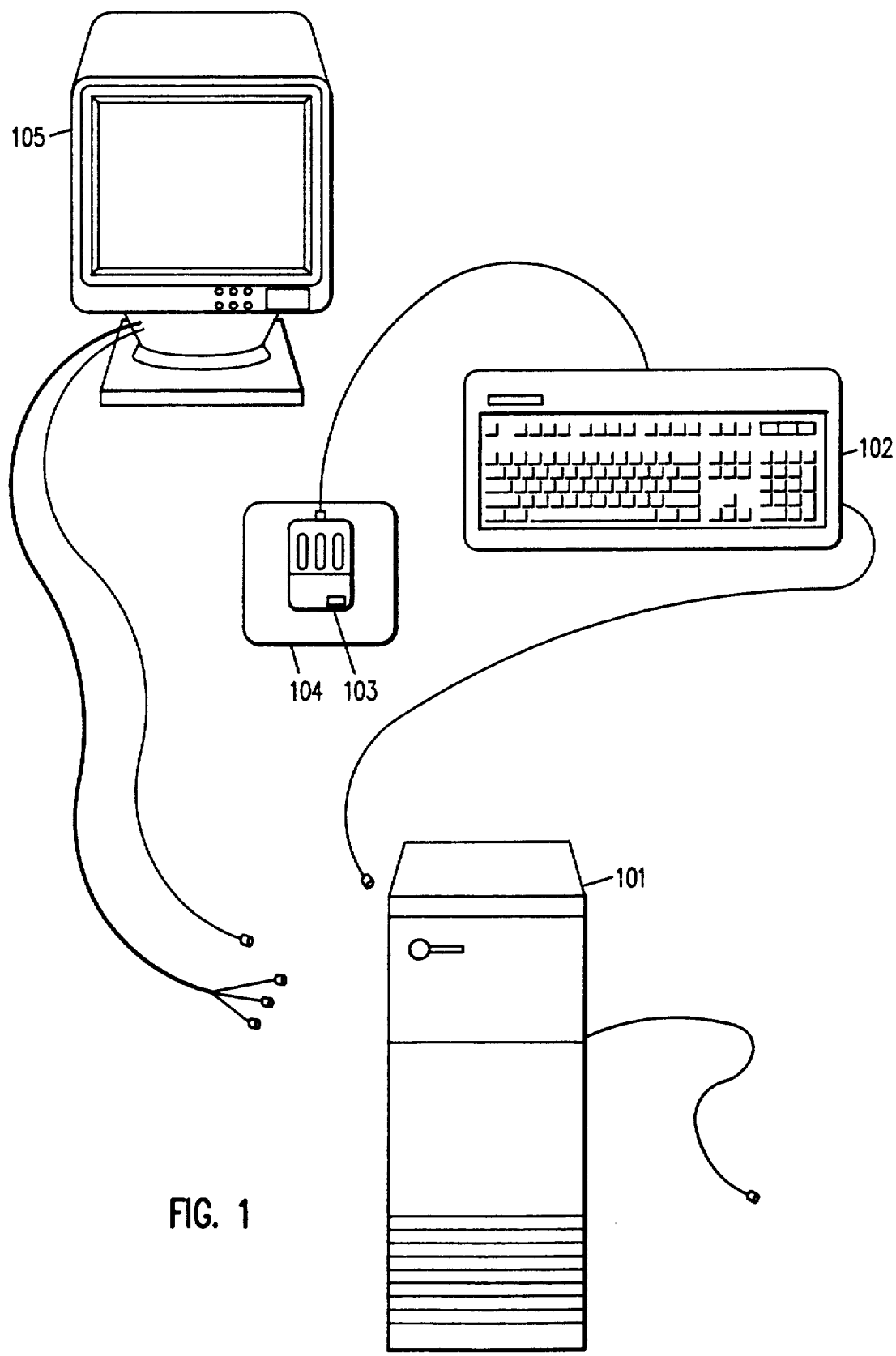
FIG. 1 is a system block diagram of a computer system for use with a file typing process constructed according to the principles of the present invention.
Figure 2:
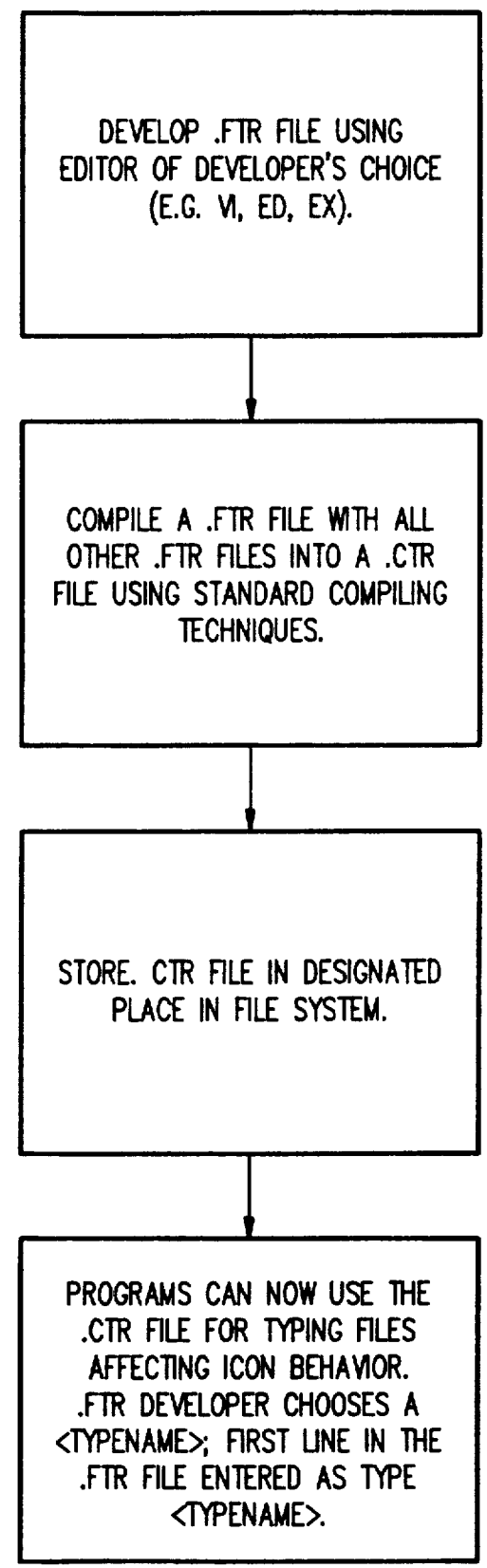
FIG. 2 is a summary flow diagram for development of a compiled file of file typing rules according to the principles of the present invention.
Figure 3A:
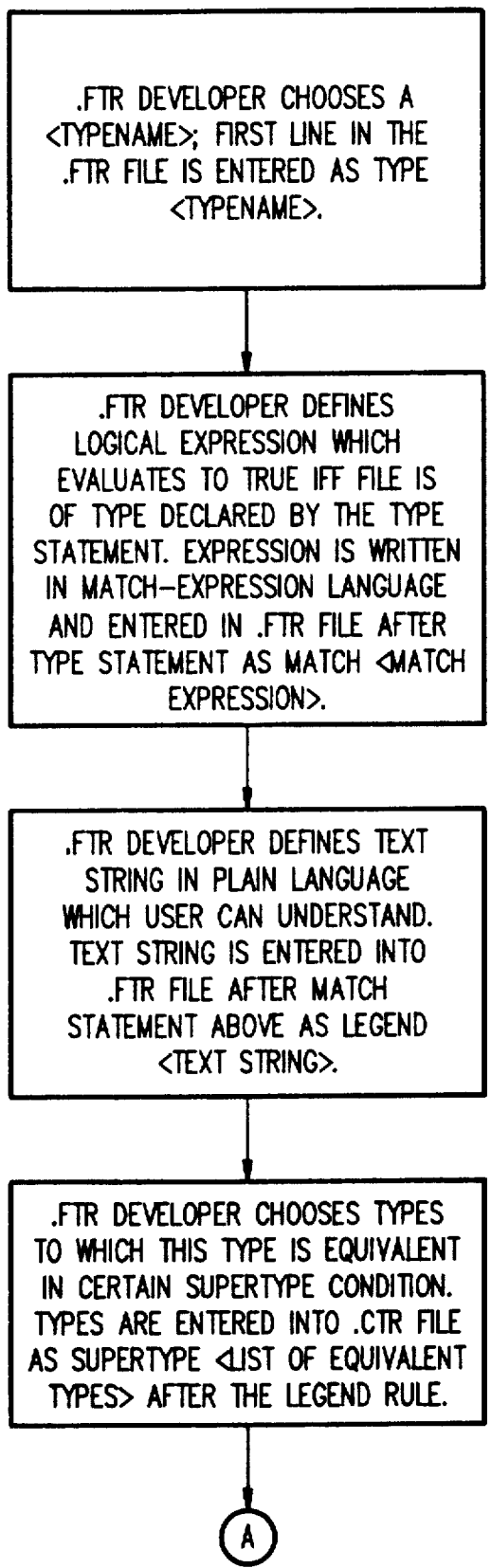
FIGS. 3A-3C, inclusive, is a summary flow diagram for deriving file typing rules according to the principles of the present invention.
Figure 3B:
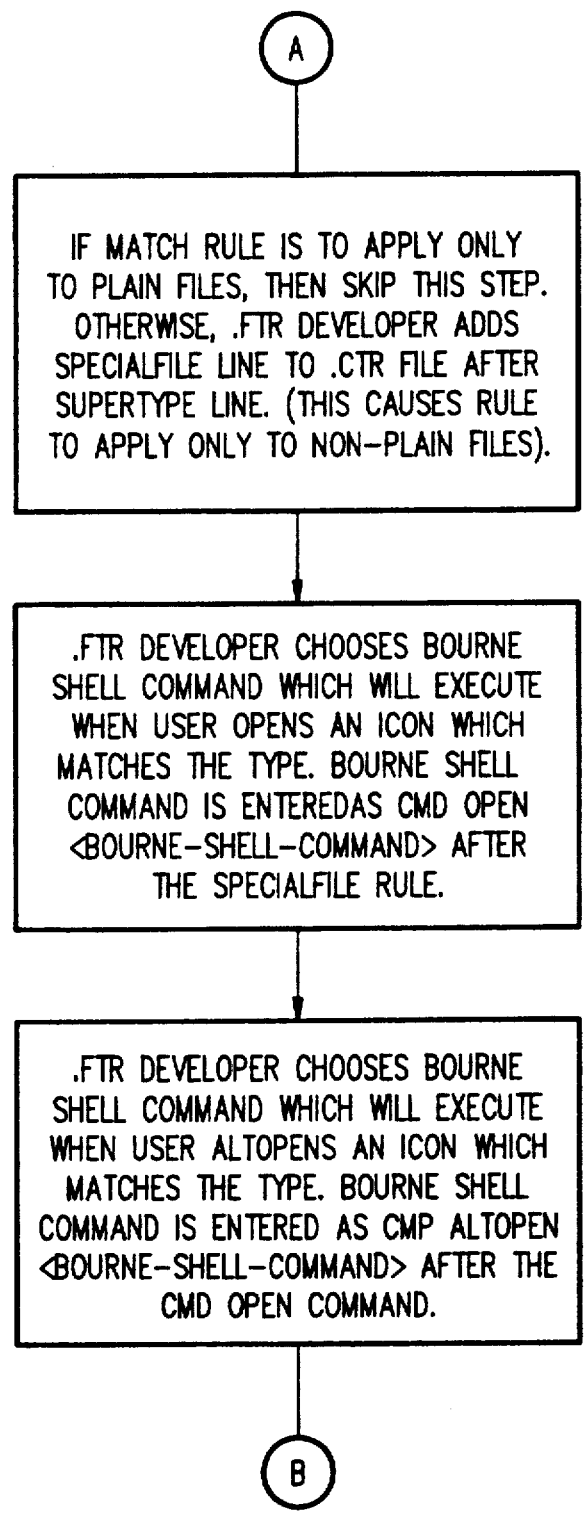
Figure 3C:
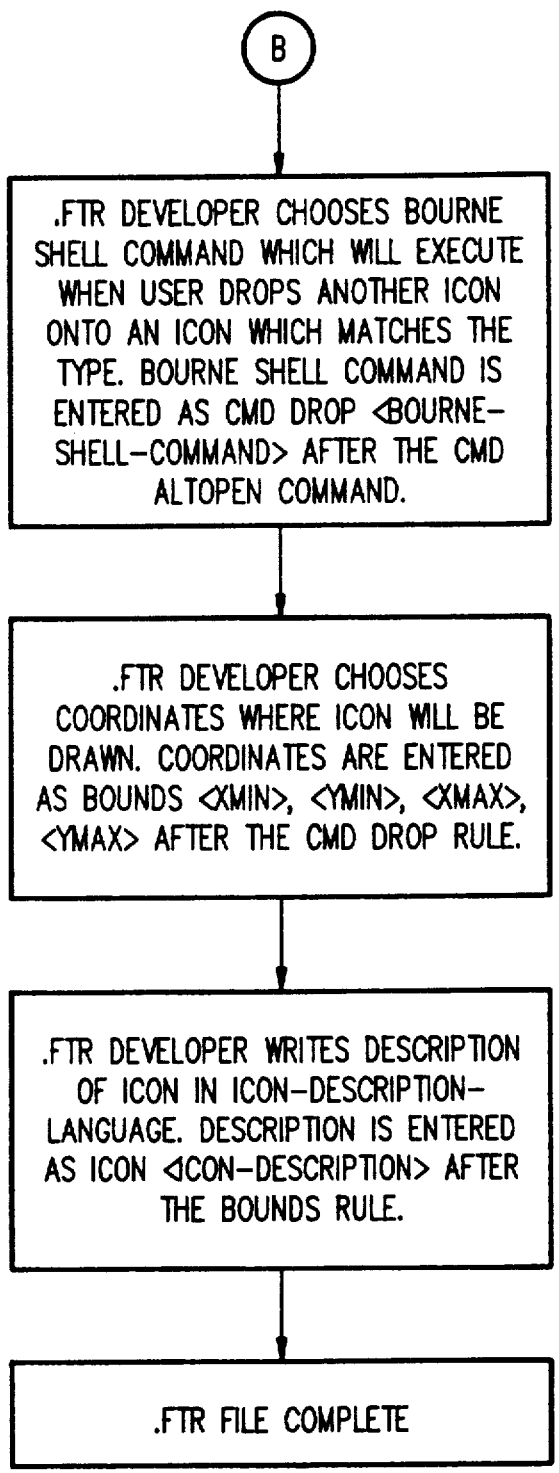
Figure 4A:
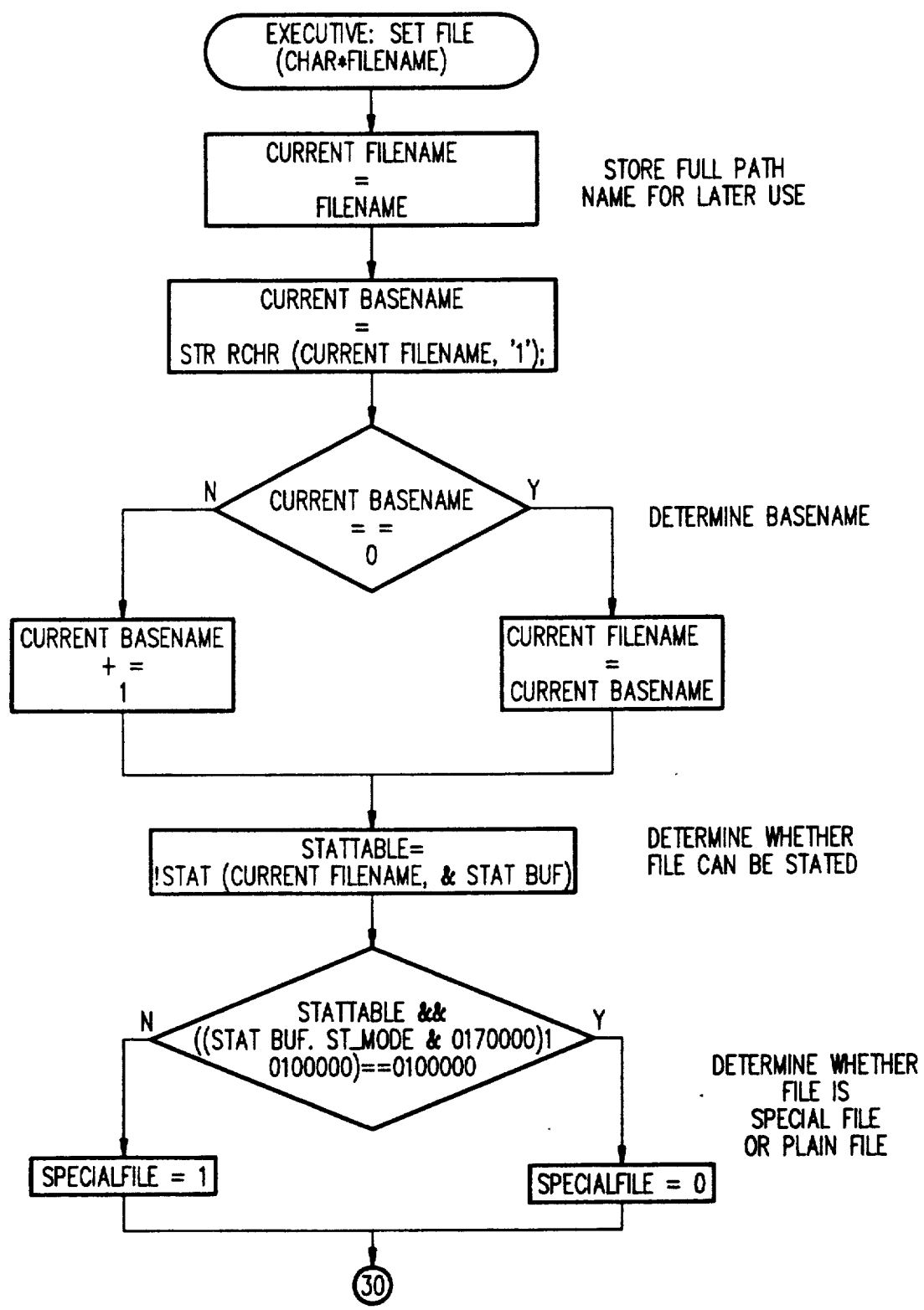
FIGS. 4A-4B, inclusive, is a flow diagram of the executive program for typing a file according to the file typing process of the present invention.
Figure 4B:
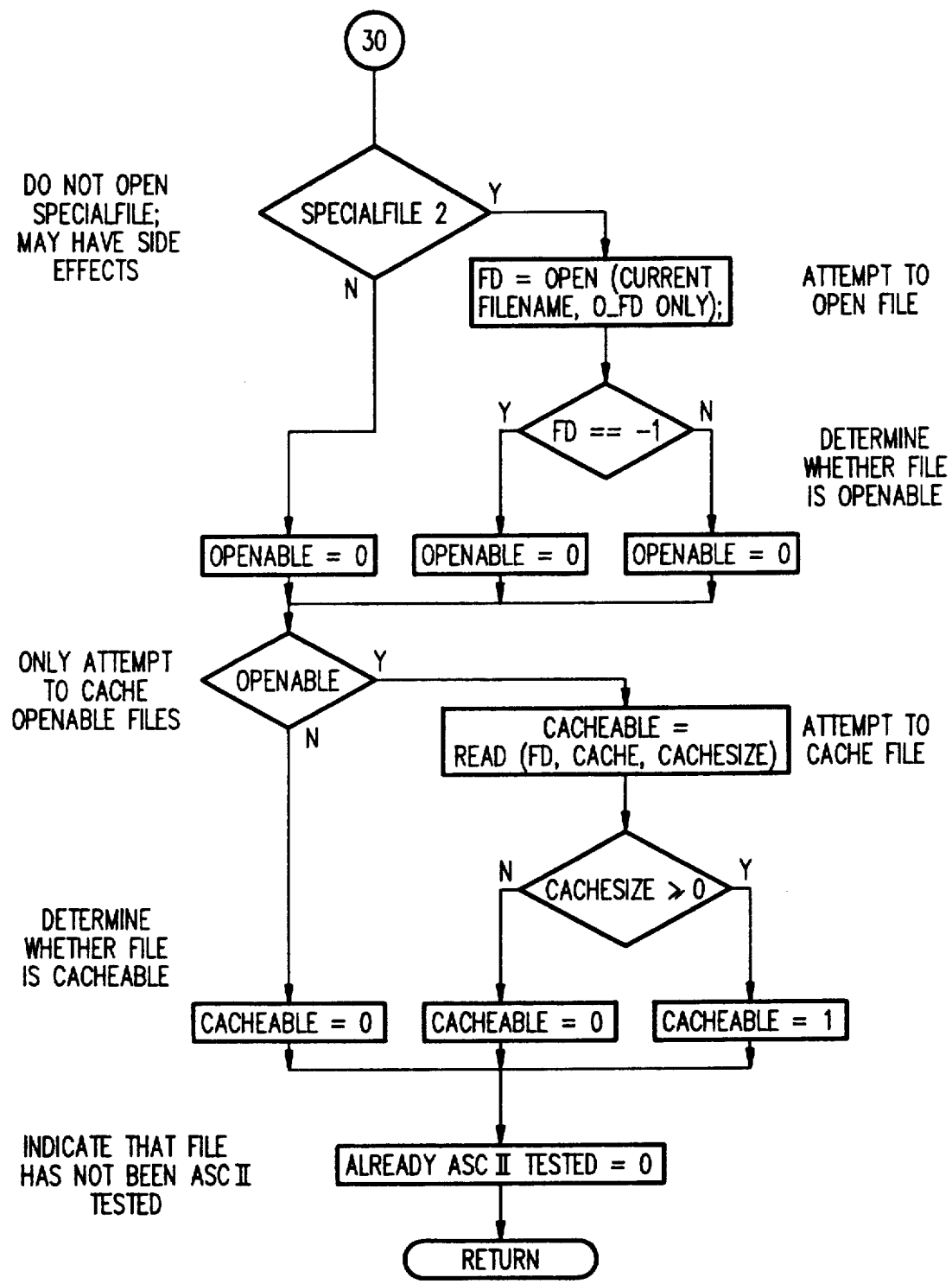
Figure 5:
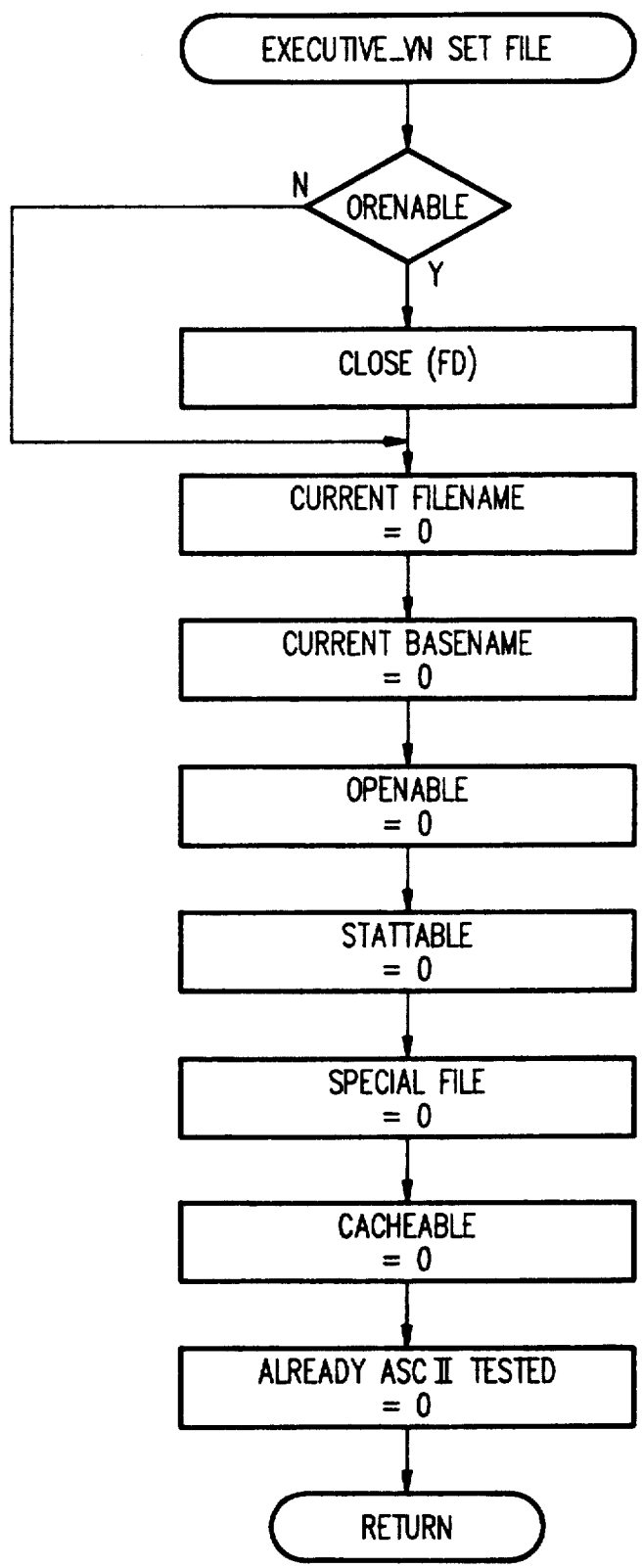
FIG. 5 is a flow diagram of the executive program for closing a file according to the file typing process of the present invention.
Figure 6A:
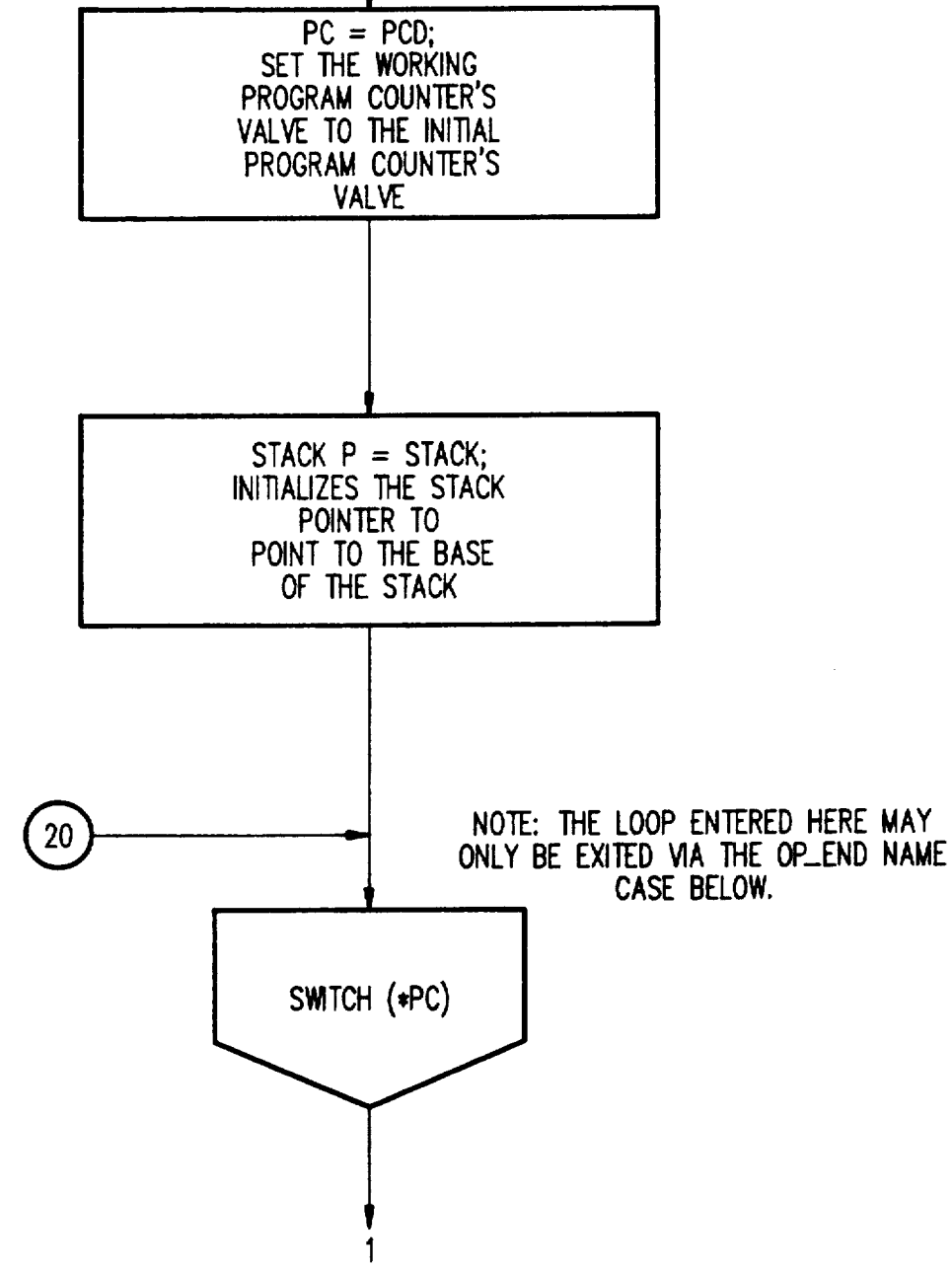
FIGS. 6A-6S, inclusive, is a detailed flow diagram of the file typing process of the present invention.
Figure 6B:
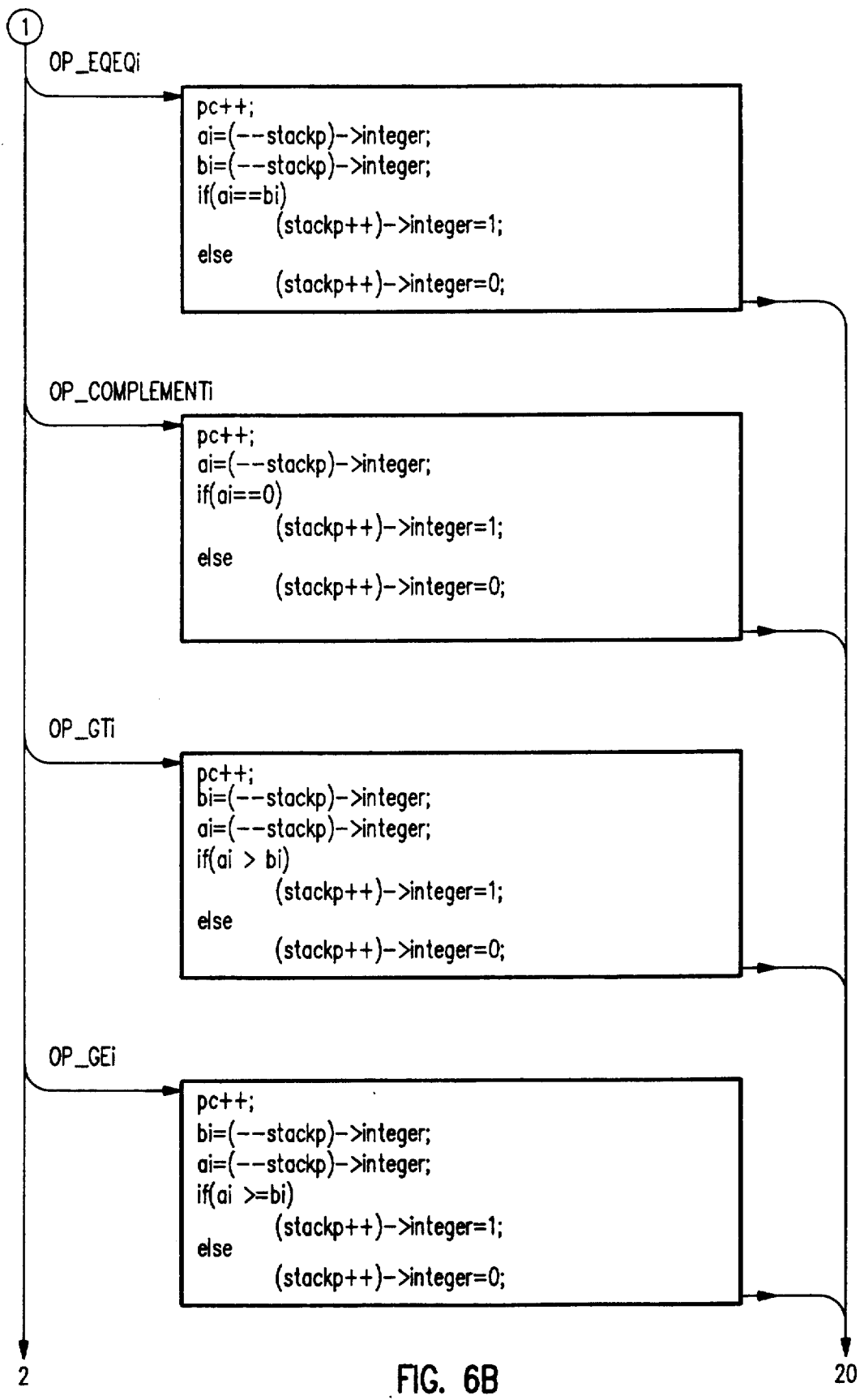
Figure 6C:
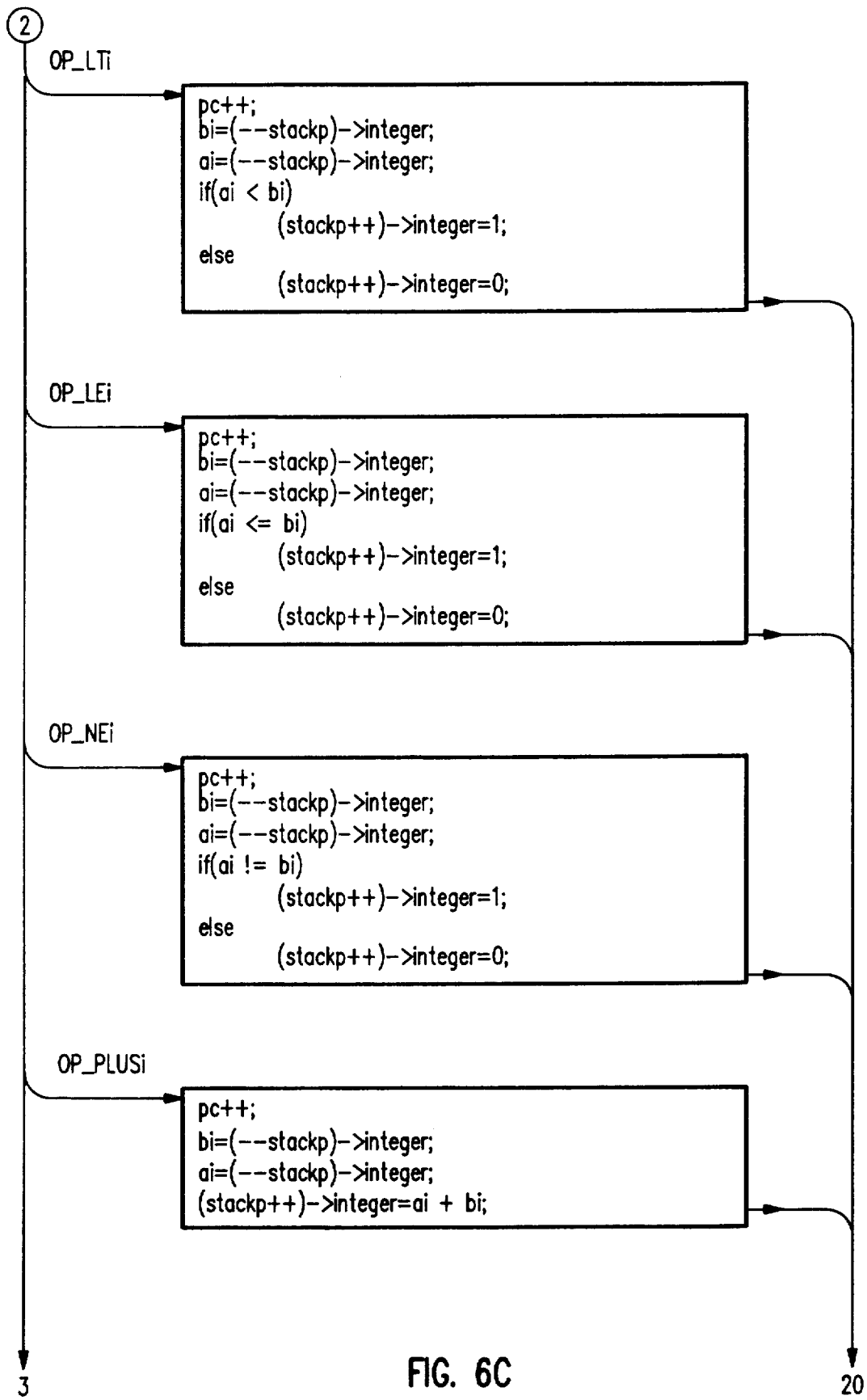
Figure 6D:
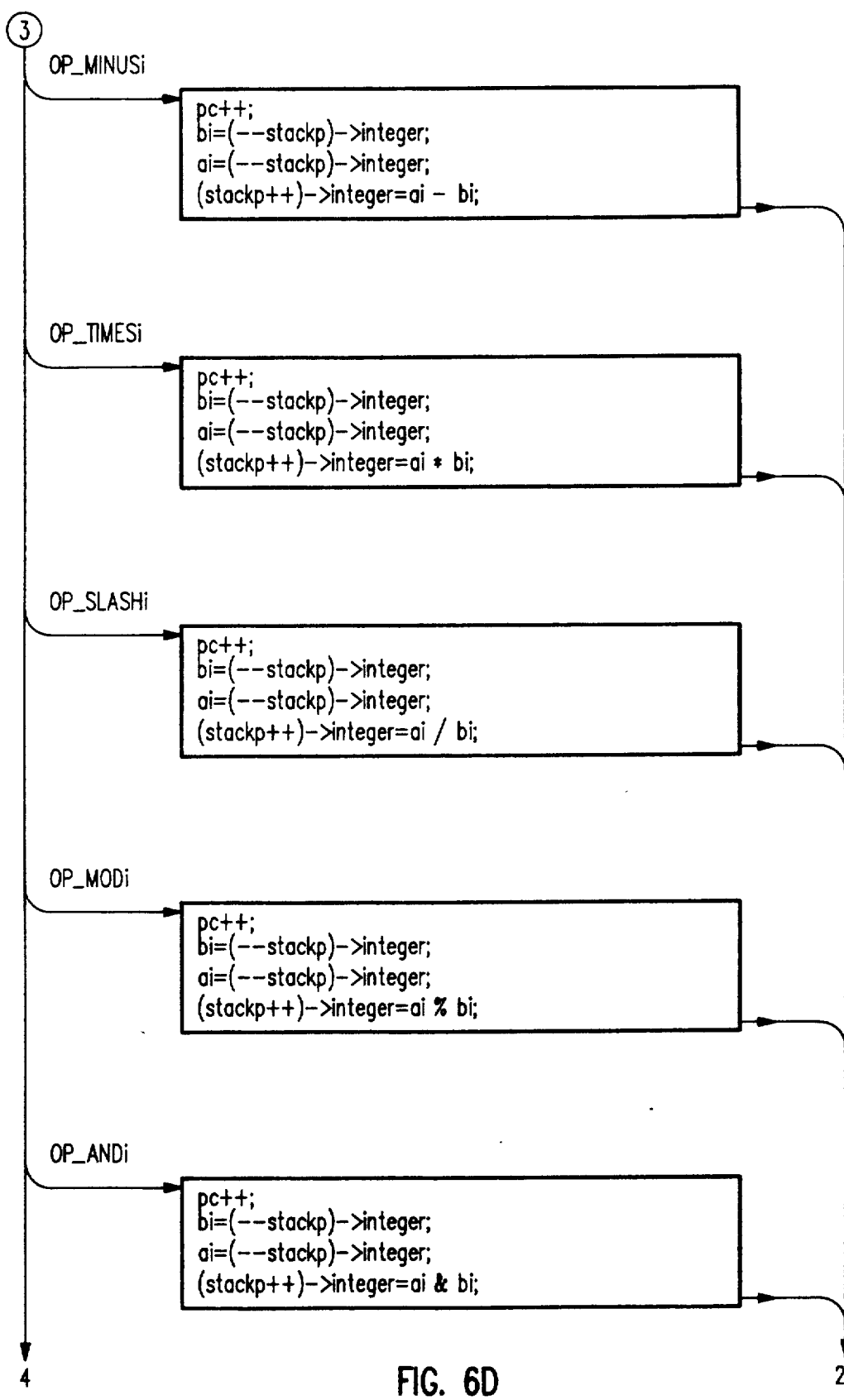
Figure 6E:
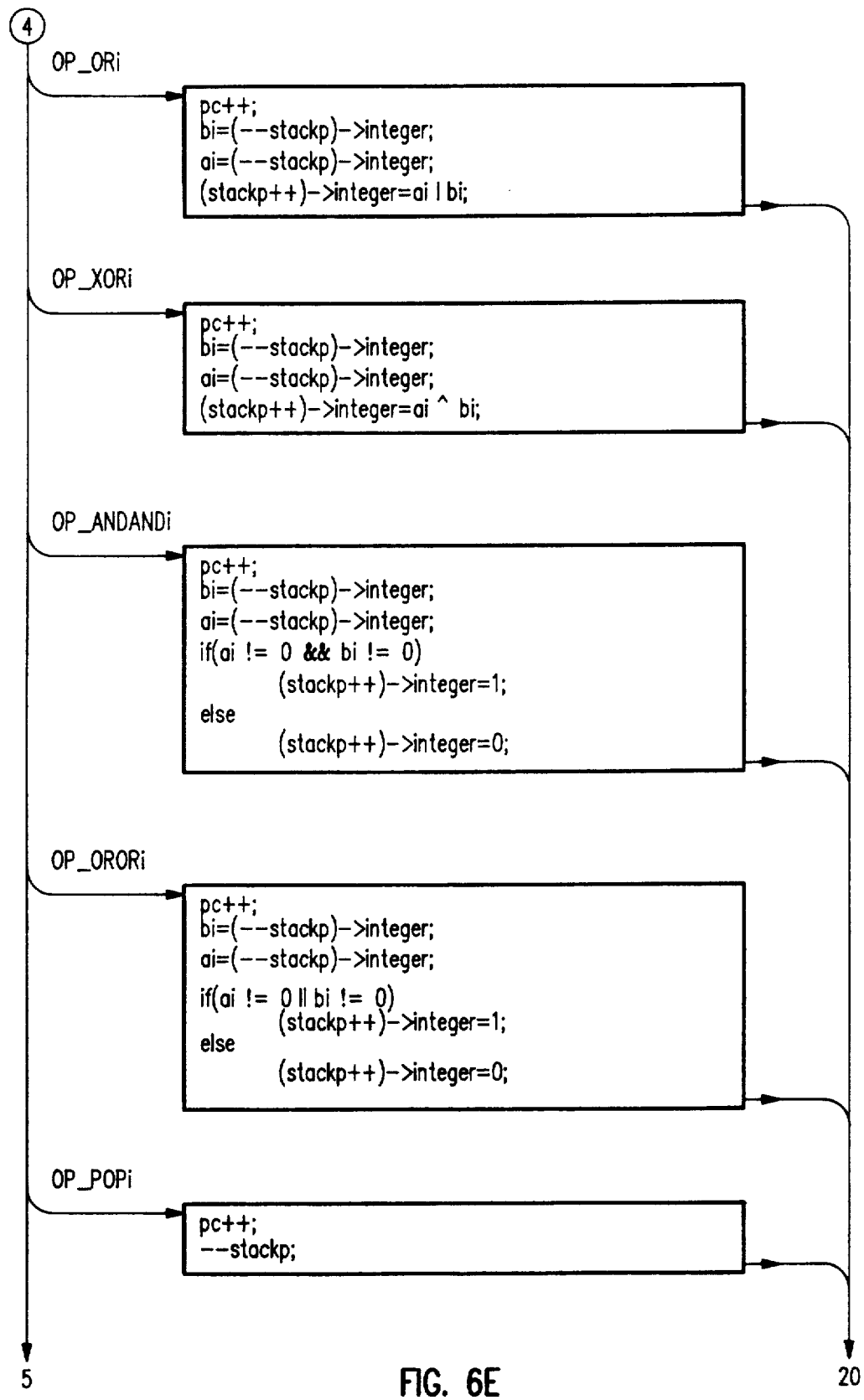
Figure 6F:
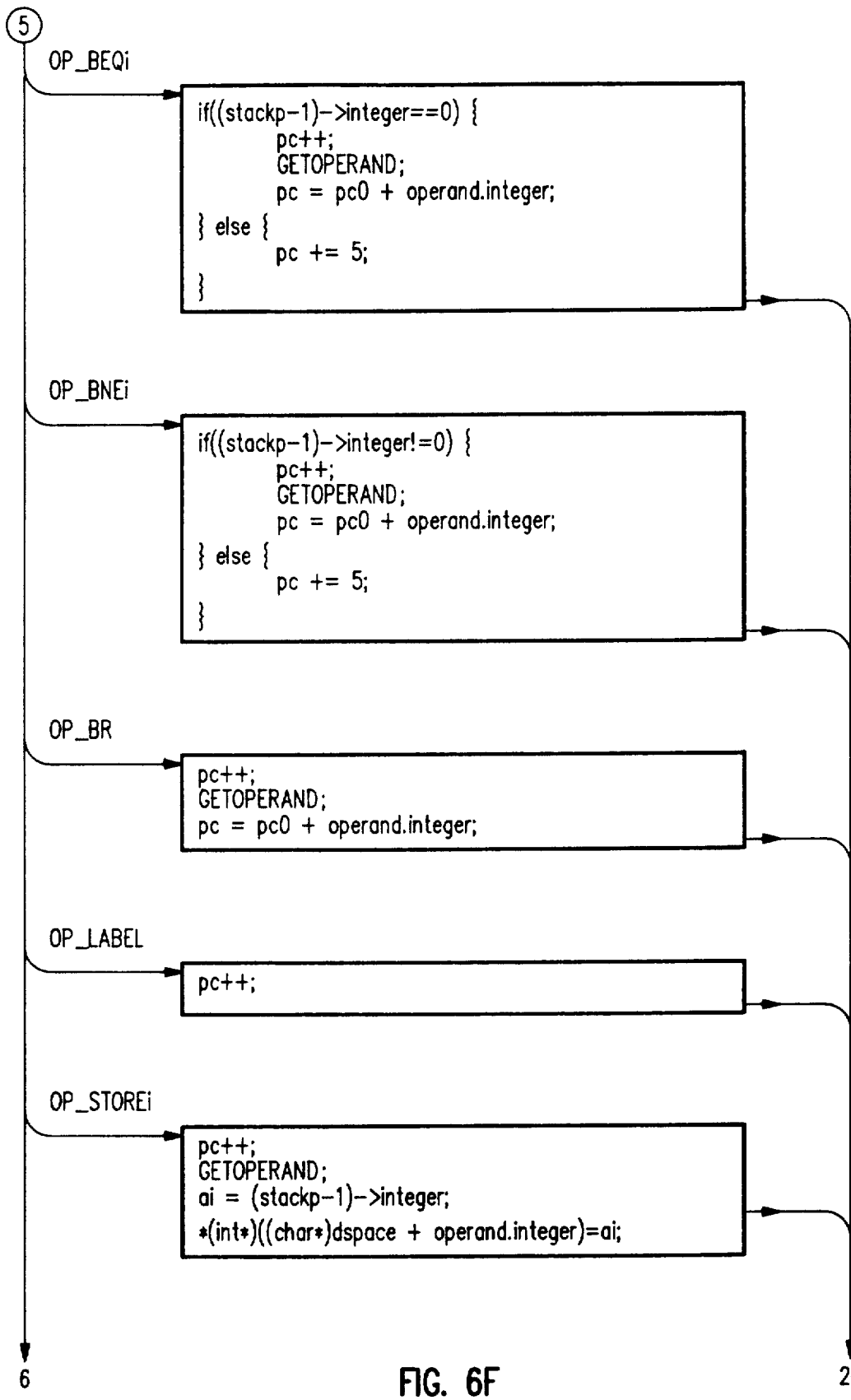
Figure 6G:
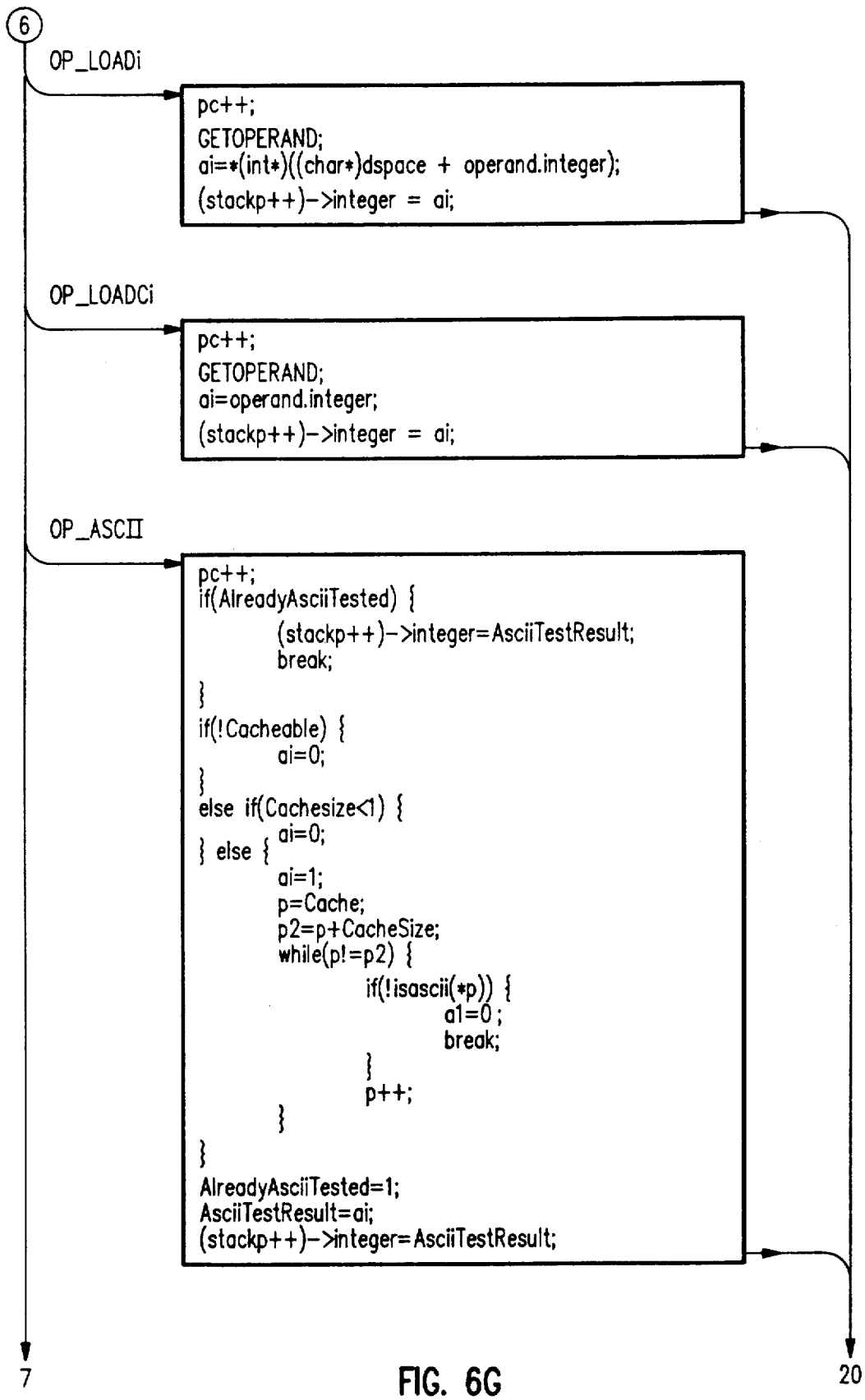
Figure 6H:
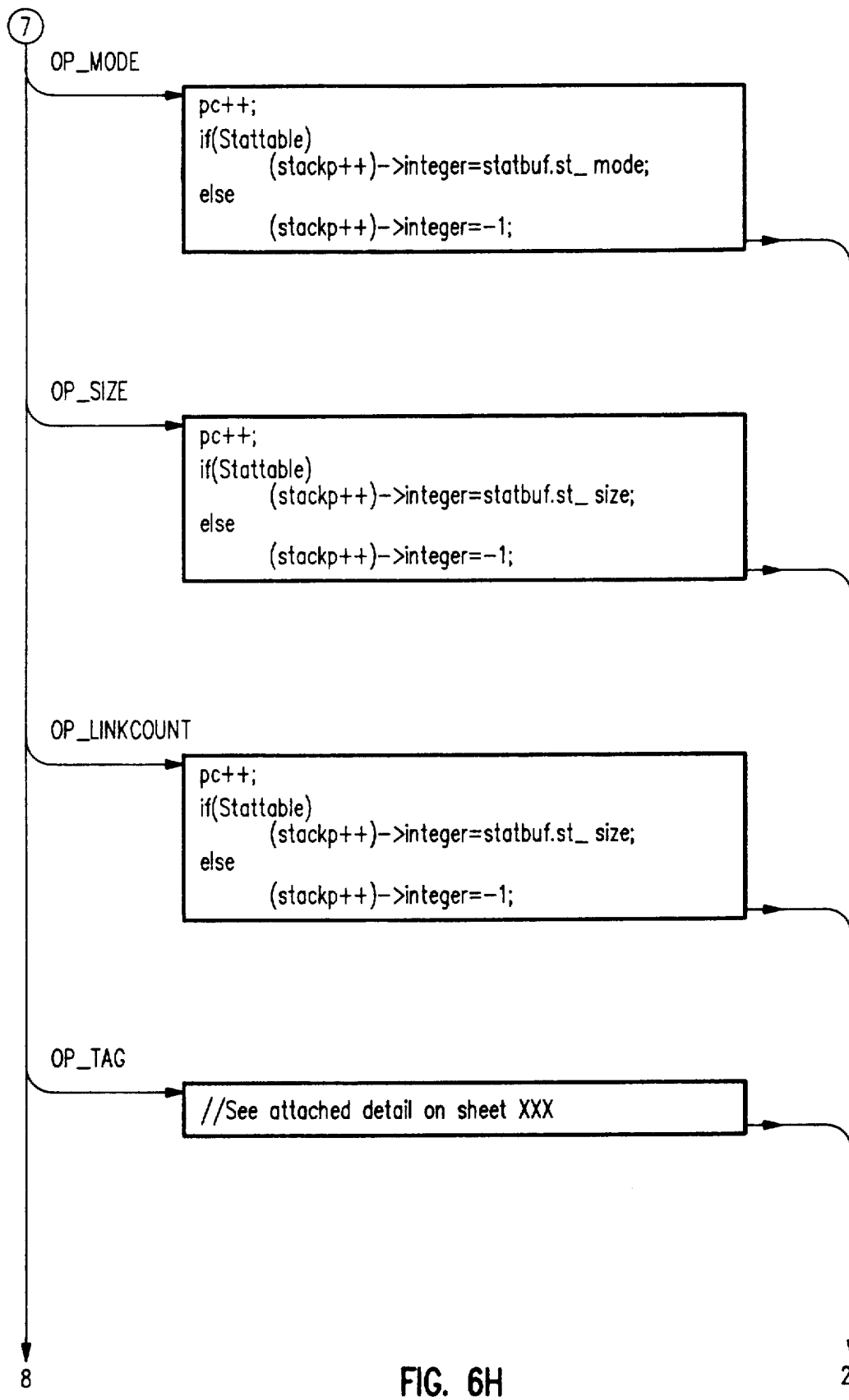
Figure 6:
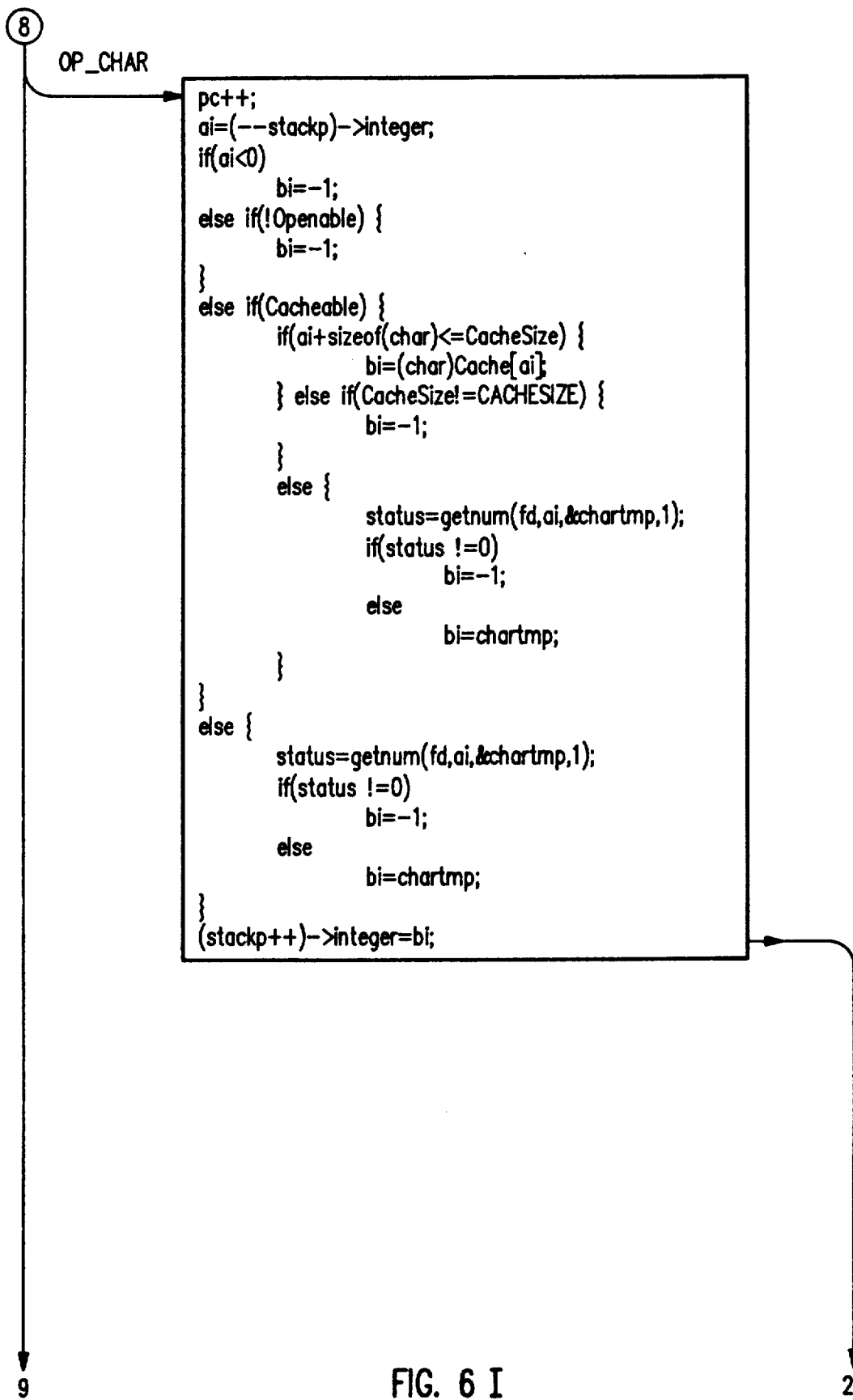
Figure 6J:
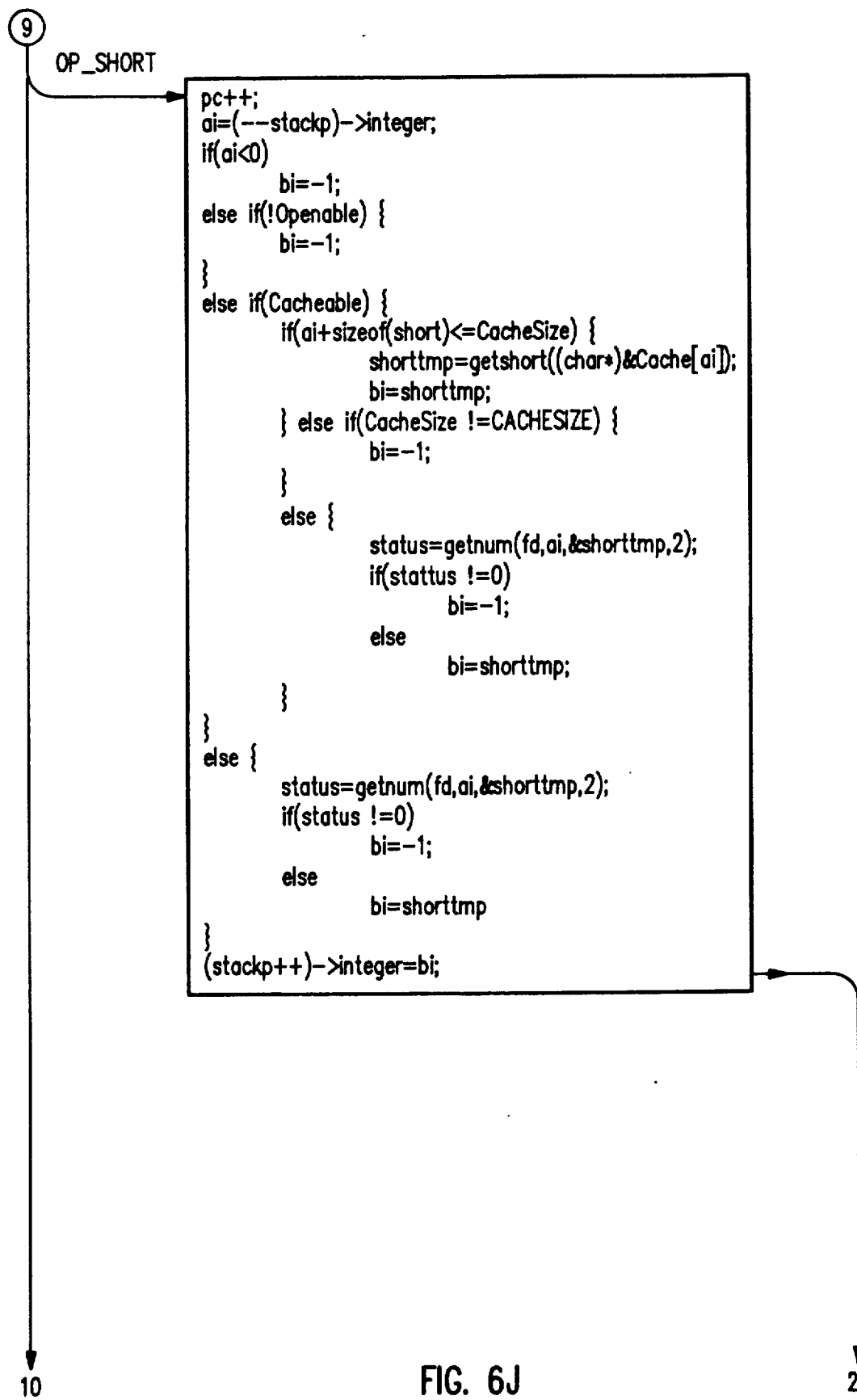
Figure 6K:
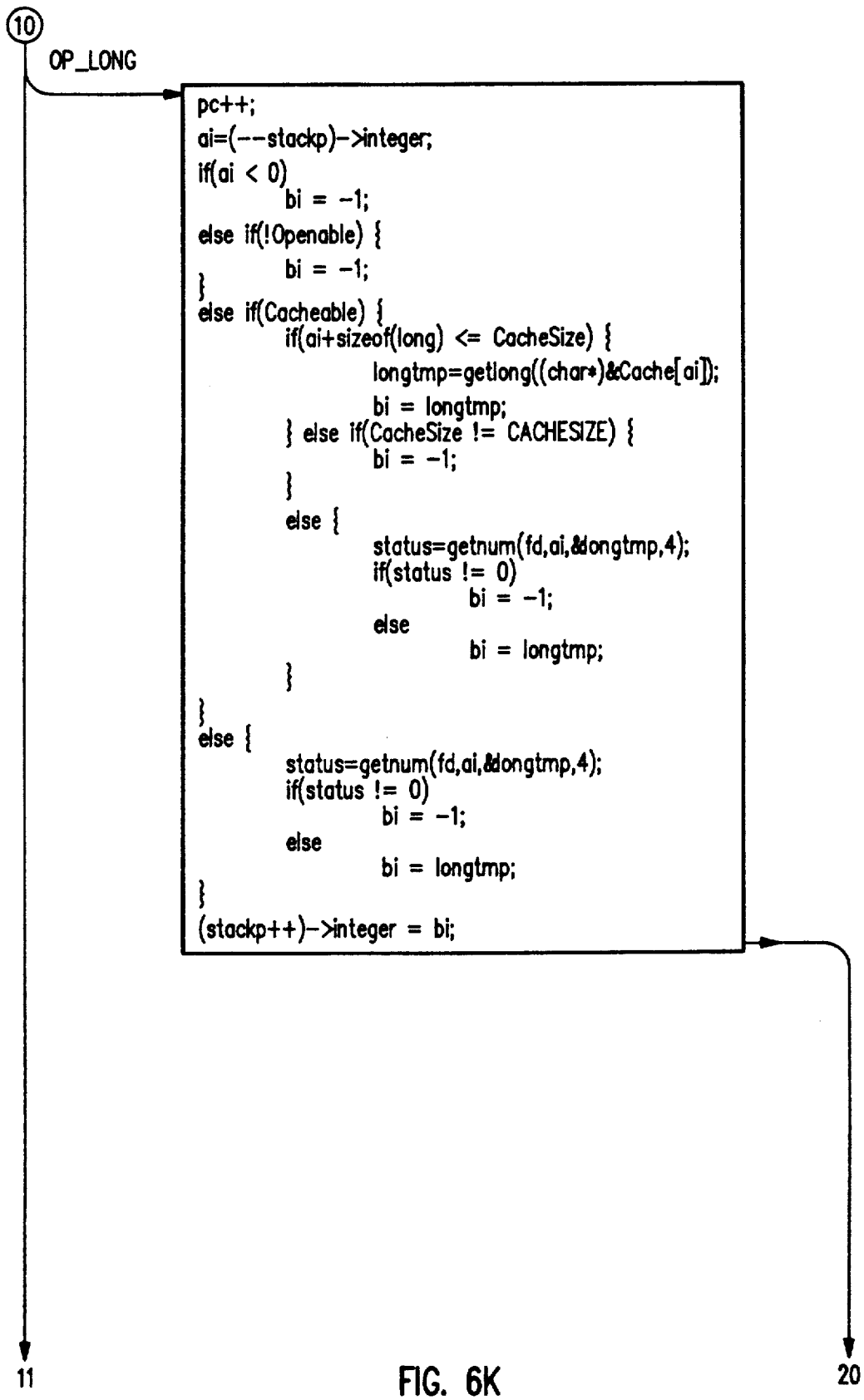
Figure 6L:
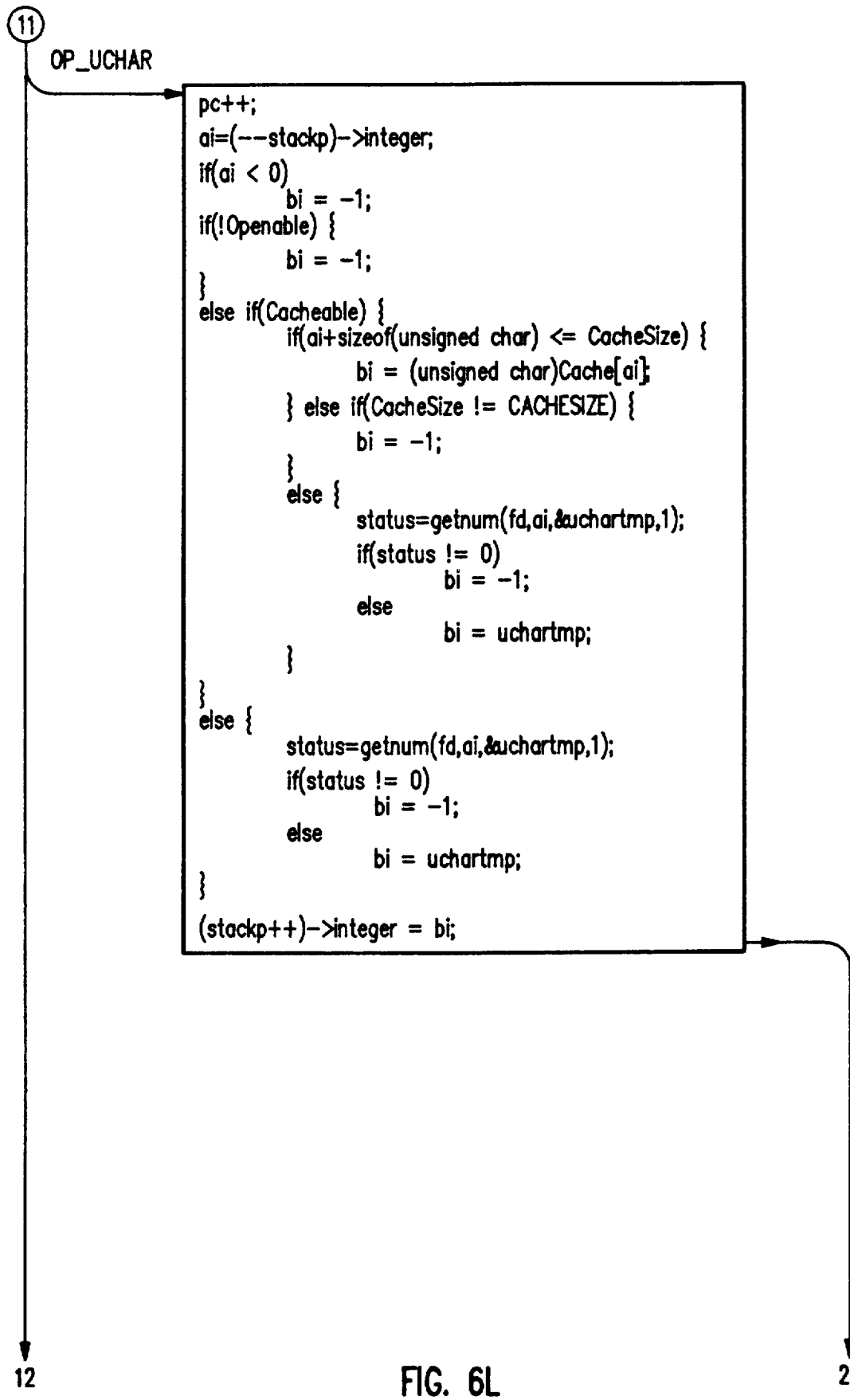
Figure 6M:
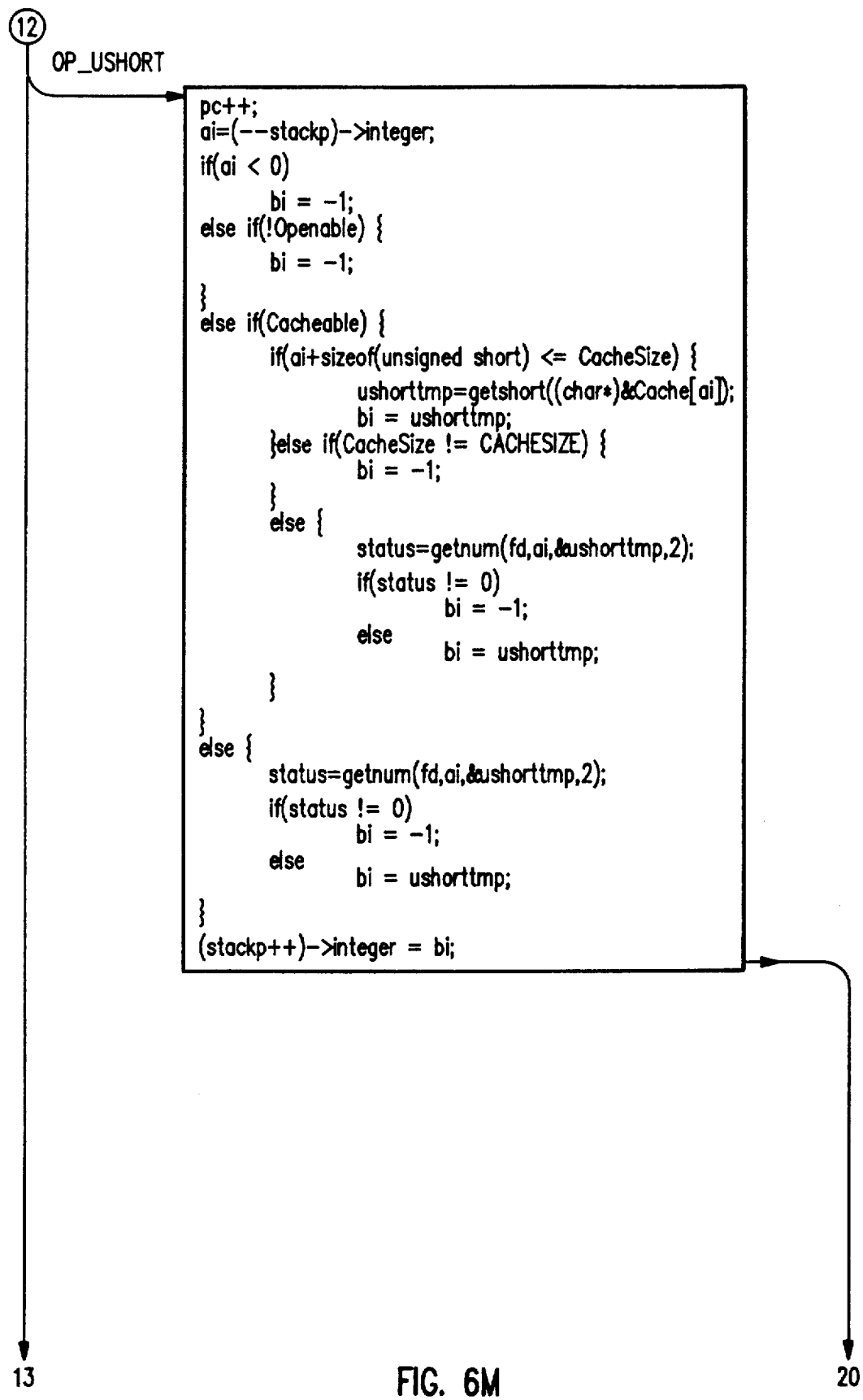
Figure 6N:
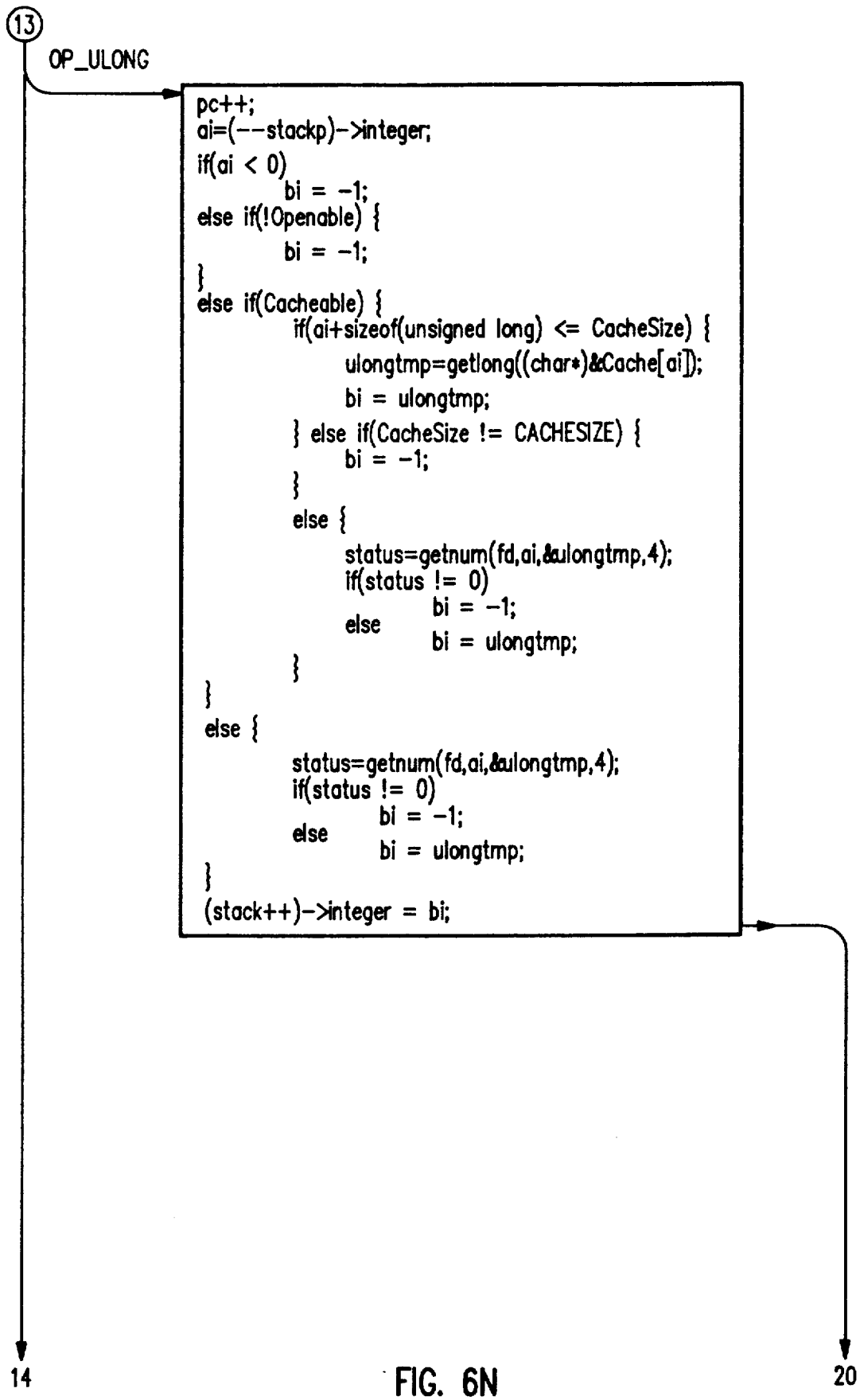
Figure 60:
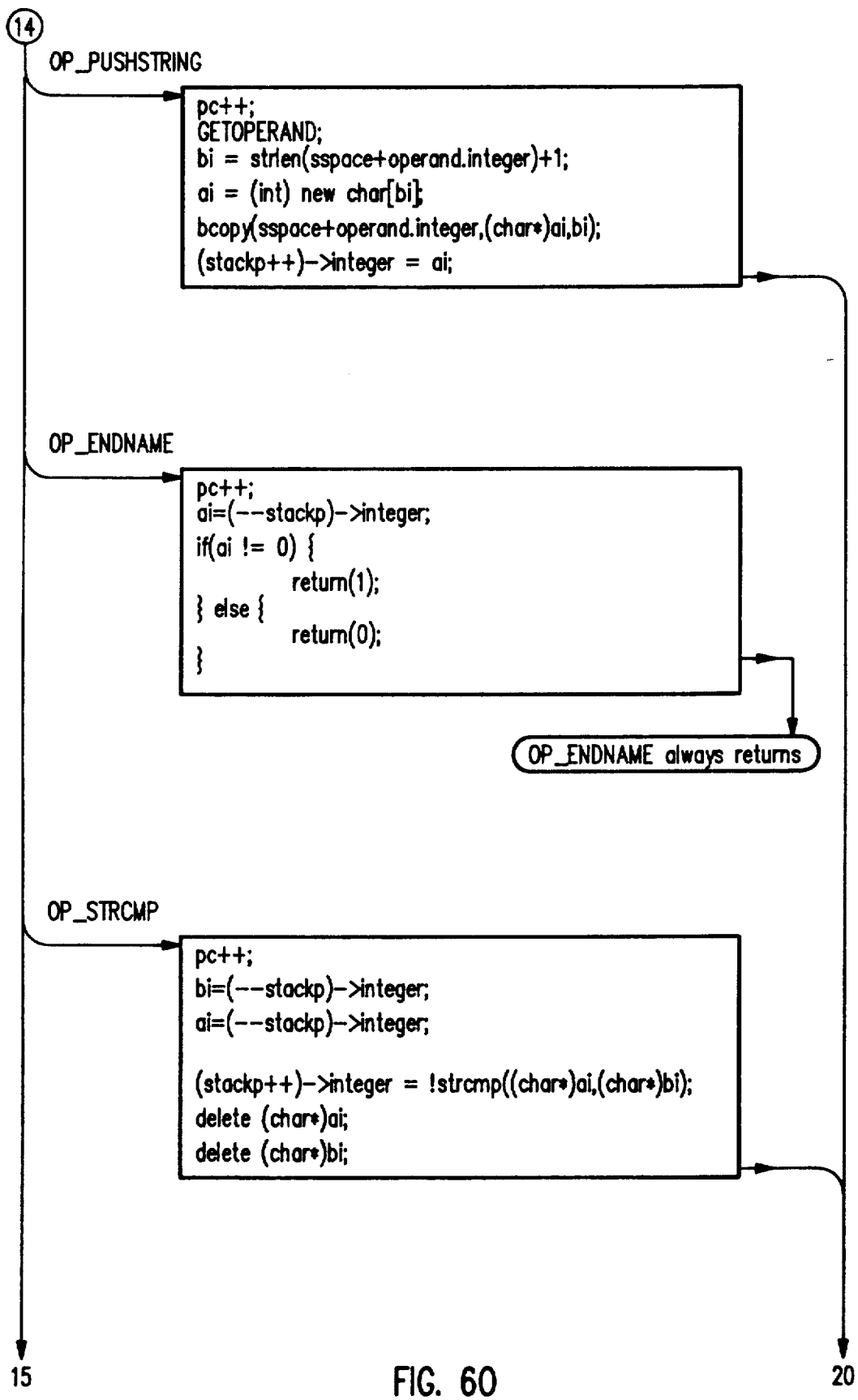
Figure 6P:
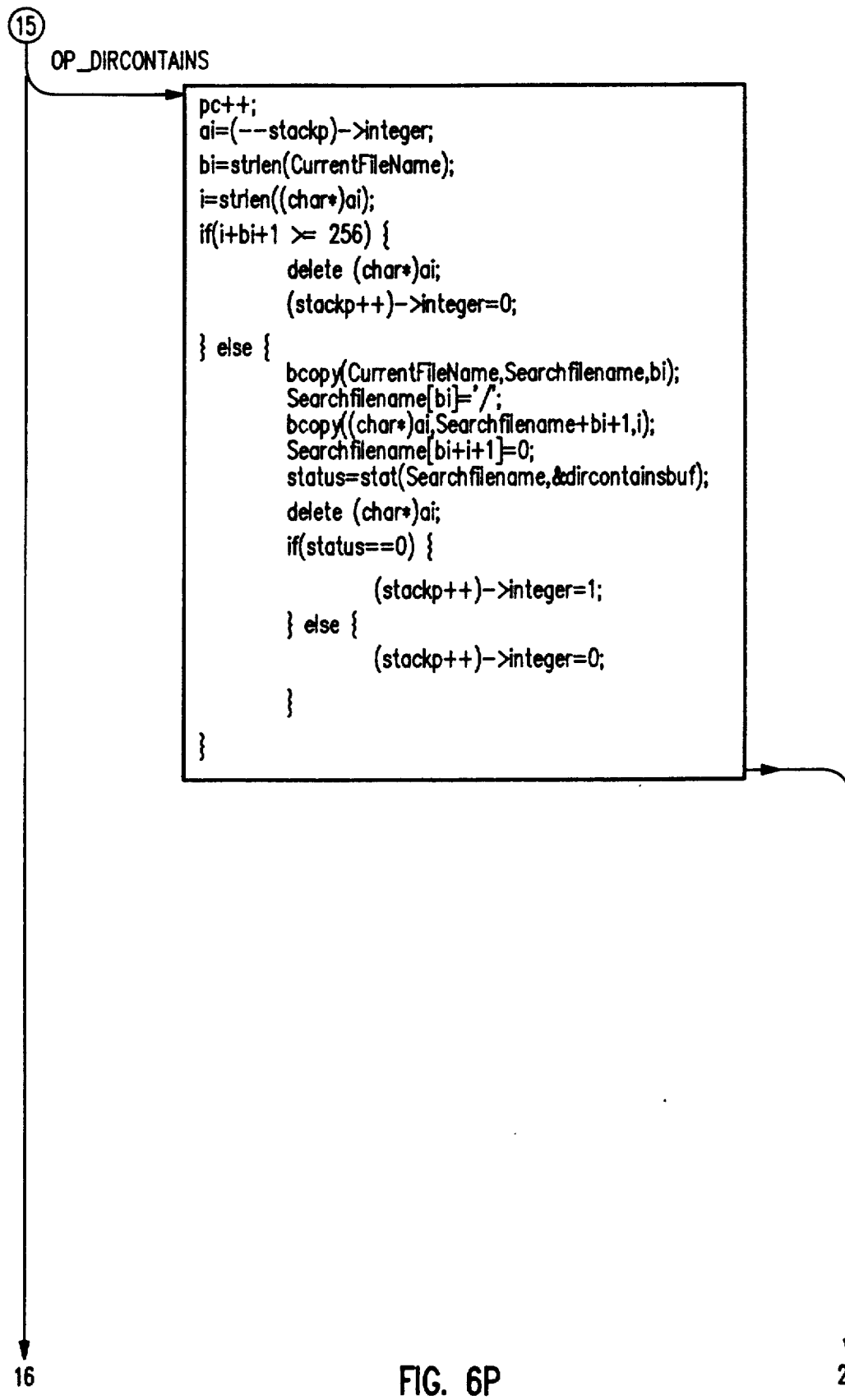
Figure 60:
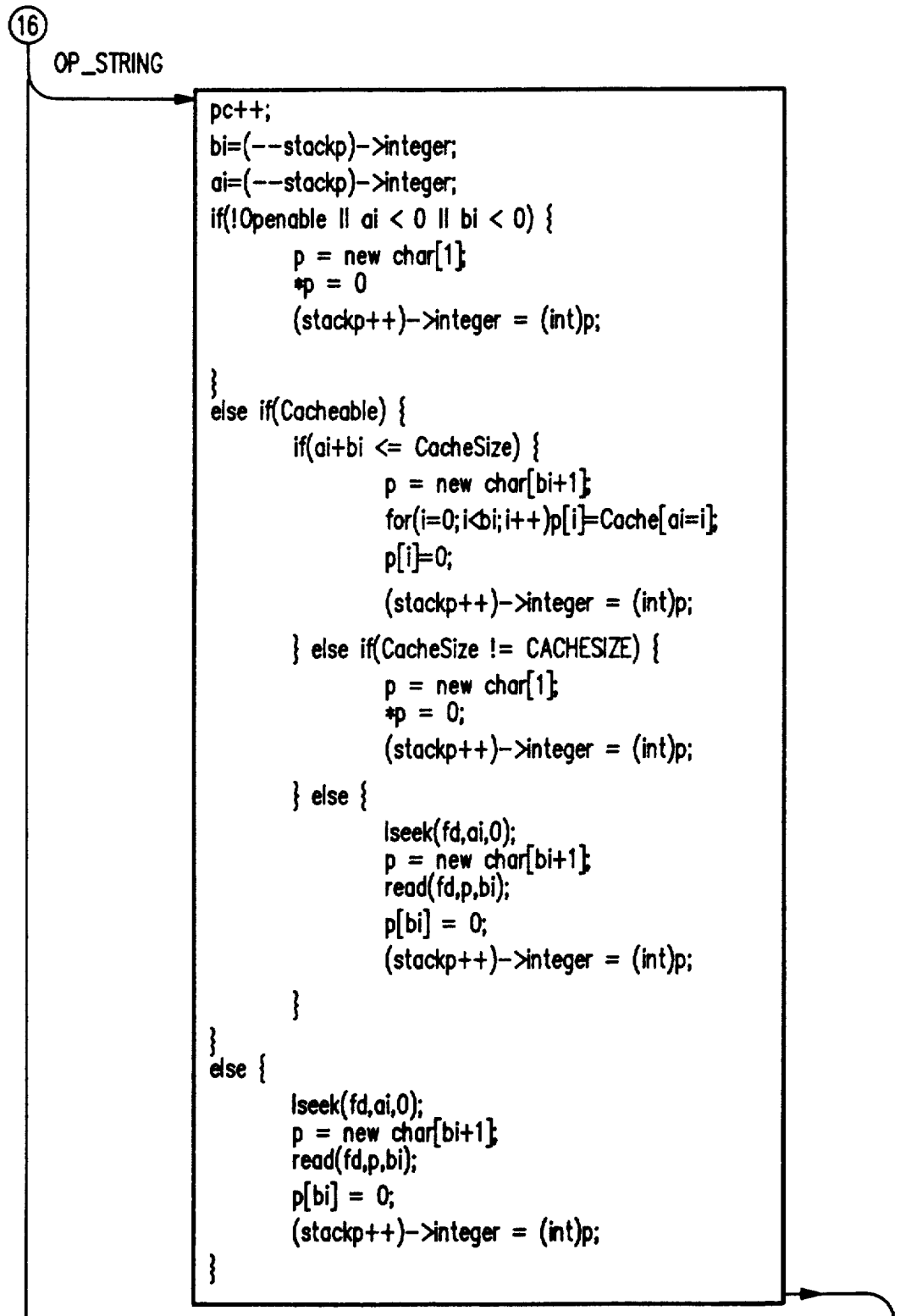
Figure 6R:
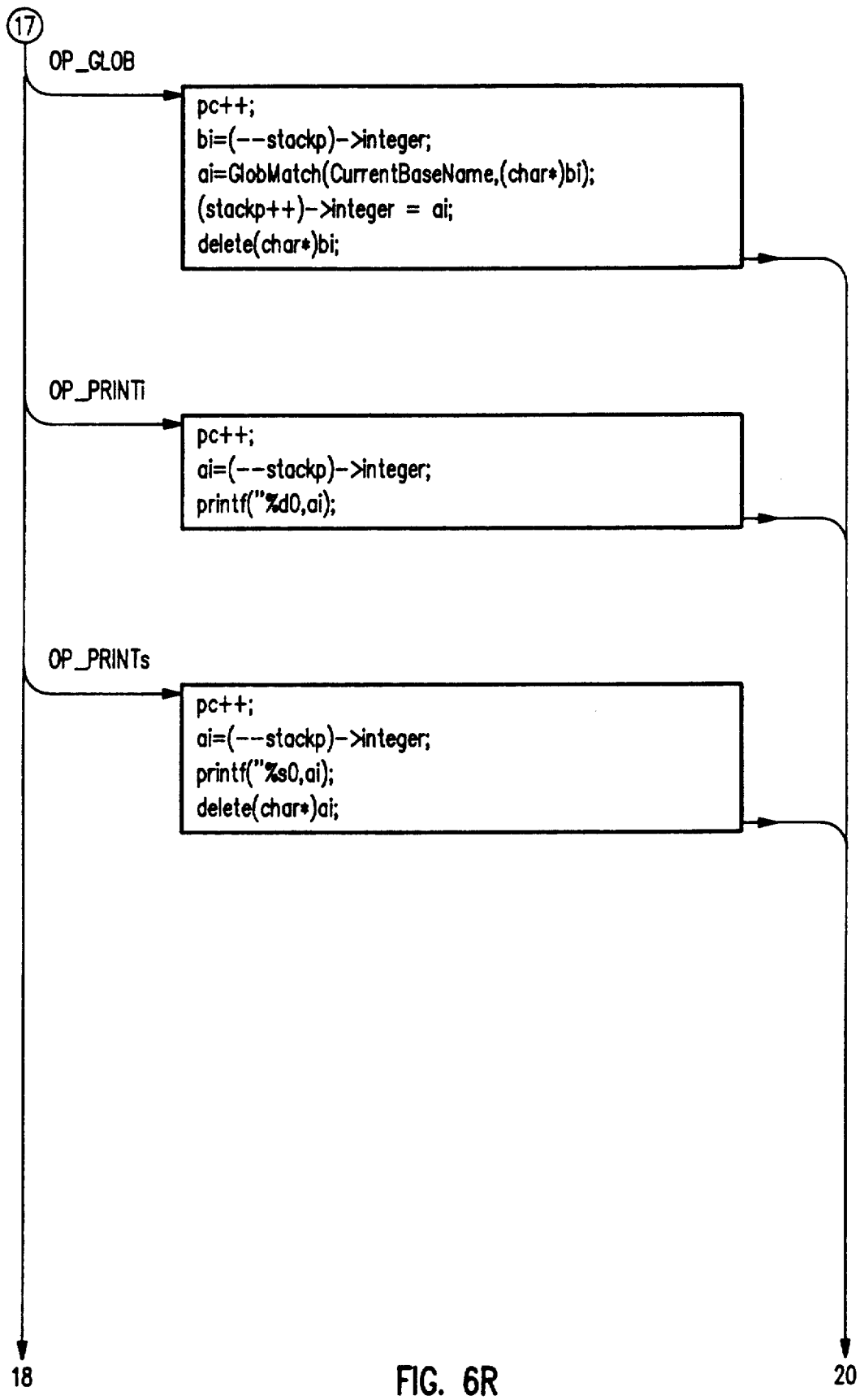
Figure 6S:
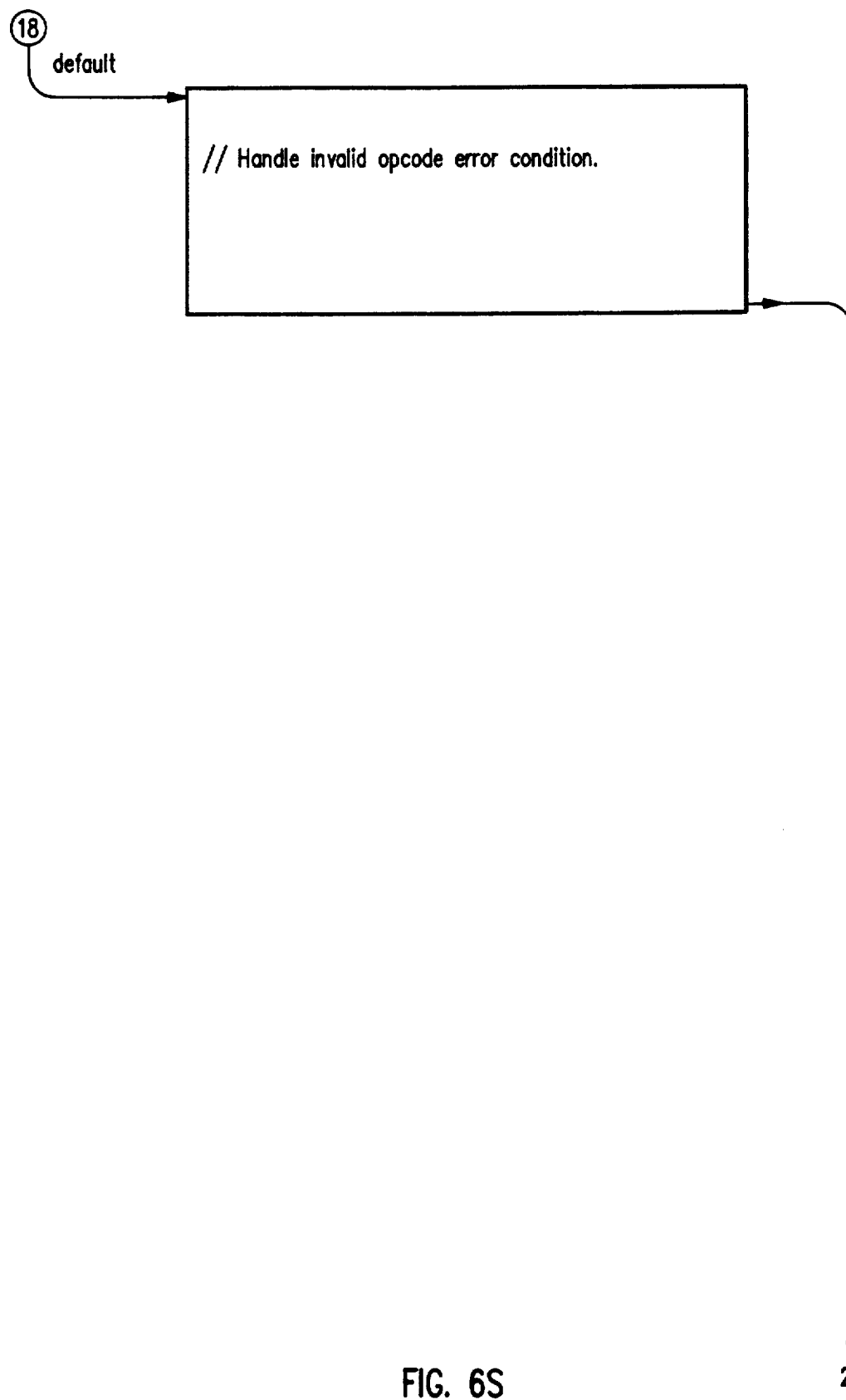
Figure 7A:
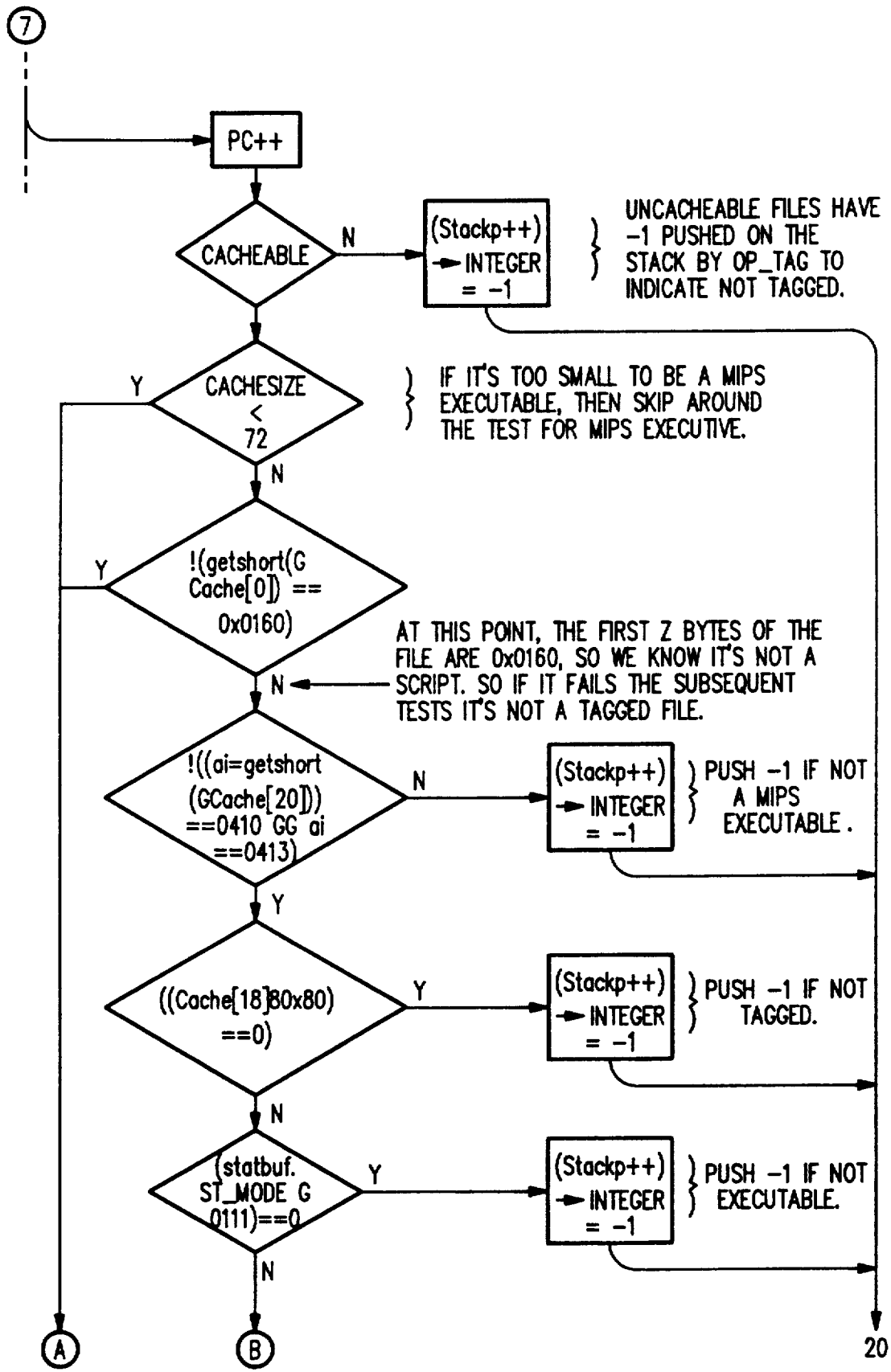
FIGS. 7A-7C, inclusive, is a detailed flow diagram of the opcode "OP TAG" for the file typing process of the present invention.
Figure 7B:
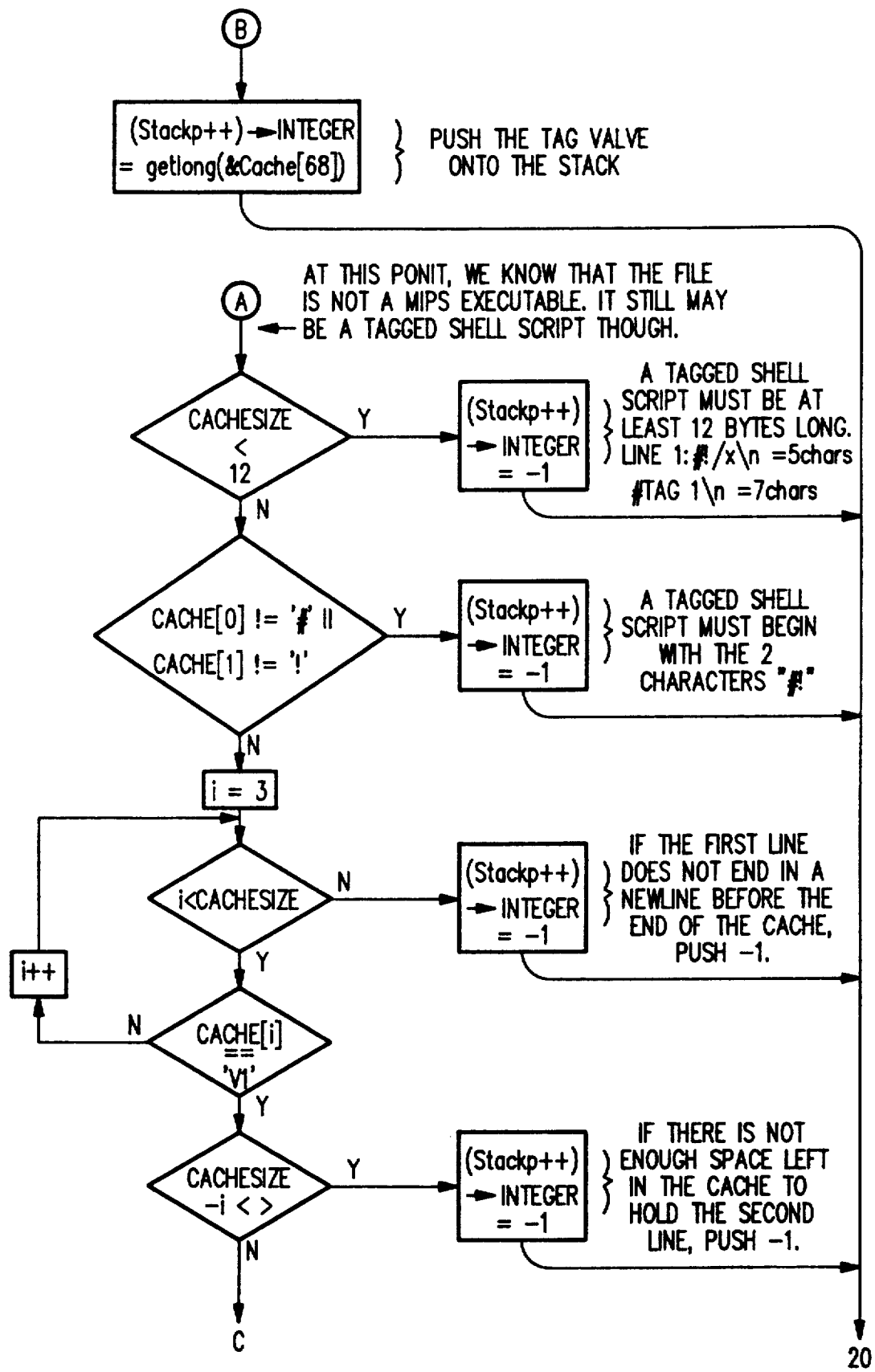
Figure 7C:
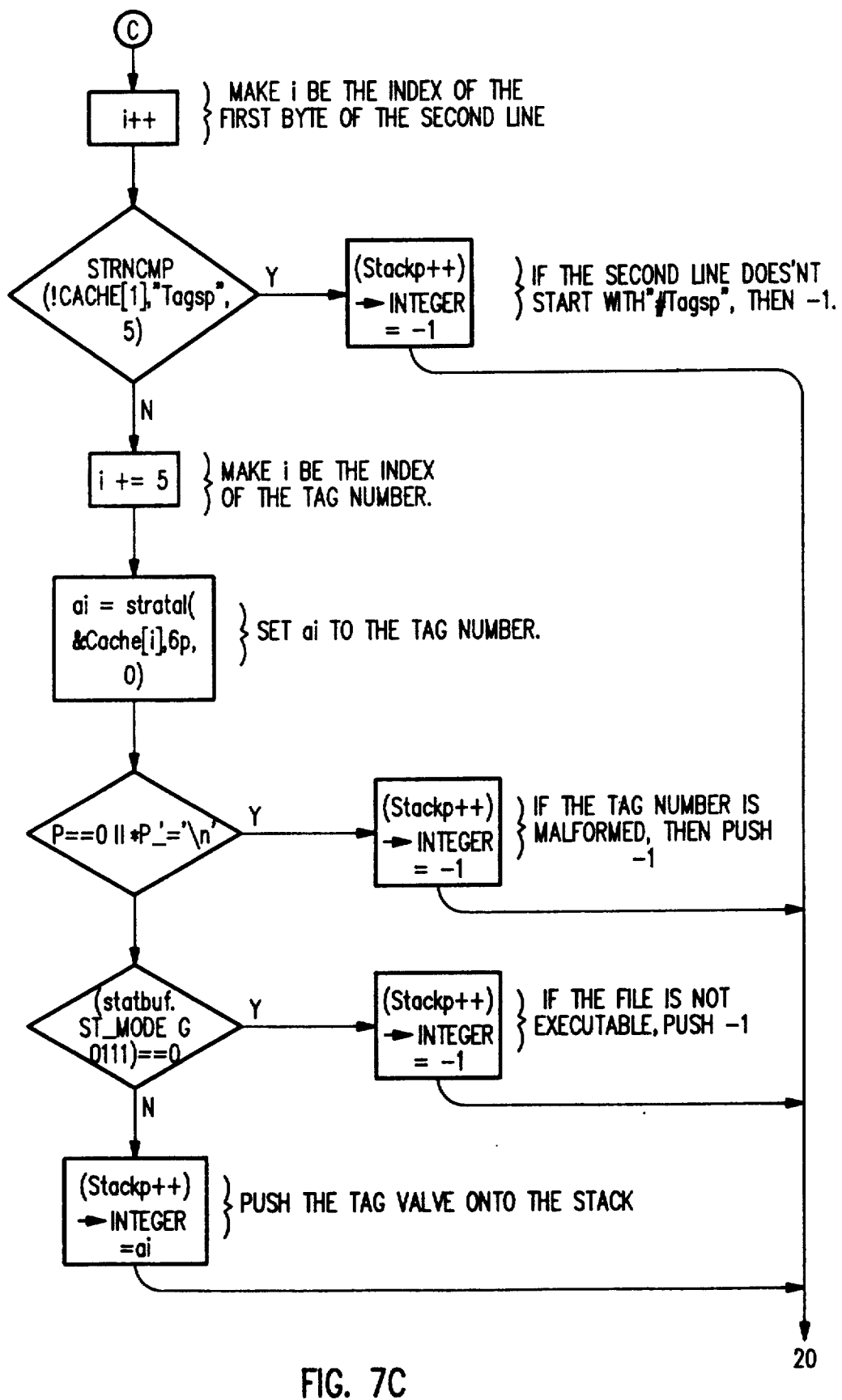

A typical system for using the file typing process of the present invention includes main computing unit 101, keyboard 102, mouse input device 103 with related pad 104 and monitor 105 as shown in FIG. 1. Operating environment programs in a simulated desktop or other working area metaphor are displayed on the screen of display monitor 105.

In most computer systems, the number of files a user can create is limited ultimately by the amount of memory available in the system. The file typing process of the present invention manages numerous varieties of system files and the actions associated with them. Every type of file, such as plain text files, formatted documents, directories, shell scripts, images and binary executables, is given an associated set of operations, often unique, that a user would most often want to perform on those files. The file type declarations and associated rules that give each type of file a unique appearance and behavior are collectively called file typing rules.

File typing rules determine how a file of a particular type will appear in the operating environment, and also define what functions a user can perform on the file by double-clicking the mouse input device while the cursor is located on an associated icon or choosing menu items to manipulate the contents of the file. The operating environment may use the file typing rules to evaluate all files presented from system memory. File typing rules are also used to customize the look of the icons, modify what happens to the files the icons represent or to create unique icons when the user is developing an application and associated data file.

In the present invention, command lines for accessing and acting on system files are represented by icons. Such command lines are invoked by the user acting upon the icons according to the present invention via the mouse device as if they had been typed in a shell. Thus the present invention provides the user with graphical access for performing sophisticated operations on UNIX-based files.

File typing rules are similar to shell scripts. Shell scripts are well known as files containing UNIX instructions for creating new UNIX commands. Many of the file typing rules are similar also to sets Bourne shell commands. C-shells, Bourne shells and shell scripts are familiar to those skilled in the use of the UNIX operating system.

File typing rules comprise a type declaration, which identifies a unique file type, and a set of as many as seven rules following the declaration. All rules, including the type declaration, consist of a rule key followed by the rule itself. Rules may be multi-line, but continuation lines may not begin with any of the rule keys. A summary of rule keys, the associated rule and the function of the rule is provided in Table I.

TABLE I

| File Typing Rule Key | Function |
| --- | --- |
| TYPE | declares a new type |
| MATCH | Lets WorkSpace determine if a file is of the declared type. |
| LEGEND | Provides a text description of the file type. |
| SUPERTYPE | Tells WorkSpace to treat the file as a subset of a another type under certain circumstances |
| SPECIALFILE | Tells WorkSpace that the file typing rule is to be used only on non-plain files. |
| CMD OPEN | Defines a series of actions that occur when the mouse is double-clicked on an icon. |
| CMD ALTOPEN | Defines a series of actions that occur when the mouse is alt-double-clicked on an icon. |
| CMD DROP | Defines a series of actions that occur when you "drop" an icon on top of another. |
| CMD PRINT | Defines a series of actions that occur when you choose 'Print' from the WorkSpace or Directory View menus. |
| MENUCMD | Defines menu entries and actions that are inserted into the WorkSpace or Directory View menus when an icon is selected. |
| BOUNDS | Defines the coordinate space for the file type's icon. |
| ICON | Defines the appearance (geometry) of the file type's icon. |

A description of file typing rules according to the present invention is given below with continuing reference to FIGS. 2 to 10P.

File Typing Rules

1.1 The Type Declaration

Syntax: TYPE type-name

Description: type-name is a one word ASCII string. Legal type names can be any legal C language variable name. The user should ideally choose a name that is in some way descriptive of the file type it represents. All rules that follow a TYPE declaration apply to that type, until the next TYPE declaration is encountered in the FTR file. Each TYPE declaration must have a unique type name.

Example: TYPE GenericExecutable

1.2 The MATCH Rule

Syntax: MATCH match-expression;

Description: match-expression is a logical expression that should evaluate to true if and only if a file is of the type declared by TYPE. The match-expression must consist only of valid MATCH functions, as described in the section below. The match-expression can use multiple lines, but must terminate with semicolon (;). Multiple match-expressions are not permitted for a given type. The MATCH rule is employed each time a file is encountered by the operating environment, to assign a type to that file.

Example: MATCH glob ("*.h") && ascii;

1.3 Valid Match-Expression

This section describes the syntax and function of valid match-expressions.

Operators, Constants, and Numerical Representation

The following C language operators may be used in a match-expression:

$$+ - * / \& | \wedge ! \% ()$$

The following C language conditional operators may be used in a match-expression:

$$\&\& \; || \; == \; != \; < \; > \; <= \; >=$$

The '==' operator works for string comparisons in addition to numerical comparisons.

The following constants may be used in a match-expression:

true false

Numbers in match-expressions may be represented in either decimal, octal, or hexadecimal notation. These representations are given below:

| Representation | Syntax |
| --- | --- |
| decimal | num |
| octal | Onum |
| hexadecimal | Oxnum |

FUNCTIONS

Table II describes the set of valid match-expression functions.

TABLE II

| Function Syntax | Definition |
| --- | --- |
| ascii | Returns TRUE if the first 512 bytes of the file are all printable ASCII characters. |
| char(n) | Returns the nth byte in the file as a signed character; range −128 to 127 |
| dircontains ("string") | Returns TRUE if the file is a directory and contains the file named by string. |
| glob ("string") | Returns TRUE if the file's name matches string; allows use of the following expansions in string for pattern matching: { } [ ] * ? and backslash (see sh(1) filename expansion). |
| linkcount | Returns the number of hard links to the file. |
| long (n) | Returns the nth byte in the file as a signed long integer; range $-2^{31}$ to $2^{31} - 1$. |
| mode | Returns the mode bits of the file (see |

TABLE II-continued

| Function Syntax | Definition |
|---|---|
| | chmod(1)). |
| print (expr or "string") | Prints the value of the expression expr or string to stdout each time the rule is evaluated; used for debugging. Always returns true. |
| short (n) | Returns the nth byte of the file as a signed short integer; range −32768 to 32767. |
| size | Returns the size of the file in bytes. |
| string (n,m) | Returns a string from the file that is m bytes (characters) long, beginning at the nth byte of the file. |
| uchar (n) | Returns the nth byte of the file as an unsigned character; range 0 to 255. |
| tag | Returns the specific WorkSpace application tag injected into an executable file by the tag injection tool (see tag(1) in Appendix D, "WorkSpace Man Pages"). |
| ushort (n) | Returns the nth byte of the file as an unsigned short integer; range 0 to 65535. Returns −1 if the file is not a tagged file. |

1.4 Building Effective MATCH Rules

A match rule consists of a sequence of expressions, each of which checks a file for positive distinguishing characteristics. The most effective way to order these expressions in a single MATCH rule is to choose a set of expressions, each of which tests for a single characteristic, and conjoin them all using 'and' conditionals (&&).

The order in which the expressions in a MATCH rule are conjoined may have an effect on the efficiency of the rule's evaluation. The user should always try to order the expressions so that the maximum number of files are 'weeded out' by the first expressions. The reason for this is that, as in the C language, && will stop evaluation as soon as one side of the conditional is found to be false. Therefore, as a rule of thumb, the more likely an expression is to be false, the further to the left of the MATCH rule you should place it.

For example, one possible way to match a C source file is with the following rule:
MATCH glob ("*.c") && ascii;
Note that it is more efficient to place the glob ("*.c") expression first because there are many more files that do not end in ".c" than there are files that are not ASCII text.

The user should also make sure that the match rule is specific enough not to "catch" any unwanted files. FTR files are scanned sequentially (see Section 2.10, "Comparing FTR Rules"), so if a type is defined with the following MATCH rule at the beginning of the FTR file,
TYPE foo
MATCH ascii;
every text file in the system will be defined as a file of type 'foo'.

1.5 Tagging Executables

The most preferable way to match a specific executable to a file typing rule is to "tag" it with a unique 32-bit number. tag (1) allows the user to inject a 32-bit tag safely into a shell script of MIPS executable, where it can be read by a MATCH rule using the tag match-expression function (see Section 1.3).

1.6 Programming the IRIS Operating Environment

An operating environment in accordance with the present invention is the IRIS Operating Environment, developed and introduced by Silicon Graphics, Inc. IRIS, including its icon-based interface called WorkSpace, is described in "Programming the IRIS WorkSpace"; "The Personal IRIS Owner's Guide"; and "The IRIS-4D Series Owner Guide", which are also incorporated by reference as if fully set forth herein.

The upper 16 bits of the tag number are reserved for vendor ID, for separate administration by the vendor. The lower 16 bits are for general use. Several uses values for the lower 16 bits have been defined, which Operating Environment recognizes:

```
/* The different classes of how to launch an executable */
# define GENERICEXEX            0x00000000
/* this can be windowed or no output */
# define LAUNCHEXEC             0x00000100
/* fires a launch window for arg input */
# define OUTEXEC                0x00000200
/* output only wsh */
# define TTYEXEC                0x00000400
/* wsh that takes input and ouput */
# define TTYLAUNCHEXEC          TTYEXECILAUNCHEXEC
# define TTYOUTEXEC             TTYEXECIOUTEXEC
# DEFINE TTYLAUNCHOUTEXEC       TTYEXECIOUTEXECILAUNCHEXEC
/* Define to represent the number of args
    an executable expects */
# define ARGS0                  0x00000000
# define ARGS1                  0x00000001
# define ARFS2                  0x00000002
# define ARGS3                  0x00000004
# define ARGS0-1                0x00000008
# define ARGS0-N                0x00000010
# define ARGS1-N                0x00000020
```

1.7 The Legend Rule

Syntax: LEGEND text-string

Description: text-string is a string that describes the file type in plain language a user can understand. The legend is used to describe the file in the Get File Info window. It is also used when a Directory View window is set to display as a list. Legends that are longer that 25 characters may be truncated in some circumstances.

Example: LEGEND C program source file 1.8 The Supertype Rule

Syntax: SUPERTYPE type-name [type-name . . . ]

Description: The SUPERTYPE rule is used to indicate that a particular file type can be treated as a part of a more general file type for under certain conditions. A special case in the operating environment is directories; the user may wish to create a directory with a custom icon, yet still have the OPEN and ALTOPEN rules work as a normal directory. (Note: the operating environment automatically handles the OPEN and ALTOPEN rules for directories; the OPEN and ALTOPEN rules are placeholders.) A unique directory TYPE, with its own ICON rule may be created, but if SUPERTYPE is used, it will work like a standard directory (see example.) SUPERTYPE is also very useful for printing, where a custom file type may want to be printed as, say, an ASCII file. The user can also make use of SUPERTYPEs in separate OPEN, ALTOPEN, DROP, and PRINT rules by using is Super (1) as part of those rules. A given file typing rule may contain several different SUPERTYPE rules, and thus be considered a subset of several more general file types.

```
Example: TYPE MyDirectory
         SUPERTYPE Directory
```

1.8 The Special File Rule

Syntax: SPECIALFILE

Description: SPECIALFILE is used to distinguish a file typing rule used for matching non-plain files. Device files, and other non-plain files can cause damage to physical devices if they are matched using standard file typing rules. Special files are only matched using rules containing SPECIALFILE, which are written so as not to interfere with actual physical devices. Similarly, plain files are not matched using rules containing a SPECIALFILE rule.

Example: SPECIALFILE

1.2 The Command (CMD) Rules

The CMD rules determine how an icon behaves when a user interacts with it, whether it is by clicking, dragging, or through menu selections.

1.10 The CMD Open Rule

Syntax: CMD OPEN sh-expressions[; sh-expression; . . . ; sh-expression]

Description: The OPEN rule is invoked when any field of the appropriate type is double-clicked, or selected and opened from the operating environment or directory view Menu via the 'Open' menu item. The OPEN rule should reflect the most often used function that would be applied to a file of the given type. sh-expression can be any valid Bourne shell expression. Any expression may use multiple lines. Any number of expressions may be used, and must be separated by semicolons (;). The final expression should not end with a semicolon. Variable may be defined and used as in a Bourne shell script, including environment variables. These environment variables may be used to refer to the currently selected icons within the operating environment or directory view.

Example: CMD OPEN $wineditor $files

1.11 The CMD ALTOPEN Rule

Syntax: CMD ALTOPEN sh-expression[;sh-expression; . . . ; sh-expression]

Description: The ALTOPEN rule is envoked when any file of the appropriate type is double-clicked while the ALT key is depressed. The ALTOPEN rule provides added functionality for power users. sh-expression can be any valid Bourne shell expression. Any expression may use multiple lines. Any number of expressions may be used, and must be separated by semicolons (;). The final expression should not end with a semicolon. Variables may be defined and used as in a Bourne shell script, including environment variables. These environment variables may be used to refer to the currently selected icons within the operating environment or directory view.

Example: CMD ALTOPEN make

1.12 The CMD DROP Rule

Syntax: CMD DROP sh-expression[; sh-expression; . . . ; sh-expression]

Description: The DROP rule is invoked whenever a selected (file) icon is "dropped" onto another icon in the operating environment or directory view Windows. When this happens, operating environment checks to see if the file type that is being dropped upon has a DROP rule to handle the files being dropped. In this way, the user can write rules that allow one icon to process the contents of other icons simply by dragging the icons selected for processing onto the top of the target icon (i.e., the one with the DROP rule).

Example: CMD DROP $TARGET $SELECTED

1.13 CMD PRINT Rule

Syntax: CMD PRINT sh-expression[;sh-expression; . . . ;sh-expression]

Description: The PRINT rule is invoked whenever a file of the appropriate type is selected and printed using a print menu item form the operating environment or directory view menu. sh-expression can be any valid Bourne shell expression. Any expression may use multiple lines. Any number of expressions may be used, and must be separated by semicolons (;). The final expression should not end with a semicolon. Variables may be defined and used as in a bourne shell script, including environment variables. These environment variables may be used to refer to the currently selected icons within the operating environment or directory view. The recommended method of implementing the PRINT rule is to use the print-job routing utility from the operating environment.

Example: OMD PRINT routeprint $LEADER $REST

1.14 The NEMUCMD Rule

Syntax: MENUCMD "string" sh-expression[;sh-expression; . . . ;sh-expression]

Description: MENUCMD inserts the menu entry string into the operating environment or directory view menu if a single file of the appropriate type is selected, or a group all of the same appropriate type is selected. If the menu entry is chosen, the actions described by the sh-expressions is performed on each of the selected files.

Example: MENUCMD "Empty Dumpster" rm-rf $LEADER/*

1.15 The BOUNDS Rule

Syntax: BOUNDS x0, y0, x1, y1

Figure 8A:
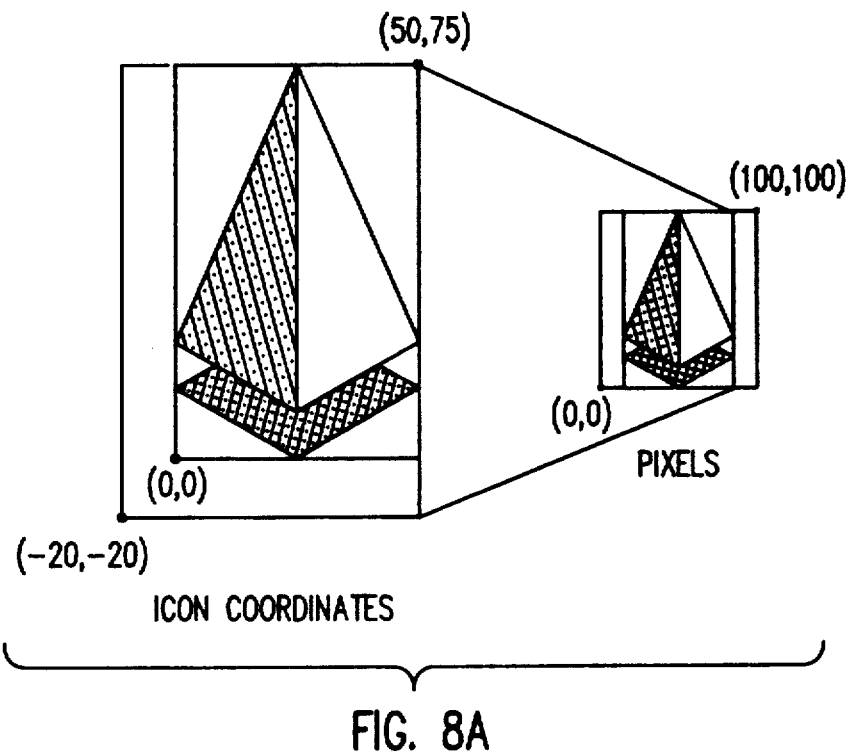
FIG. 8A illustrates mapping icons to pixels using the bounds rule of the file typing process of the present invention.

Description: x0, y0, x1, y1 define, respectively, the lower left and upper right corners of the bounding rectangle of the coordinate space in which the icon is displayed. The values are separated by commas (,). When the operating environment paints the icon, it scales the icon so that its bounds fit just within the fixed layout area reserved for it. The aspect ratio of the bounding rectangle is preserved. If no BOUNDS rule is supplied for a file type's icon, the bounding rectangle defaults to 0.0, 0.0, 100.0, 100.0. Referring to FIG. 8A, an example of as scaleable icon having the bounds −20.0, −20.0, 50.0, 75.0 is shown.

1.16 The ICON Rule

Syntax: ICON icon-description-routine

Description: icon-description-routine is a routine written using the icon description language, detailed below. The routine can continue for any number of lines. The ICON rule is invoked any time a file of the specified type needs to be represented in the operating environment or a directory view. The rule is evaluated each time the icon is painted by the application that needs it.

```
Example:  ICON color(iconcolor);
              bgnoutlinepolygon( );
                  vertex(0,0);
                  vertex(0,60);
                  vertex(40,60);
                  vertex(40,0);
              endoutlinepolygon(outlinecolor):
```

1.17 The Icon Description Language

The icon description language is a restricted subset of the C programming language, including line and polygon drawing routines from any well-known graphics library routine. The description routine for a given icon is similar in structure to a C subroutine, but lacking the subroutine and variable declarations and the outermost enclosing brackets. The valid symbols and functions in the icon description language are described below.

Operators

The following C language operators may be used in an icon description routine:

+ − * | & | ∧ ! % = 0 {}

The following C language conditional operators may be used in an icon description routine:

&& || == != <> <= >=

Constants

The following logical constants may be used in an icon description routine:

true false

The following icon color constants is described in Section 1.18, "Drawing Icons".

Variables

The following icon status variables are set by the operating environment, and may be used in an icon description routine:

current disabled opened located selected

These variables have values of either true or false. They can be used in a conditional statement to alter the appearance of an icon when it has been manipulated in various ways from the operating environment (see Section 1.18, "Drawing Icons").

Other legal C variables may be used in an icon description routine without need of a declaration; all variables are represented as type float. Any variable name is acceptable, provided it does not collide with any of the predefined constants, variables or function names in the icon description language.

Functions

The icon description functions comprise, for the most part, a very restricted subset of the C language version of a graphic library routine modified for 2-D drawing. Table III describes the set of valid icon description functions.

TABLE IIIA

| Function Syntax | Definition |
|---|---|
| arc (x,y,r,startang, endang) | Draw an arc starting at icon coordinates x, y, radius r, starting at angle startang, ending at angle endang. Angle measures are in tenths of degrees. |
| arcf (x,y,r,stratang, endang) | Like arc, but filled with the current pen color. |
| bclos (color) | Like pclos (see below) but uses color for the border (outline) color of the polygon. |
| bgnclosedline ( ) | Begin drawing a closed, unfilled figure drawn in the current pen color. Used in conjunction with vertex and endclosedline. |
| bgnline ( ) | Like bgnclosedline, except the figure is not closed. Used in conjunction with vertex and endline. |
| bgnoutlinepolygon | Begin drawing a polygon filled with the current pen color. The polygon is outlined with a color specified by endoutlinepolygon. Also used in conjunction with vertex. |
| bgnpoint ( ) | Begin drawing a series of unconnected points defined using calls to vertex. Used in conjunction with vertex and endpoint. |
| bgnpolygon ( ) | Like bgnoutlinepolygon except the polygon is not outlined. Used in conjunction with vertex and endpolygon. |
| color (n) | Set current pen color to color index n. |
| draw (x,y) | Draw a line in the current color from the current pen location to x, y. |
| endclosedline ( ) | Finishes a closed, unfilled figure started with bgnclosedline. |

TABLE IIIB

| Function Syntax | Definition |
| --- | --- |
| endline ( ) | Finishes an open, unfilled figure started with bgnline. |
| endoutlinepolygon (color) | Finishes a filled polygon started with bgnoutlinepolygon and outlines it with color. |
| endpoint ( ) | Finishes a series of points started with bgnpoint. |
| endpolygon ( ) | Finishes a filled, unoutlined polygon stared with bgnpolygon. |
| for | Standard C for-loop. |
| if (expr) expr [ else expr ] | Standard C language if-statement. |
| move (x,y) | Move current pen location to x, y. |
| pclos ( ) | Draw a line in the current pen color that closes the current polygon, and fill the polygon with the current color. |
| pdr (x,y) | Draw the side of a filled polygon in the current pen color, from the current pen location to x, y. |
| pmv (x,y) | Begin a filled polygon at location x, y. |
| print (expr of "string") | prints the value of the expression expr or string to stdout; used for debugging |
| vertex (x,y) | Specifies a coordinate used for drawing points, lines, and polygons by bgnpoint, bgnline, bgnpolygon, etc. |

1.18 Drawing Icons

Any points, lines, or polygons the user draws will "stack" in the order they are drawn, with the most recently drawn polygon on top. This concept is used to easily achieve drop-shadow effects, by drawing the same polygon twice, using different pen colors, and offset.

There are three icon color constants are recommended for standard icon use; iconcolor for drawing polygons that make up the "foreground" of the icon, outlinecolor for outlining and linework, and shadowcolor for contrasting drop shadows. iconcolor is particularly useful, because it automatically changes to the calling application's preferred color conventions when a given icon is located, disabled, or selected.

The various icon status variables are used to change the appearance of an icon when it is opened, located, selected, or disabled. The following code fragment illustrates how to draw an icon that changes appearance when it was opened:

```
ICON if (opened) {
         ... drawing routines for opened icon ...
      } else {
         ... drawing routines for unopened icon ...
      }
```

1.19 Suggested Style Conventions

The following is a list of suggested style conventions to maintain when drawing icons:

Use the iconcolor, outlinecolor, and shadowcolor as your icon's typical colors. Be sparing with the use of other accenting colors. This will help preserve the impact of color when it is needed.

Create icons that maintain the overall 3-D appearance that the basic operating environment icons may have. Most operating environment icons are displayed at an angle that emphasizes the third dimension. If icons are drawn using the axes described in FIG. 8B, the same effect may be achieved.

The generic executable and generic data file icons establish extensible themes that increase the user's ability to recognize his own icons. ICON rules from the standard system and default FTR files may be used as a background for unique representations.

1.20 Compiling FTR Rules

New FTR rules must be compiled from the FTR source files located in a set of directories in /usr/lib/filetype. Any time you add or change FTR rules (or print conversion rules) within these subdirectories, you must recompile the complete set of .ftr files. This is done by performing the following command line sequence:

```
su
cd /usr/lib/filetype
make
```

1.21 Order of Precedence of FTR Files

FTR source files in the following four directories are compiled in the order listed here:
1. /usr/lib/filetype/local
2. /usr/lib/filetype/install
3. /usr/lib/filetype/system
4. /usr/lib/filetype/default Since compiled rules are scanned sequentially by the operating environment, a TYPE defined in local will override any subsequently defined TYPE with an identical type-name. Care should be taken so as not to so override important system or default TYPE declarations.

Within each directory, separate FTR source files are compiled alphabetically.

1.22 Placement of FTR Rules

The default and system directories in /usr/lib/filetype are reserved. Developers and users should not place their .ftr files in these directories. The install directory should be used by applications developers and site maintainers for integrating their extensions. The local directory may be used by power end-users for personal customizations.

SUMMARY

Figure 11:
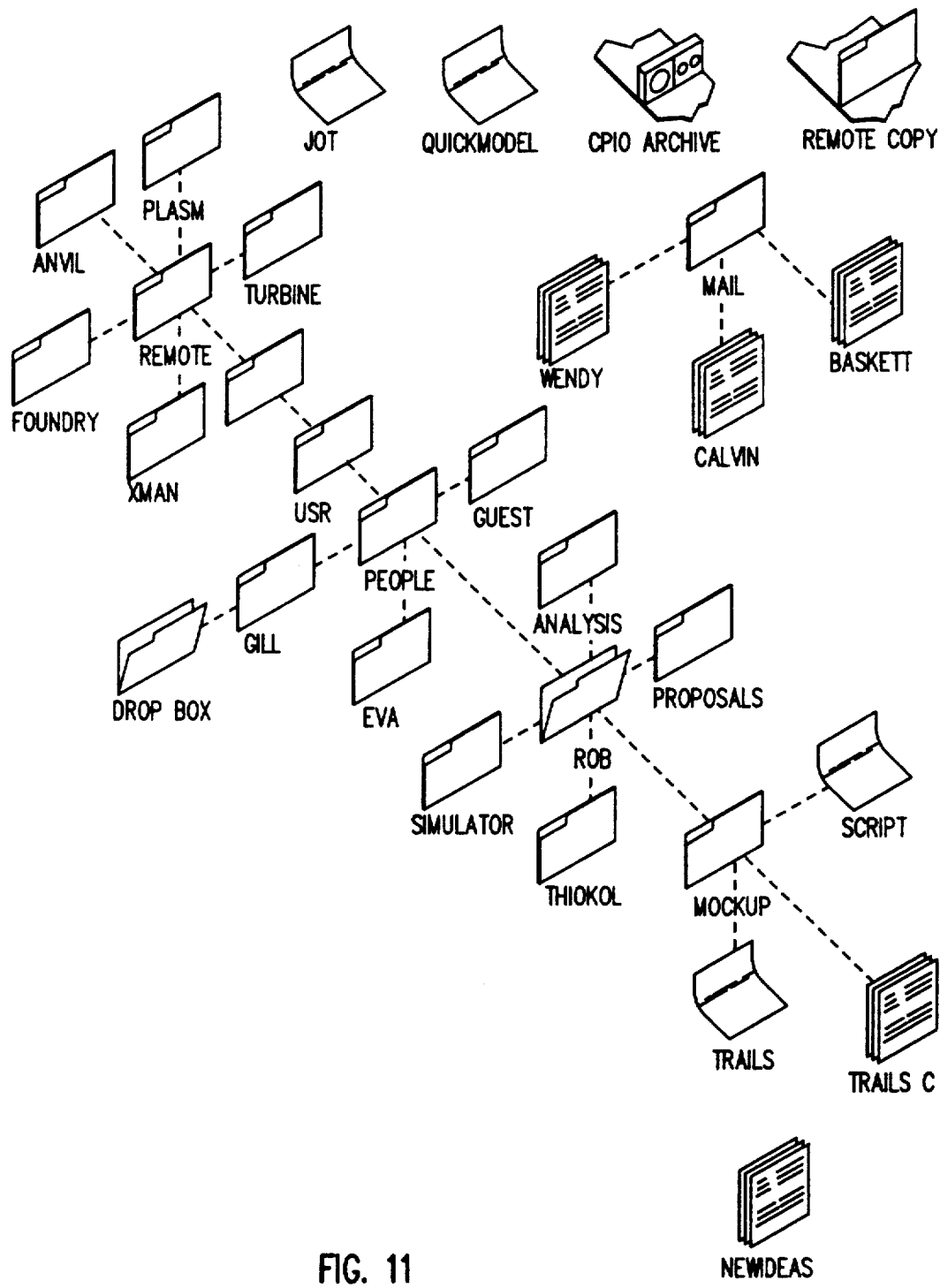
FIG. 11 is a face view of an iconic interface for a computer file system characterized by the file typing process of the present invention.

Referring now to FIG. 11, the operating environment utilizing the file typing rules of the present invention provides an iconic interface to a UNIX-based file system, where users can easily find their data and run their applications in a visually organized environment. When the environment is run, the user is presented with a central organizing window. This window is populated with a set of graphical icons, providing a summary overview of the file system. Path lines connect the icons together in a tree structure, revealing the underlying file hierarchy. Icon shapes indicate the type of file being represented (directory, executable, data file, etc.), and each icon is captioned with the name of its corresponding file.

Typical file operations such as rename, move, copy, and remove can all be accomplished from the environment, using the mouse to select and drag icons and to invoke pop-up menu commands. Double-clicking an icon causes it to "Open", invoking the appropriate action assigned to that file type. For instance, Opening a text file's icon brings up the user's preferred text editor on that file. Similarly, Opening an executable file launches the selected application, and Opening a directory icon brings up a new window, presenting a directory view of its contents. The directory view shares the same iconic semantics as the environment providing a visual "cd; pwd; ls" to access the files within a given Unix directory.

The iconic interface within the environment itself is implemented via an object-oriented toolkit, developed in C++. This toolkit provides a standard look and feel for the environment and a host of related system utilities, and may be written on top of any well-known graphics library routine to support high-performance dynamics in the interface.

In use, the environment interprets the contents of the file system via a File Typing Engine, which is driven from an external set of File Type Rules (FTRs). Each file node encountered in the file system is passed to the Typing Engine. The characteristics of that file are compared against each of the FTR criteria in turn, until a match is found and a Type is assigned. With the assigned Type comes a methodology for displaying and operating upon the Typed file.

When the user selects a file's icon and invokes a command (such as Open or Print, for instance), the Typing comes into play again. The file's Type and the command token (e.g. OPEN or PRINT) are used as keys into the FTR database, returning a corresponding command string. This command string is literally passed to the Unix shell (sh) for evaluation, using a predefined set of environment variables to communicate selections, preferences, and other handy parameters to the execution environment.

File typing is always conducted on-the-fly, directly out of the file system itself, to insure an accurate, current representation. However, icon positions and other viewing information not intrinsic to the file system itself are maintained by the operating environment in its own per-user database. This facility provides the user with continuity of operation from one session to the next.

Figure 8B:
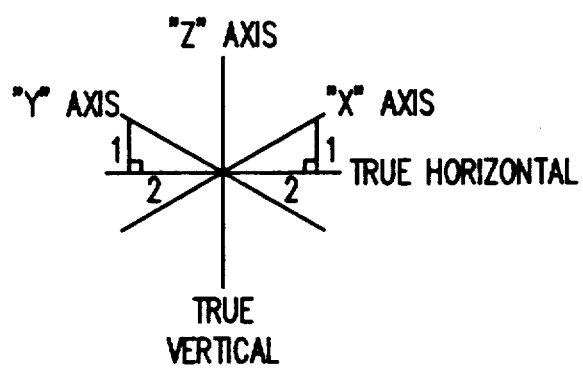
FIG. 8B illustrates axes for 3-D icons using the style conventions of the file typing process of the present invention.
Figure 9A:
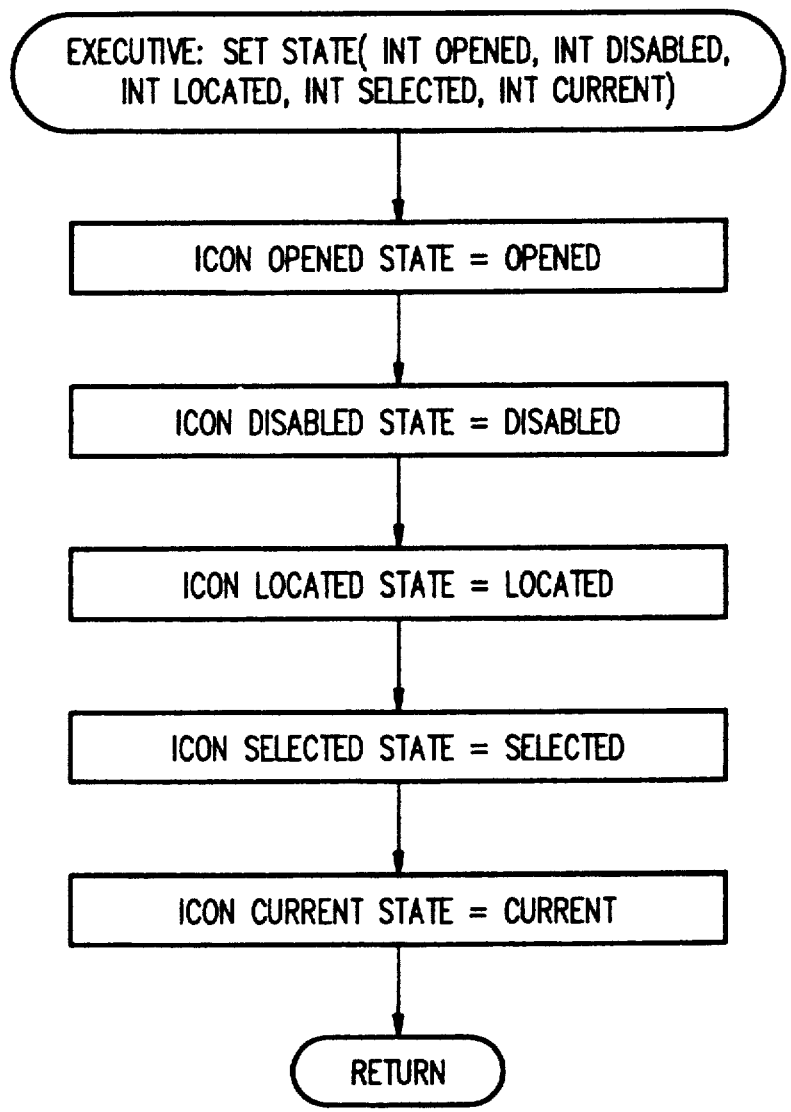
FIG. 9A is a flow diagram of the executive program for setting the state of icons, according to the present invention.
Figure 9B:
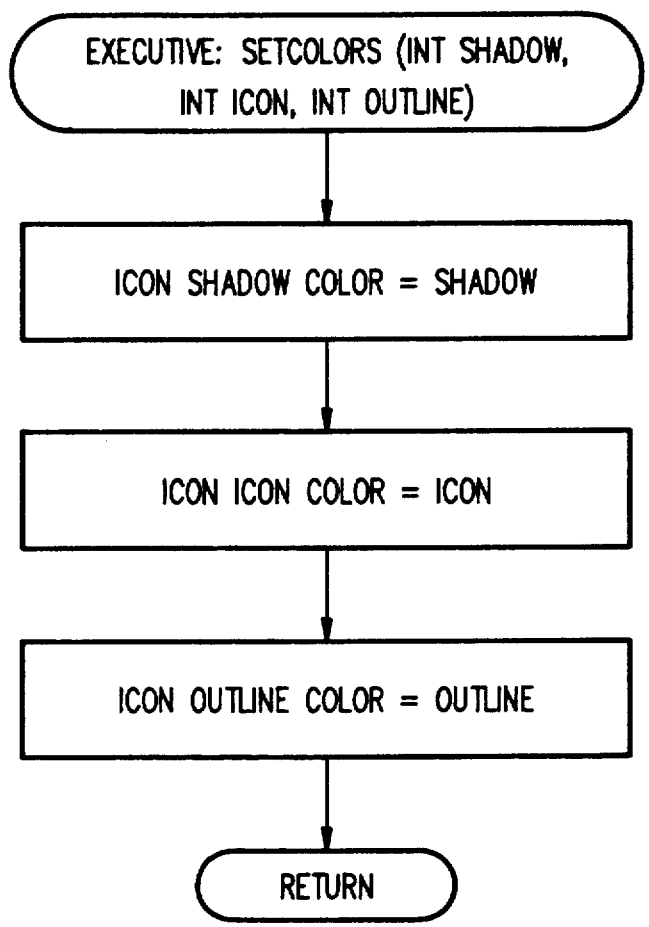
FIG. 9B is a flow diagram of the executive program for setting the colors of icons, according to the present invention.
Figure 10A:
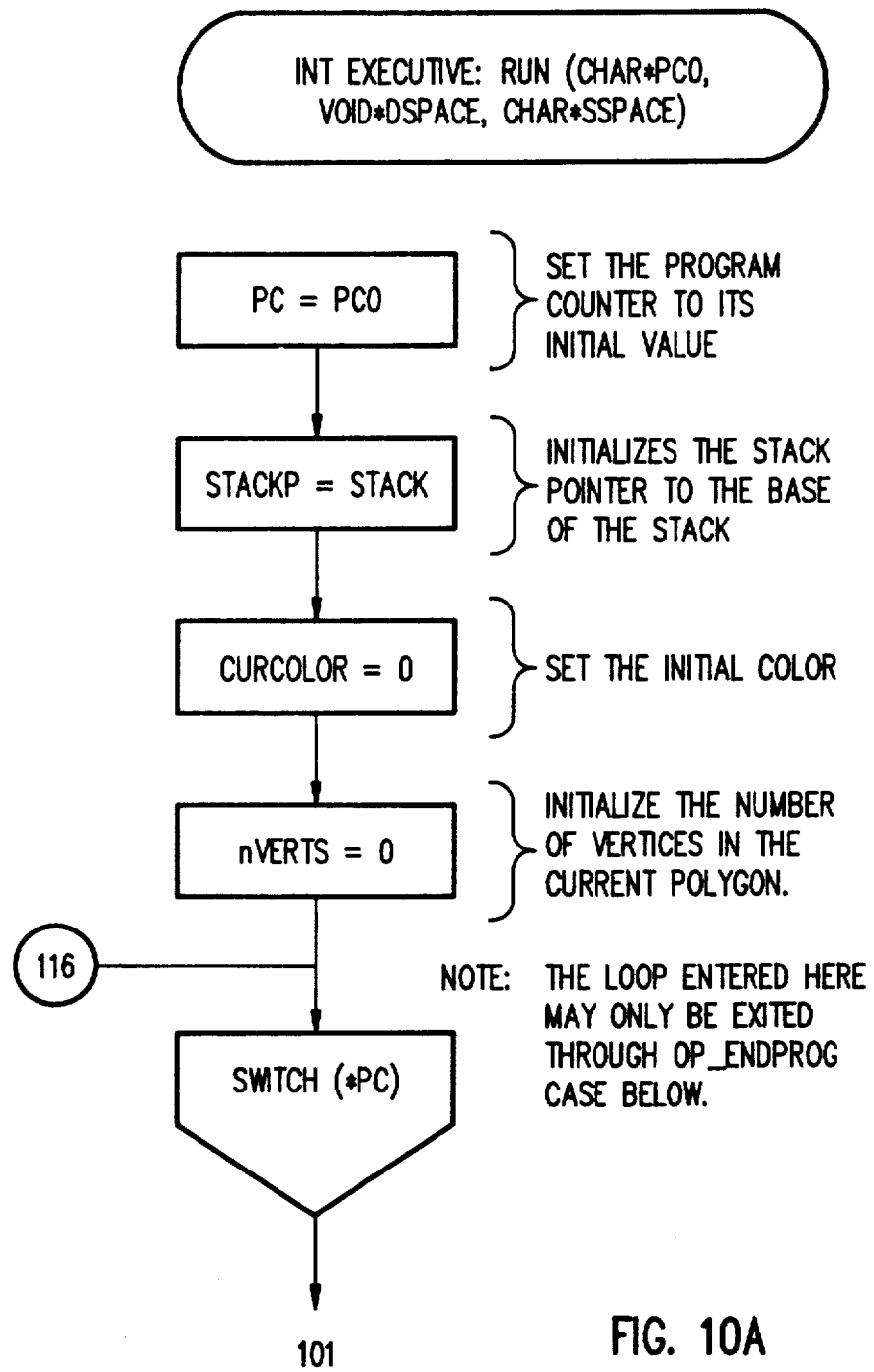
FIGS. 10A-10P, inclusive, is a detailed flow diagram of the iconic rendering process of the present invention.
Figure 10B:
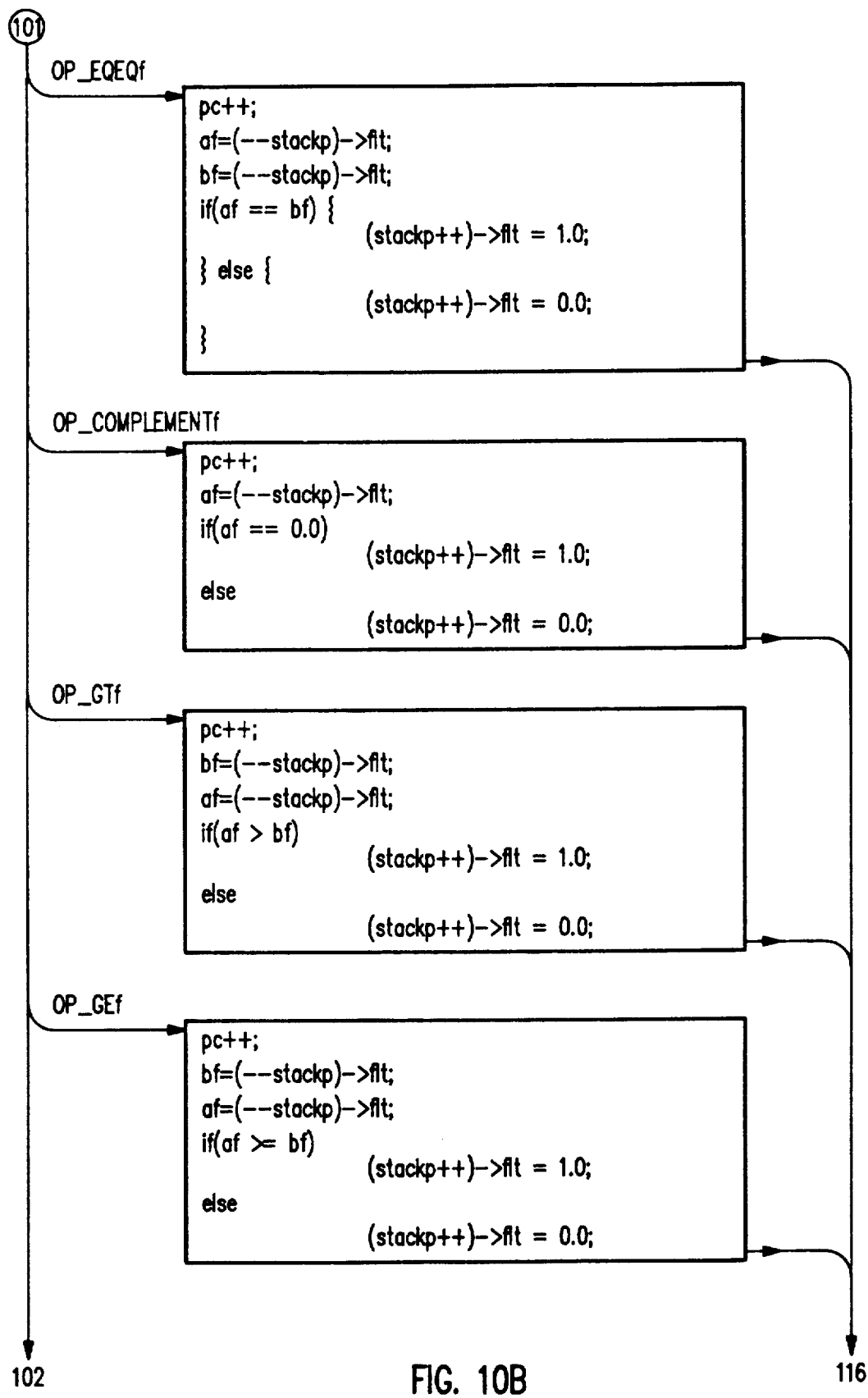
Figure 10C:
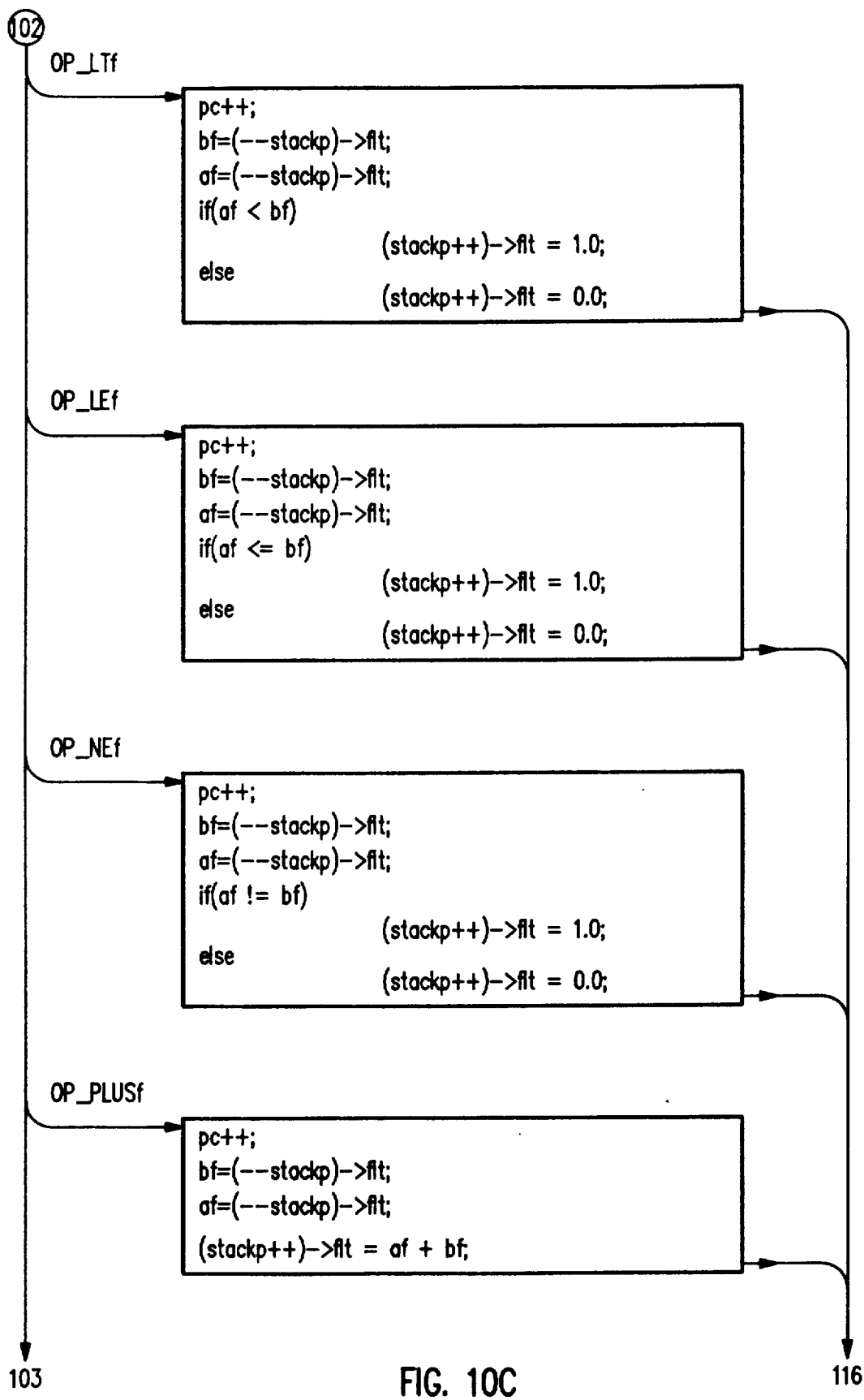
Figure 10D:
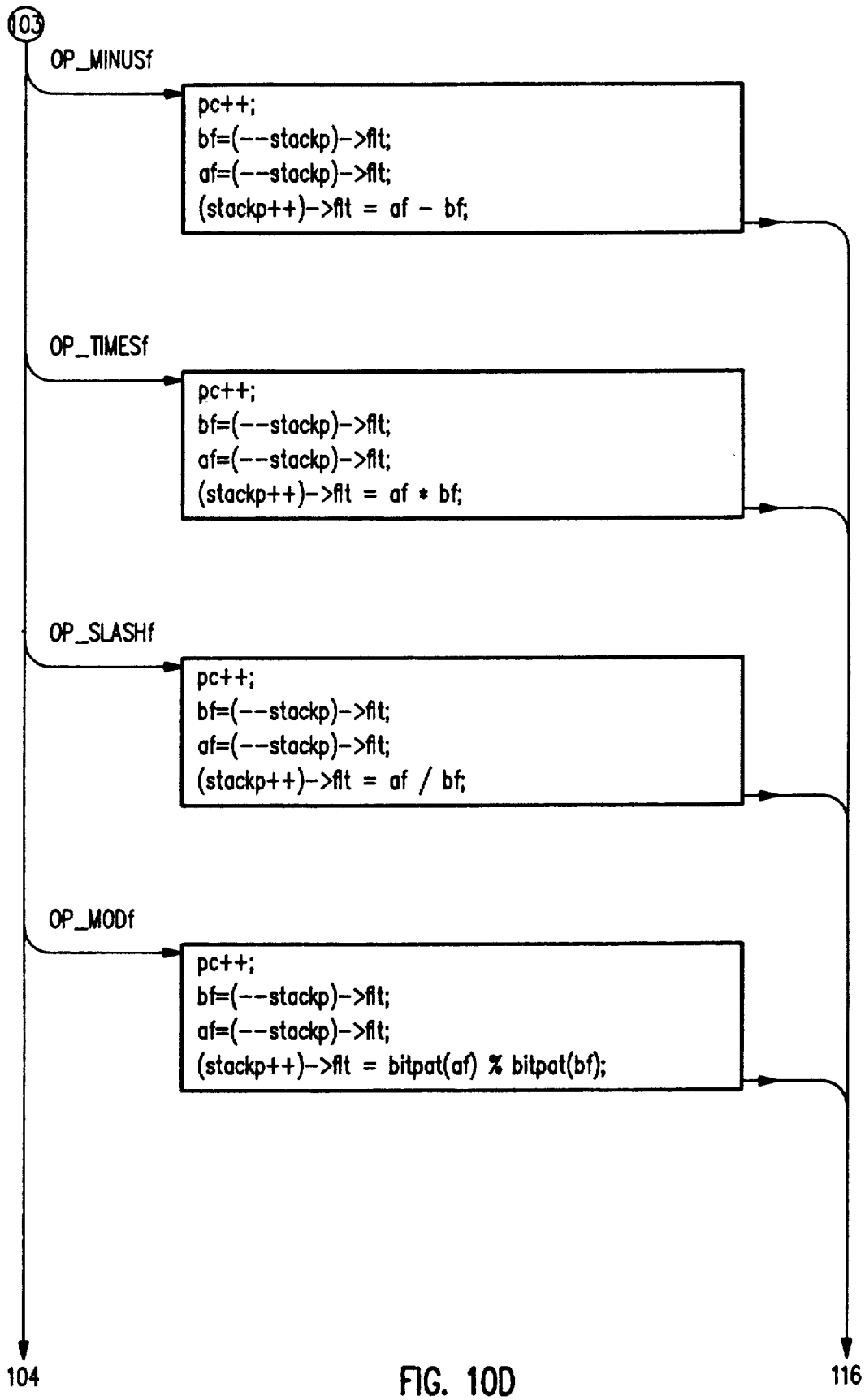
Figure 10E:
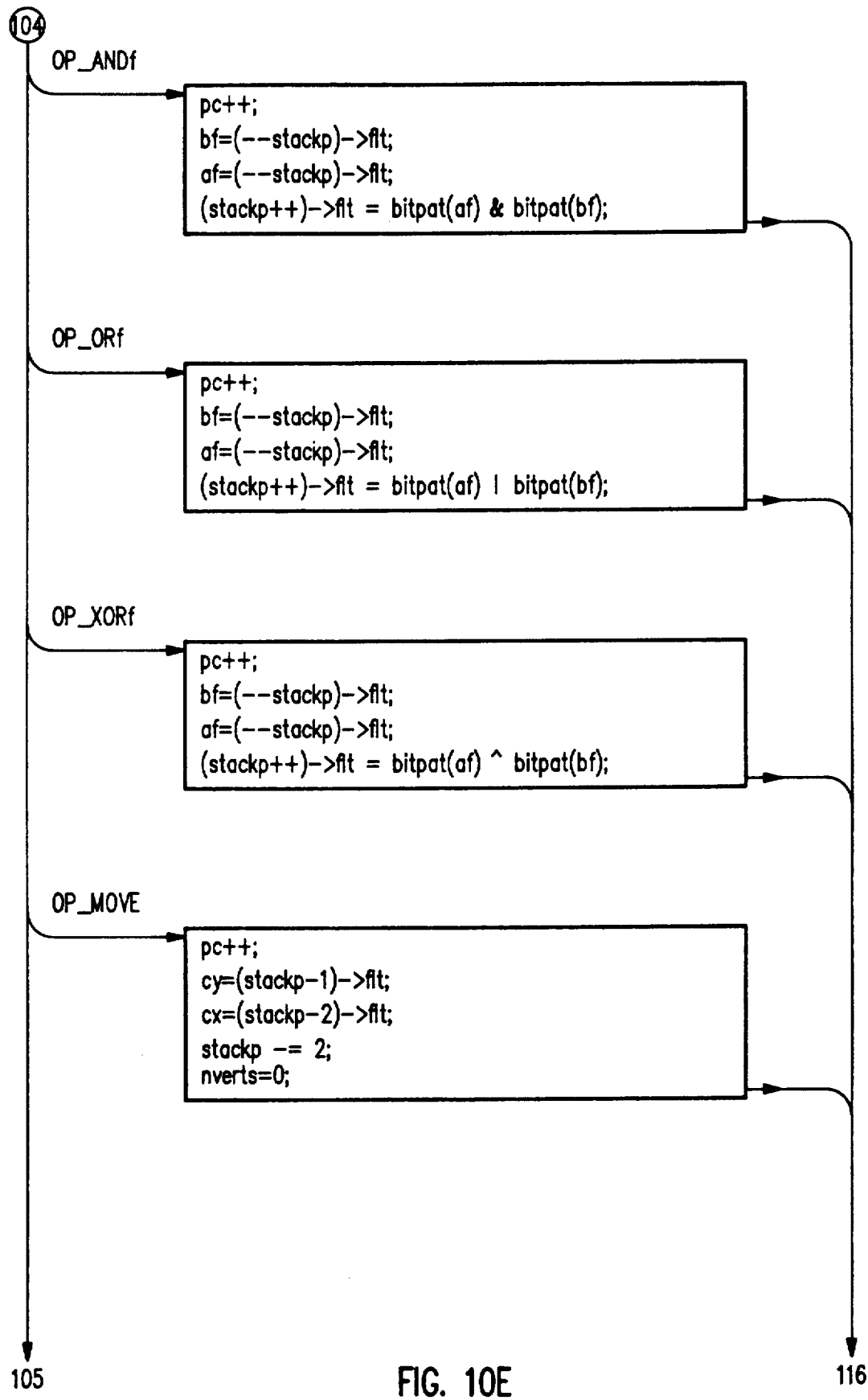
Figure 10F:
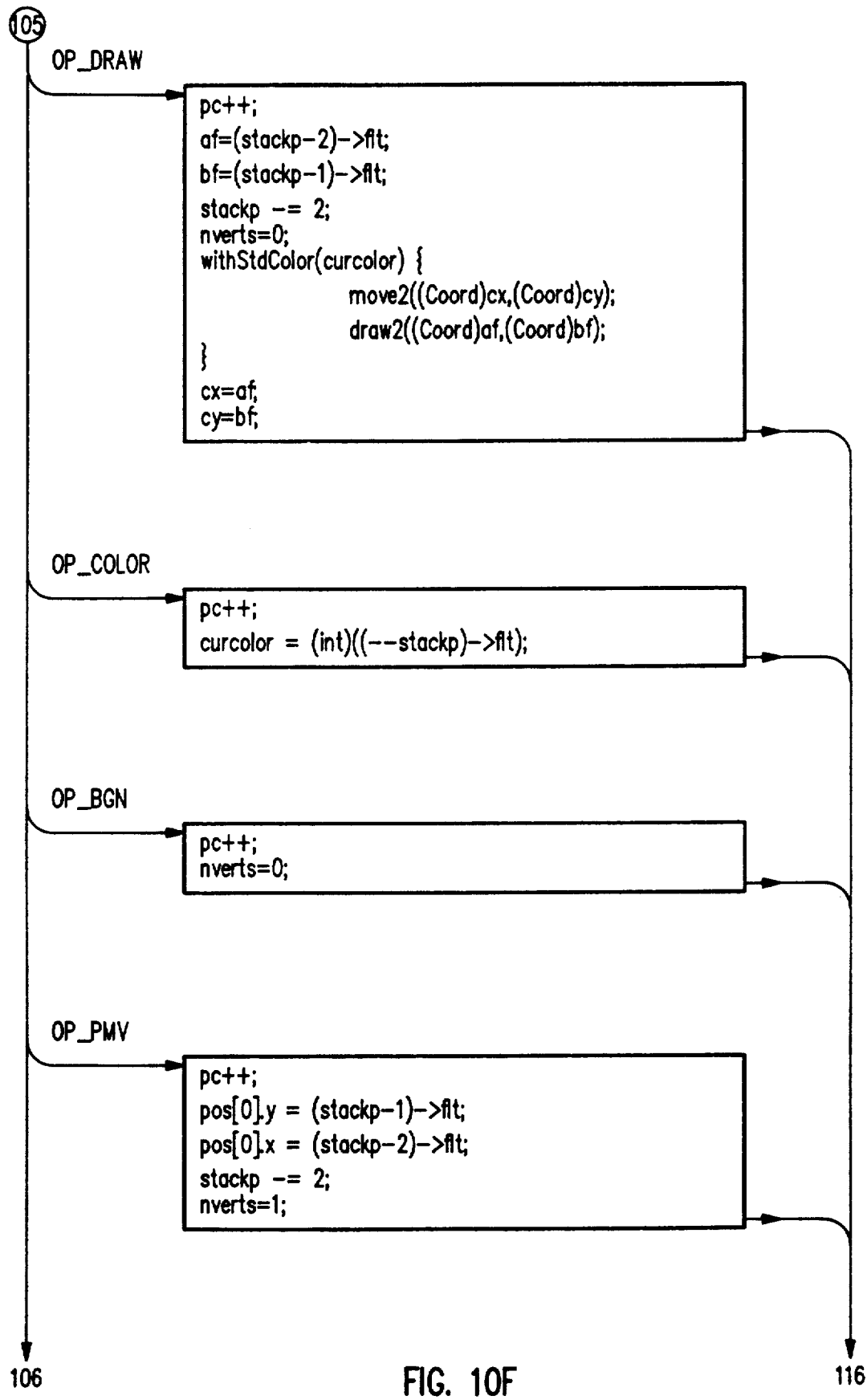
Figure 10G:
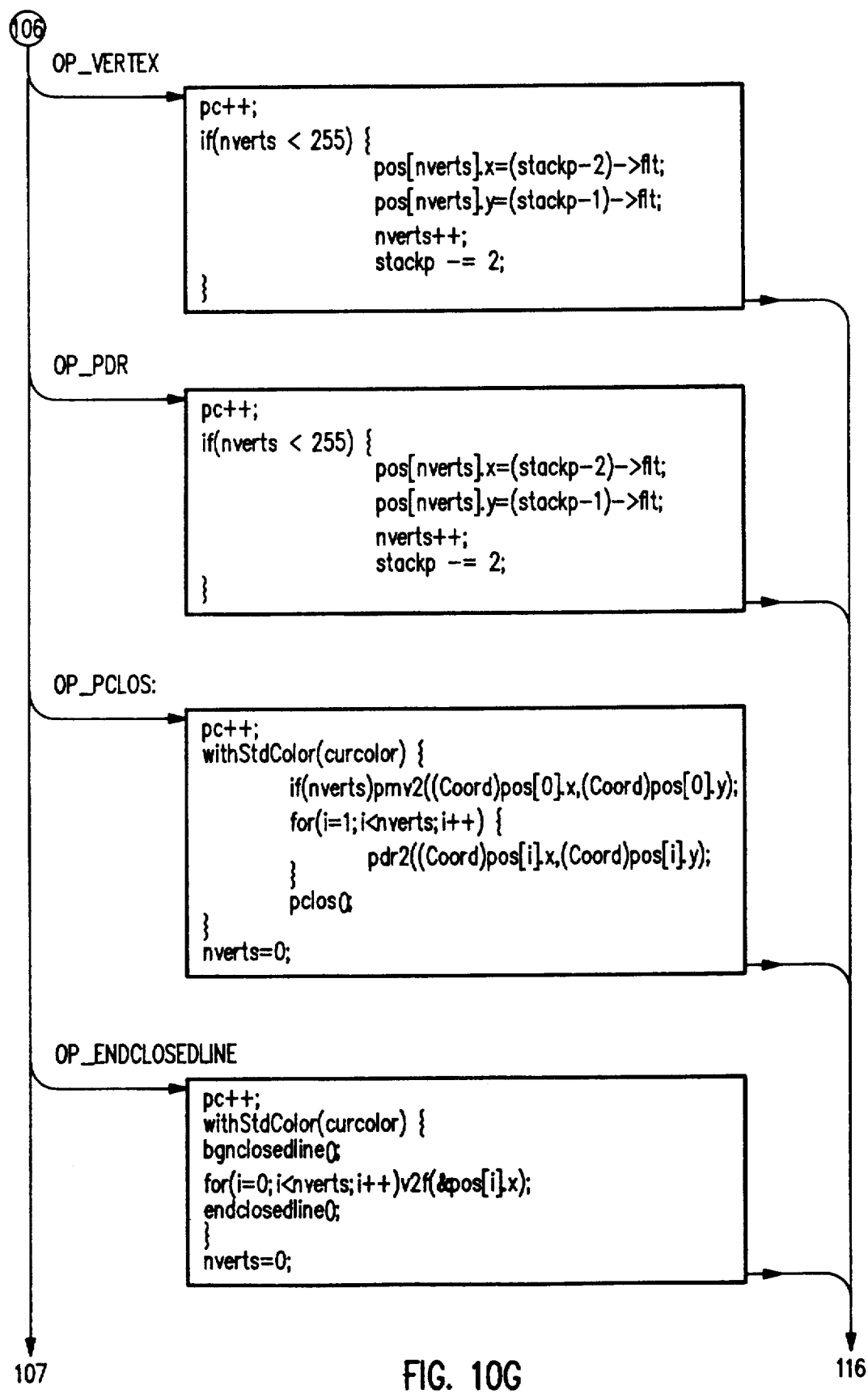
Figure 10H:
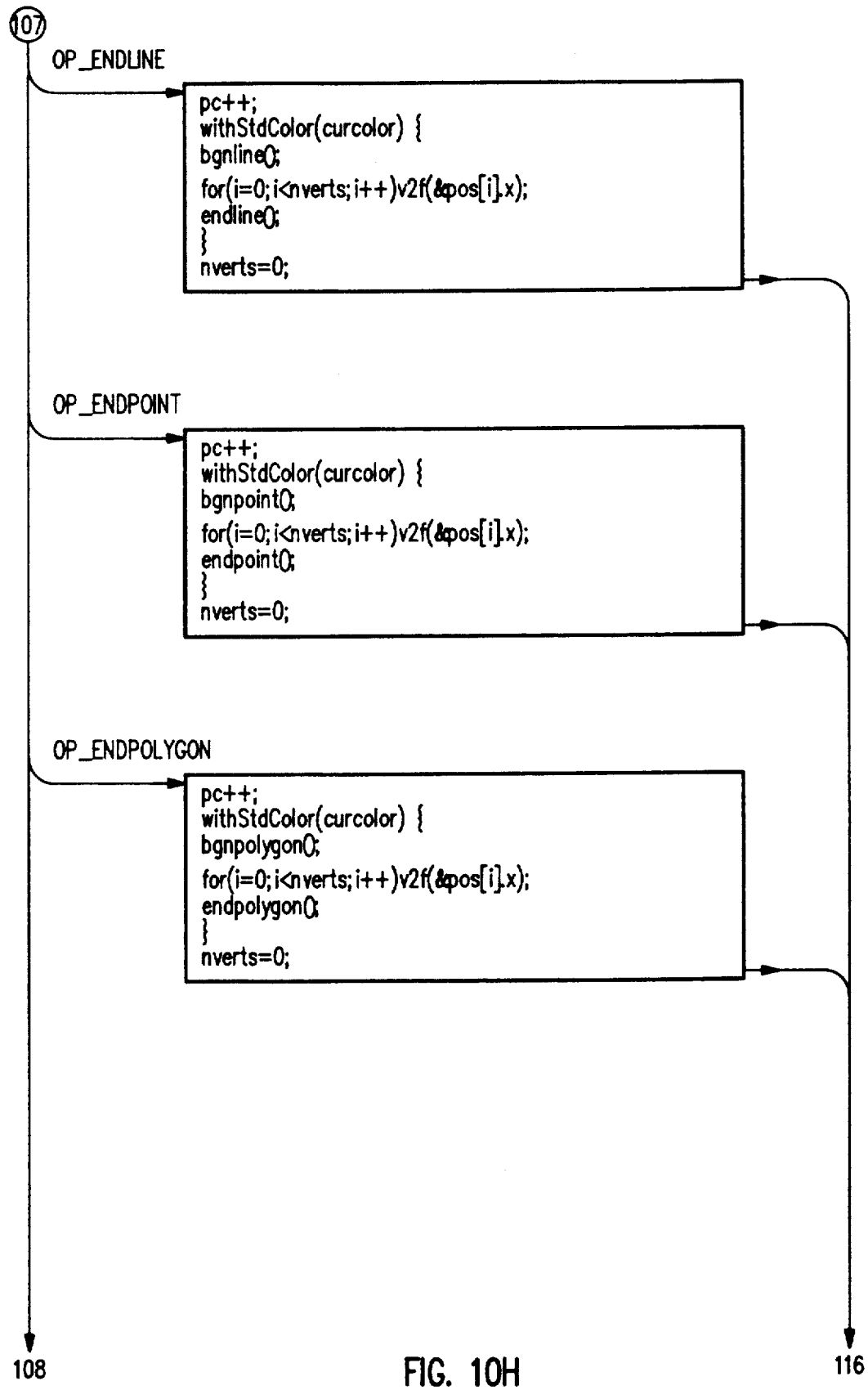
Figure 10:
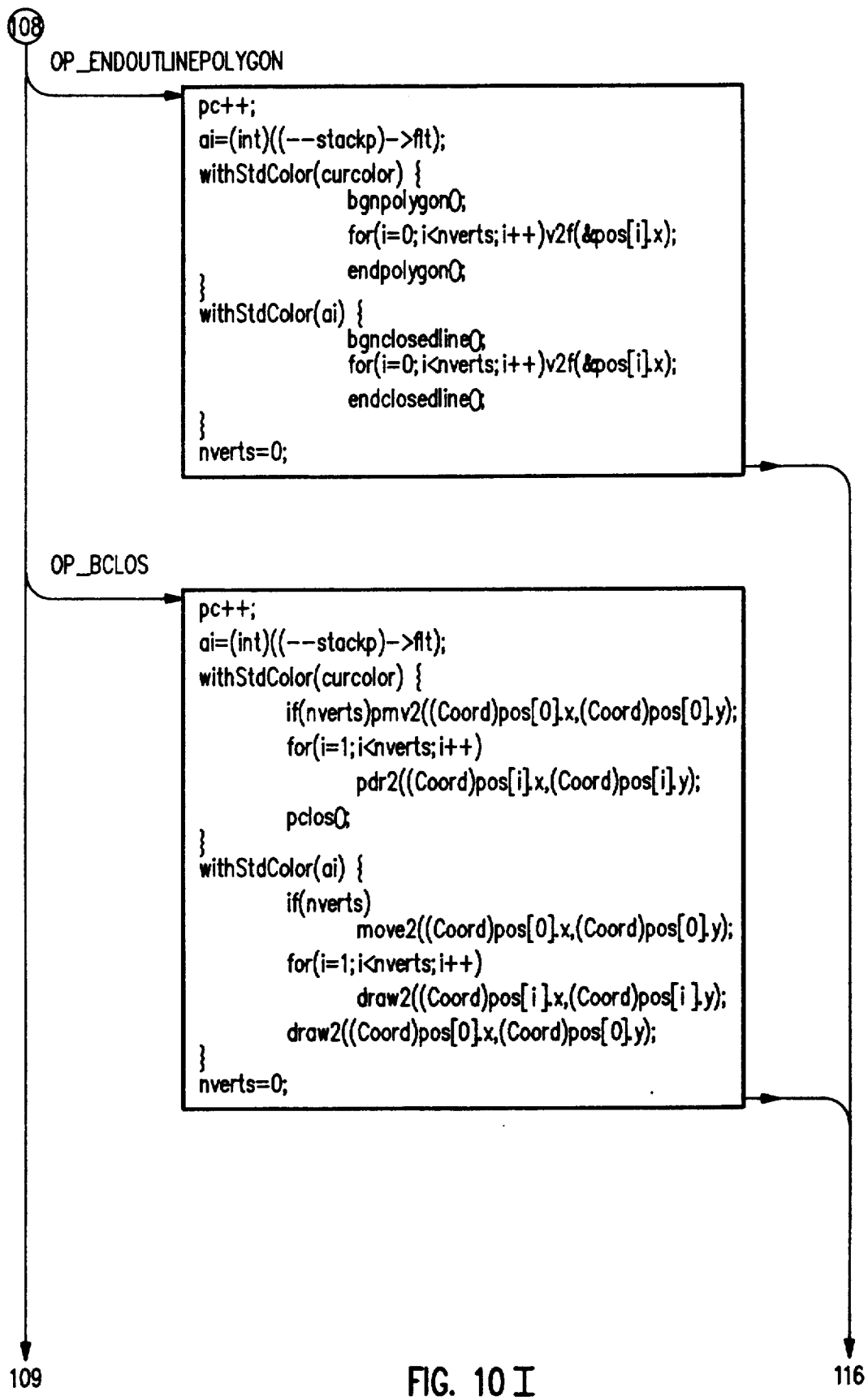
Figure 10J:
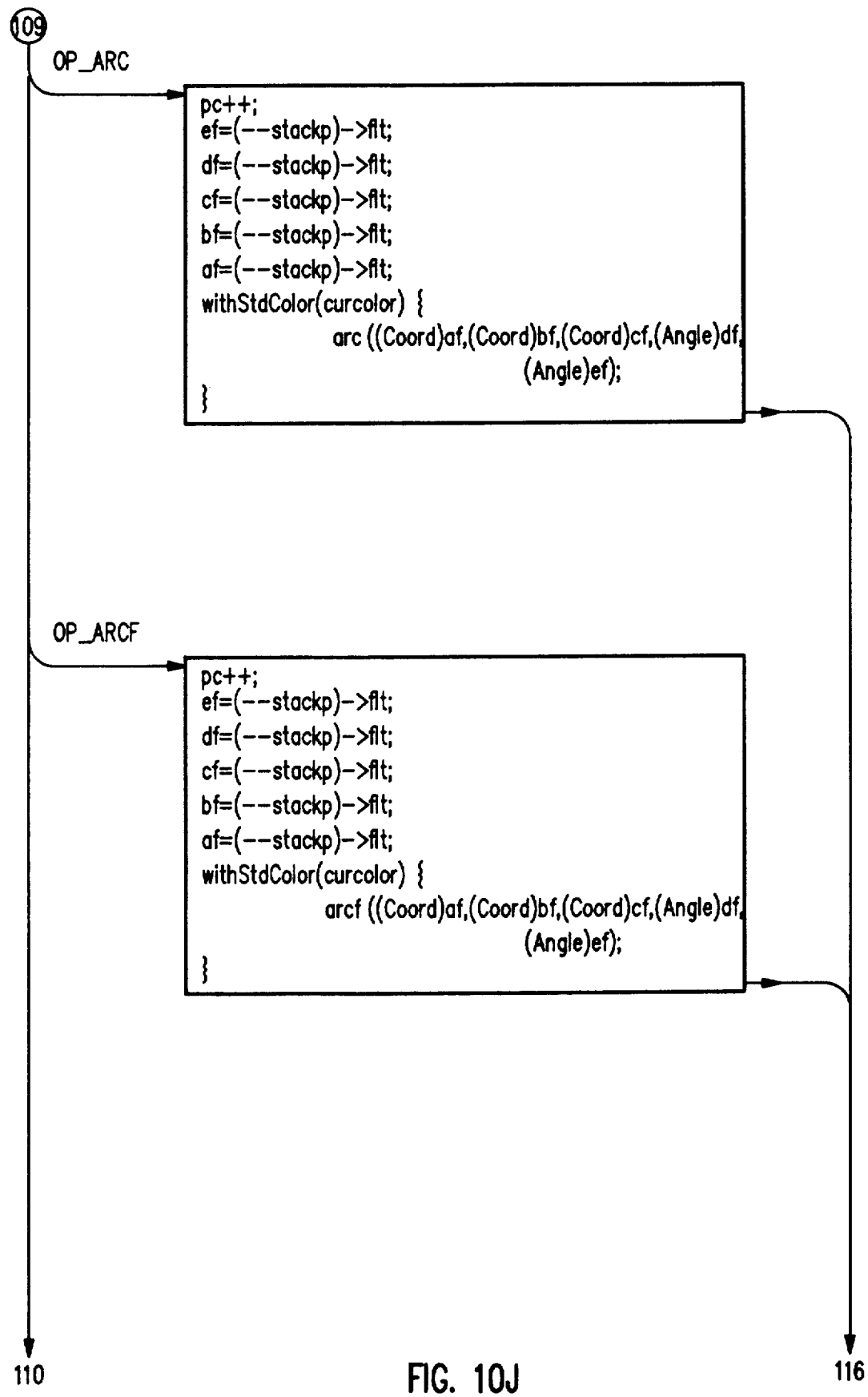
Figure 10K:
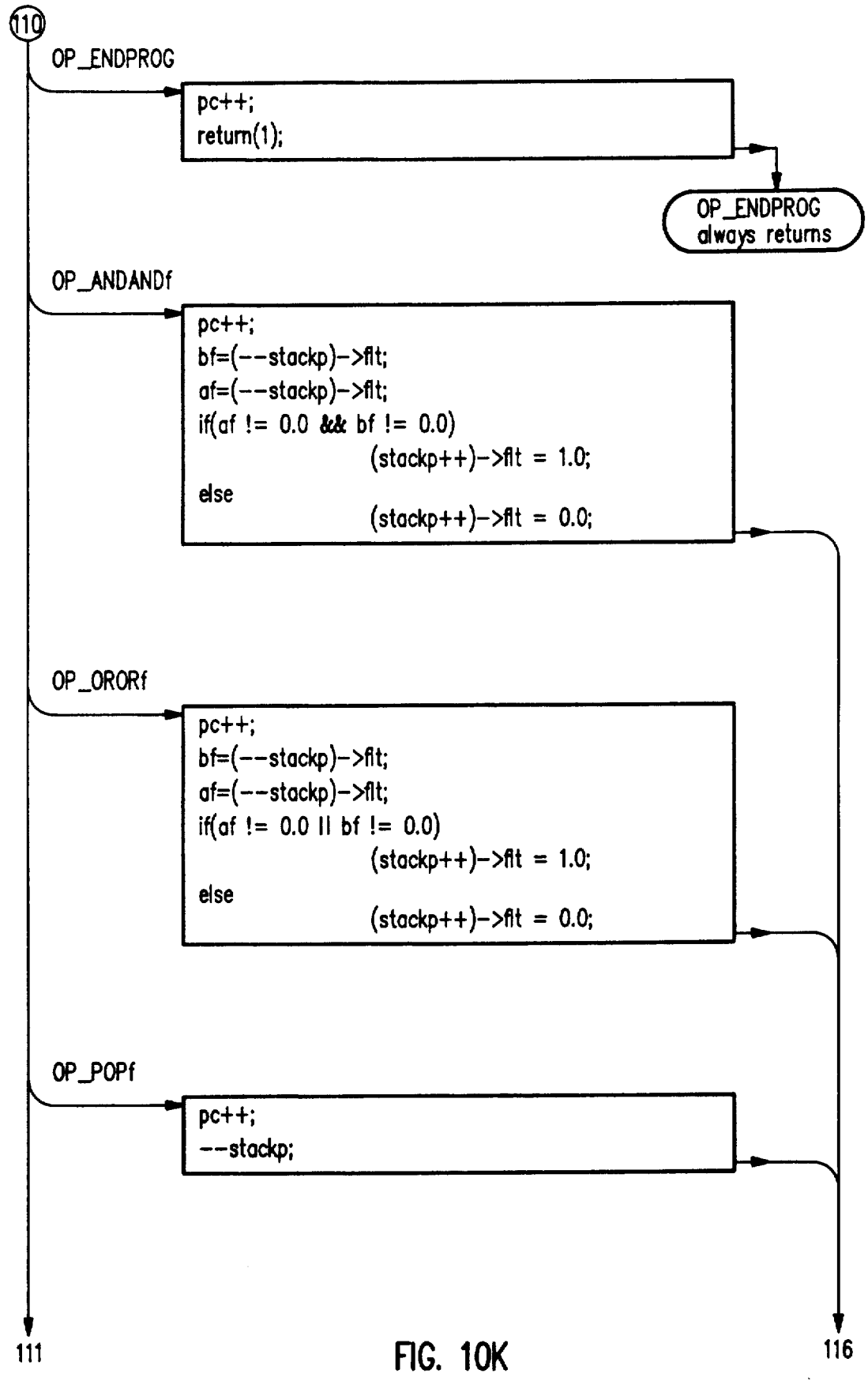
Figure 10L:
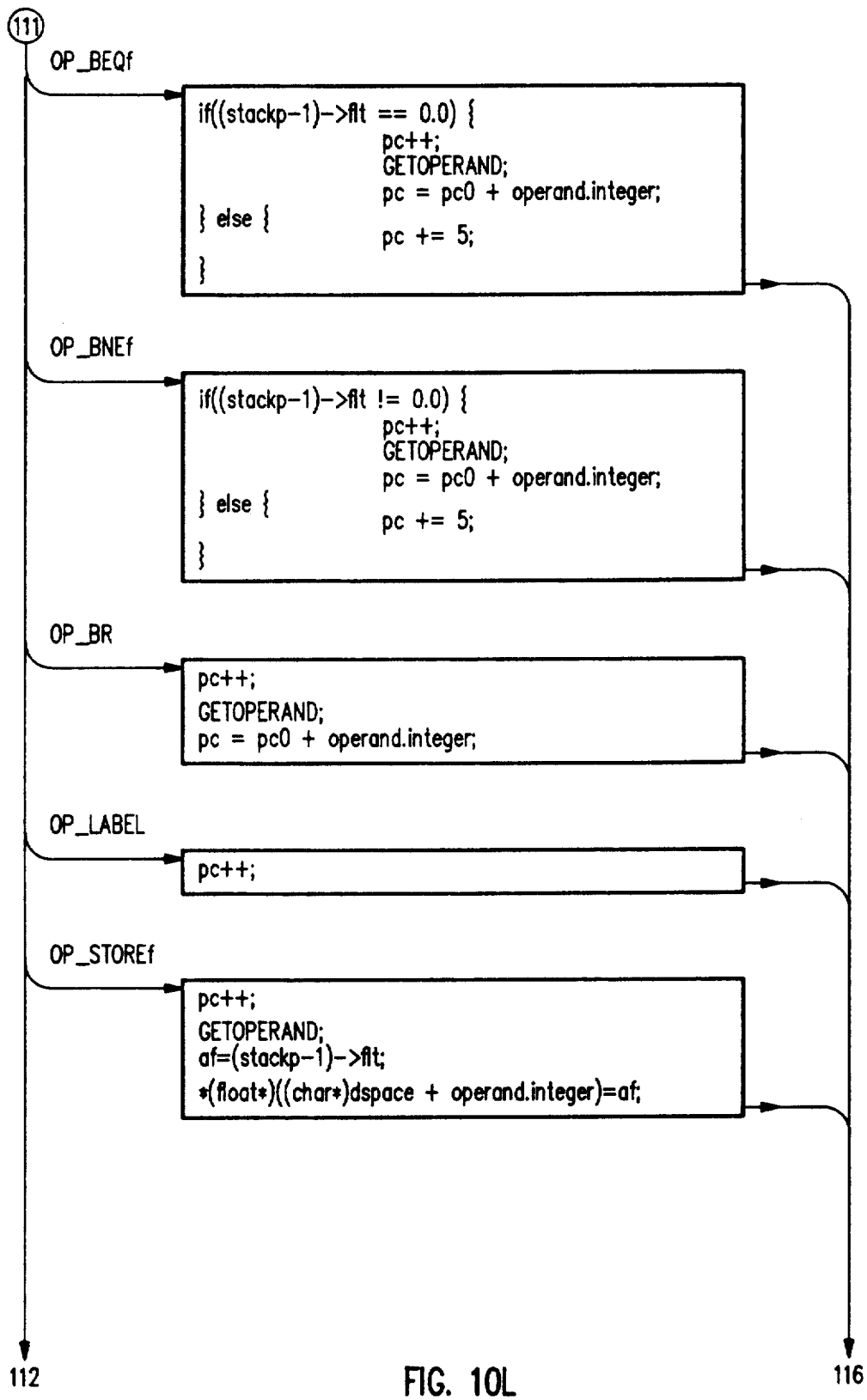
Figure 10M:
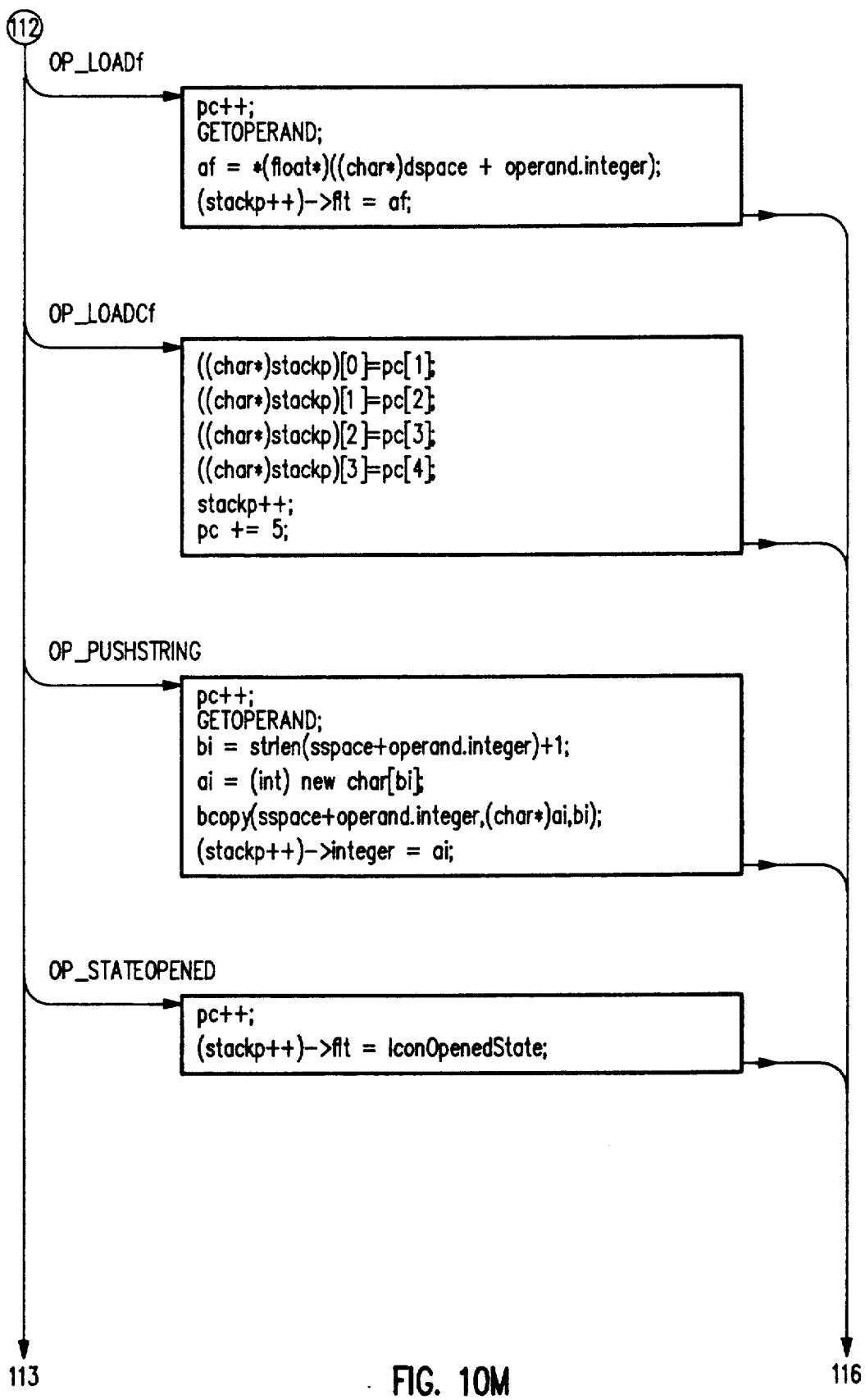
Figure 10N:
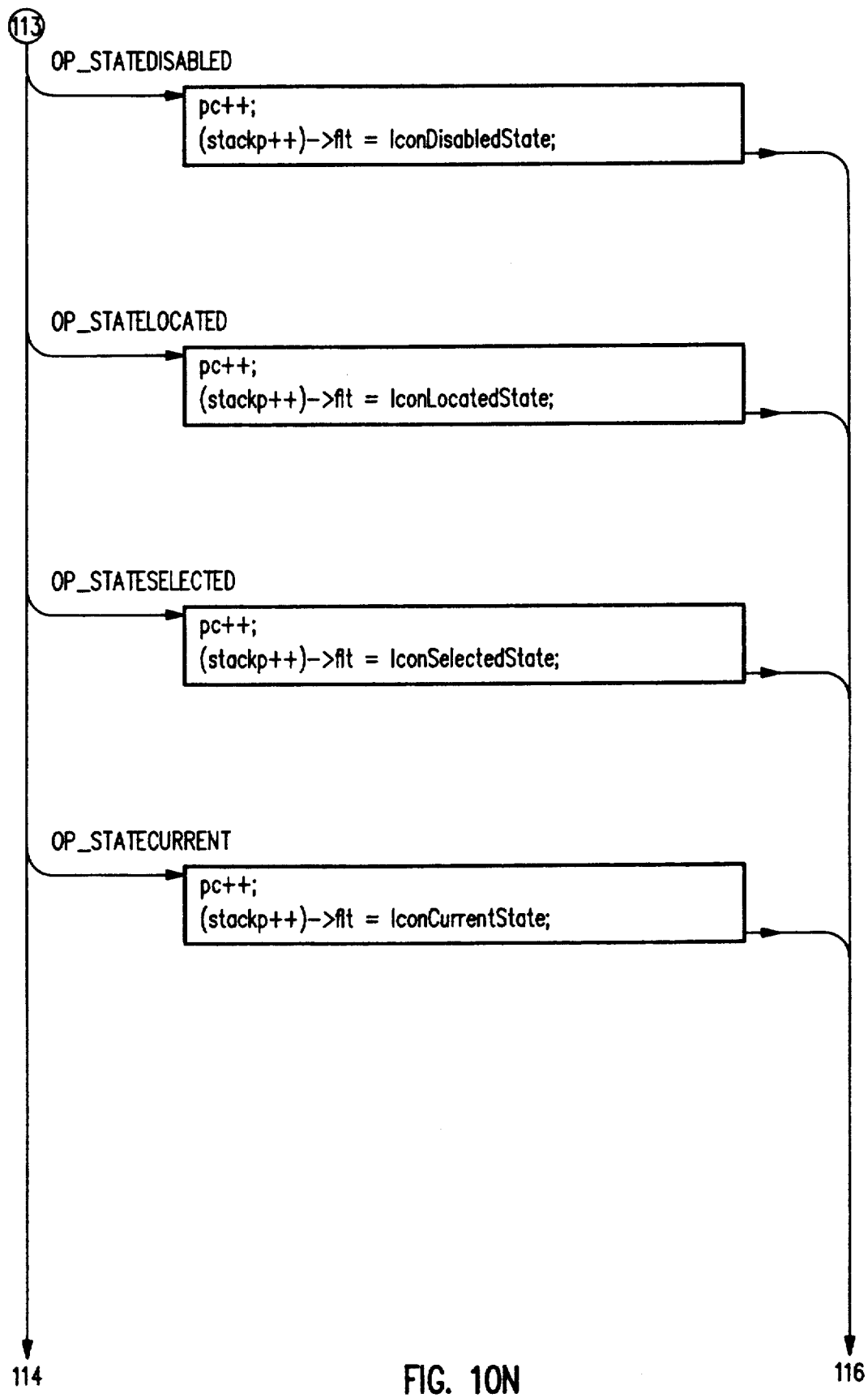
Figure 10O:
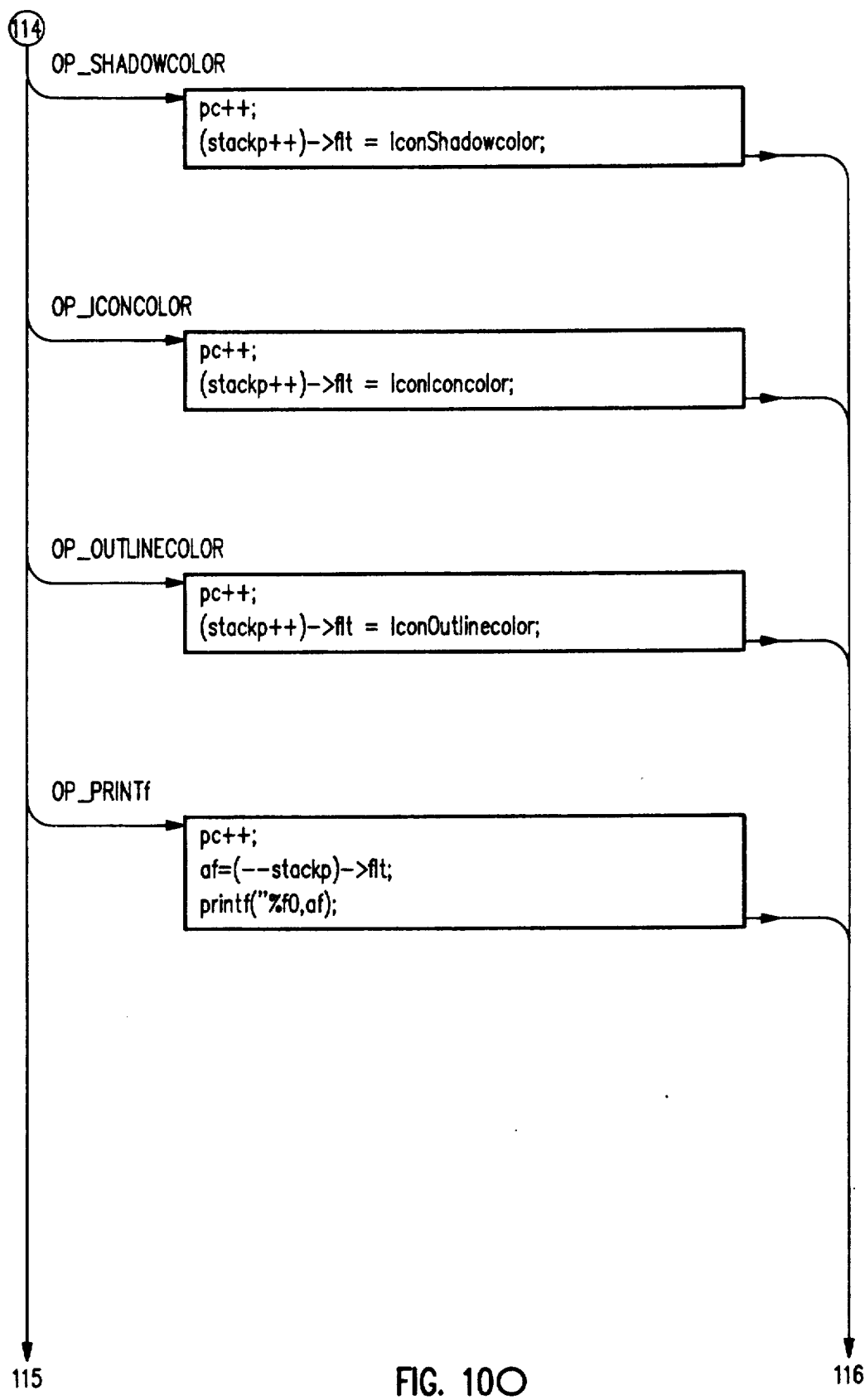
Figure 10P:
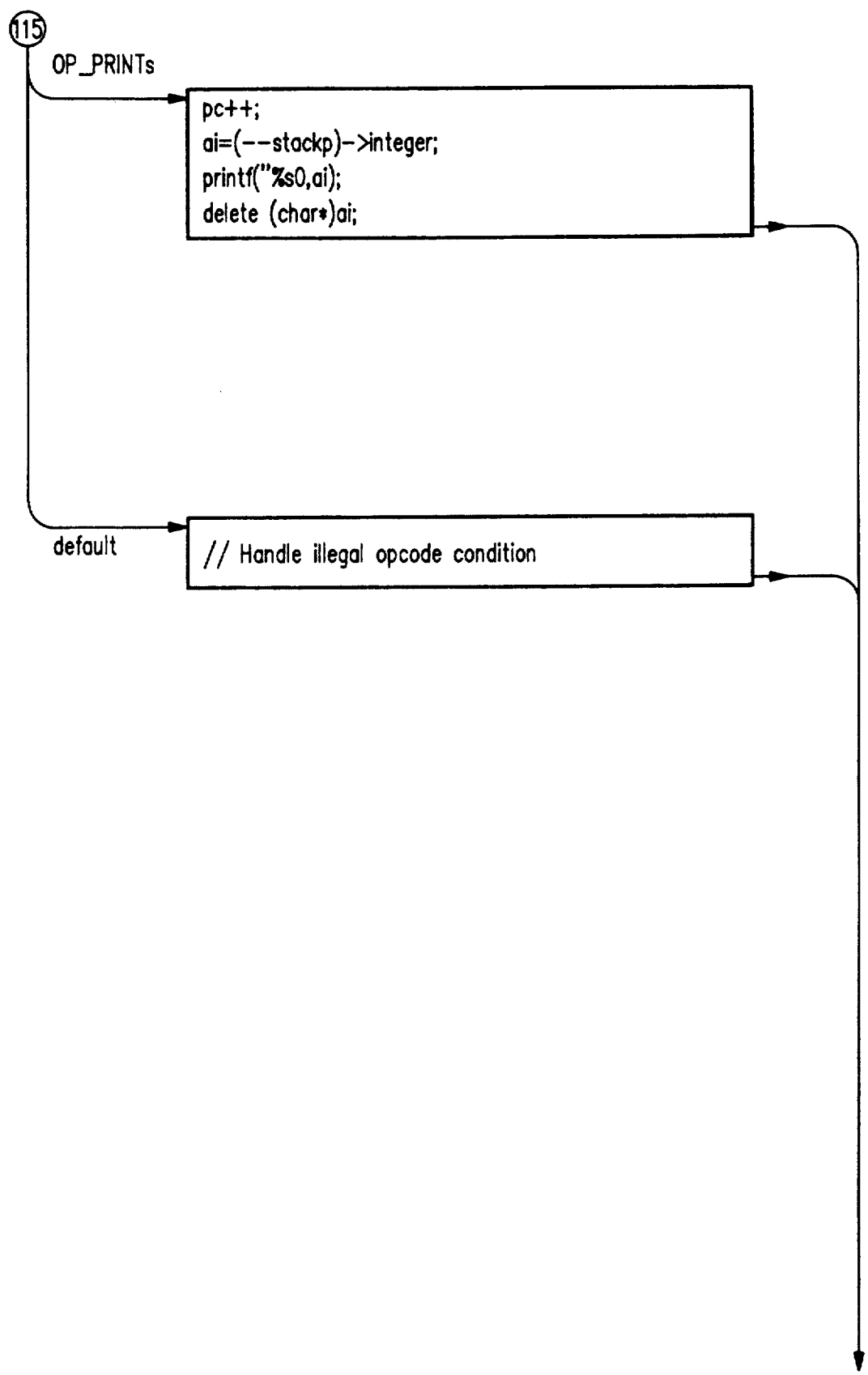

Icons are drawn using a small icon description language imbedded within the FTRs. While all icons may be described in 2D coordinates, projective geometry guidelines should be followed to establish a consistent 3D look across the operating environment. An isometric approximation is used as shown in FIG. 8B, with the X and Y axes drawn at a slope of 1 pixel up, 2 pixels across, and a Z axis drawn vertically. The color variable "iconcolor" is preset when the icon is drawn, so that it accurately reflects the current state of the icon, whether quiet, locate highlighted, or select highlighted. Significant areas of an icon should be filled with "iconcolor" to enable the user to readily distinguish the icon's state.

While preferred forms and arrangements have been described in illustrating the present invention, it is to be understood that various changes in detail and arrangement may be made without departing from the spirit of the present invention or from the scope of the appended claims. In particular, while the present invention is implemented under one version of the UNIX system, it should be especially noted that the principles of the present invention are equally applicable and adaptable to other versions of the UNIX system, as well as to any other computer operating system and equipment.

Opcodes for the file typing process of the present invention are given below. To assist in optimizing compilers, opcodes have been numbered sequentially so that the switch statement can be implemented as a jump table.

|   | |
|---|---|
| | Bitwise Logical Operators |
| OP_ANDi | Pops the top two vars off the stack, computes their bitwise logical AND, taken as integers. Pushes the result as an integer onto the stack. |
| OP_ORi | Pops the top two vars off the stack, computes their bitwise logical OR, taken as integers. Pushes the result as an integer onto the stack. |
| OP_XORi | Pops the top two vars off the stack, computes their bitwise logical Exclusive-or, taken as integers. Pushes the result as an integer onto the stack. |
| | Logical Operaters |
| OP_ANDANDi | Pops the top two vars off the stack. If they are both non-zero, taken as integers, then an integer 1 is pushed onto the stack. Otherwise, an integer zero is pushed onto the stack. |
| OP_ORORi | Pops the top two vars off the stack. If either of them is non-zero, taken as an integer, then an integer 1 is pushed onto the stack. Otherwise, an integer zero is pushed onto the stack. |
| OP_COMPLEMENTi | Tests whether or not the top var on the stack, taken as an integer, is zero. If it is zero, it is replaced with an integer one. Otherwise it is replaced with an integer zero. |
| | Branch Operators |
| OP_BEQi | If the top var on the stack, taken as an integer, is zero, then the program counter is incremented by the signed value of the operand. In any case, the stack remains unchanged by OP_BEQi. |
| OP_BNEi | If the top var on the stack, taken as an integer, is non-zero, then the program counter is incremented by the signed value of the operand. In any case, the stack remains unchanged by OP_BNEi. |
| OP_BR | The program counter is incremented by the signed value of the operand. |
| | Comparison Operators |
| OP_EQEQi | Pops the top two vars off the stack and compares them as integers. If they are equal, an integer 1 is pushed onto the stack. Otherwise, an integer 0 is |

|  |  |
|---|---|
| | -continued |
| | pushed onto the stack. |
| OP_GEi | Pops the top two vars off the stack and compares them as integers. If the second var popped off the stack is greater than or equal to the first var, then an integer 1 is pushed onto the stack. Otherwise, a 0 is pushed onto the stack. |
| OP_GTi | Pops the top two vars off the stack and compares them as integers. If the second var popped off the stack is greater than the first var, then an integer 1 is pushed onto the stack. Otherwise, a 0 is pushed onto the stack. |
| OP_LEi | Pops the top two vars off the stack and compares them as integers. If the second var popped off the stack is less than or equal to the first var, then an integer 1 is pushed onto the stack. Otherwise, a 0 is pushed onto the stack. |
| OP_LTi | Pops the top two vars off the stack and compares them as integers. If the second var popped off the stack is less than the first var, then an integer 1 is pushed onto the stack. Otherwise, a 0 is pushed onto the stack. |
| OP_NEi | Pops the top two vars off the stack and compares them as integers. If they are unequal, an integer 1 is pushed onto the stack. Otherwise, an integer 0 is pushed onto the stack. |
| | Arithmetic Operators |
| OP_MINUSi | Pops the top two vars off the stack and subtracts the first one popped from the second one, as integers. The result is pushed onto the stack as an integer. |
| OP_MODi | Pops the top two vars off the stack and divides the second one popped by the first one, as integers. The remainder, as defined by the C++ % function, is pushed onto the stack as an integer. |
| OP_PLUSi | Pops the top two vars off the stack and adds the first one popped to the second one, as integers. The result is pushed onto the stack as an integer. |
| OP_SLASHi | Pops the top two vars off the stack and divides the second one popped by the first one, as integers. The quotient is pushed onto the stack as an integer. |
| OP_TIMESi | Pops the top two vars off the stack and multiplies the first one popped times the second one, as integers. The result is pushed onto the stack as an integer. |
| | Stack Manipulation |
| OP_LOADCi | The operand is pushed onto the stack as an integer. |
| OP_LOADi | The integer at the location dspace + the operand is pushed as an integer onto the stack. |
| OP_POPi | The top var is popped from the stack and discarded. |
| OP_PUSHSTRING | The address of the string which begins at an offset from sspace given by the operand is pushed onto the stack. The operand is the offset from sspace (inbytes) of a character string. The character string is copied into malloc'ed memory and the address of this malloc'ed memory is pushed onto the stack. |
| OP_STOREi | The top var is stored as an integer into the location whos address is dspace + the operand. |
| | File Type Tests |
| OP_ASCII | If the file is a plain file and if the first 512 bytes of the file are all printable ascii charaters, then a 1 is pushed onto the stack as an integer. Otherwise a 0 is pushed onto the stack as an integer. |
| OP_DIRCONTAINS | The top var is popped from the stack and, treated as an integer, it is cast into a char *. The null terminated string which it points to is first prefixed with the character '/' and then it ('/' and all) are appended to the CurrentFileName. If this name is 255 or more characters long, then a zero is pushed onto the stack as an integer. Otherwise, a stat call is performed on this name and if successful, a one is pushed on the stack as an integer. If unsuccessful, a zero is pushed on the stack as an integer. |
| OP_LINKCOUNT | Pushed the file's link count onto the stack as an integer. The link count is determined from the file's st_nlink field in its stat structure. If the file can not be statted, then −1 is pushed onto the stack. |
| OP_MODE | Pushed the file's mode word onto the stack as an integer. The mode word is determined from the file's st_mode field in its stat structure. If the file can not be statted, then −1 is pushed onto the stack. |

| | |
|---|---|
| OP_SIZE | Pushes the file's size in bytes onto the stack as an integer. The size is determined from the file's st_size field in its stat structure. If the file can not be statted, then −1 is pushed onto the stack. |
| OP_TAG | If the file is tagged, its tag value is pushed onto the stack as an integer. Otherwise, −1 is pushed onto the stack as an integer.<br>MIPS executables and shell scripts may be tagged. The tag value is stored in a normally unused field in the header of the MIPS executable at an offset of 68 bytes from the beginning of the file. If the file has been tagged, the most significant byte at offset 18 from the start of the file is set, otherwise it is cleared.<br>Shell scripts are tagged if they conform to these rules. They must have the character '#!' in their first two positions. Their second line must begin with the characters '#Tab' followed by a space followed by the tag value as an ascii integer, followed by a newline.<br>File Reading Opcodes |
| OP_CHAR | The top var is popped from the stack and interpreted as an integer indicating a byte offset into the file. The byte in the file at this offset is converted from a signed char to an int and pushed onto the stack. If the file does not contain a byte at the offset or if the offset is negative or if the file is not a plain file, then −1 is pushed on the stack as an integer. |
| OP_UCHAR | The top var is popped from the stack and interpreted as an integer indicating a byte offset into the file. The byte in the file at this offset is converted from an unsigned char to an int and pushed onto the stack. If the file does not contain a byte at the offset or if the offset is negative or if the file is not a plain file, then −1 is pushed on the stack as an integer. |
| OP_SHORT | The top var is popped from the stack and interpreted as an integer indicating a byte offset into the file. The two bytes beginning at this offset in the file are treated as a signed short and are converted to an int and pushed onto the stack. If the file does not contain two bytes at the offset or if the offset is negative or if the file is not a plain file, then −1 is pushed on the stack as an integer. |
| OP_USHORT | The top var is popped from the stack and interpreted as an integer indicating a byte offset into the file. The two bytes beginning at this offset in the file are treated as a signed short and are converted to an int and pushed onto the stack. If the file does not contain two bytes at the offset or if the offset is negative or if the file is not a plain file, then −1 is pushed on the stack as an integer. |
| OP_LONG | The top var is popped from the stack and interpreted as an integer indicating a byte offset into the file. The four bytes beginning at this offset in the file are treated as a signed long and are converted to an int and pushed onto the stack. If the file does not contain four bytes at the offset or if the offset is negative or if the file is not a plain file, then −1 is pushed on the stack as an integer. |
| OP_ULONG | The top var is popped from the stack and interpreted as an integer indicating a byte offset into the file. The four bytes beginning at this offset in the file are treated as an unsigned long and are converted to an int and pushed onto the stack. If the file does not contain four bytes at the offset or if the offset is negative or if the file is not a plain file, then −1 is pushed on the stack as an integer.<br>Miscellaneous Opcodes |
| OP_ENDNAME | The top var is popped from the stack and interpreted as an integer. If it is non-zero, Executive:run returns a one to its calling procedure. Otherwise it returns a zero. |
| OP_GLOB | The top var is popped from the stack and interpreted as an integer. It is cast into a char pointer. The char string it points to is matched against the base name of the file whos type is to be determined. The matching is done according to the UNIX C shell glob match rules. If the match is successful, a one is pushed onto the stack as an integer. Otherwise a |

| | -continued |
|---|---|
| | zero is pushed onto the stack as an integer. |
| OP_LABEL | No operation is performed by OP_LABEL. |
| OP_PRINTi | The top var is popped from the stack and printed as an integer to standard out. |
| OP_PRINTs | The top var is popped from the stack, interpreted as an integer and cast into a char *. The string that is pointed to is printed on standard out and its memory is free'd. |
| OP_STRCMP | The top two vars are popped from the stack, interpreted as integers and cast into char *. The strings that they point to are compared. If the string pointed to by the second argument is less than the string pointed to by the first argument, then −1 is pushed onto the stack as an integer. If both strings are equal, then 0 is pushed onto the stack as an integer. Otherwise 1 is pushed onto the stack as an integer. |
| OP_STRING | The top two variables are popped from the stack and interpreted as integers. The first one popped is treated as the the length of a charater string. The second is treated as the byte offset into the file of a character string. Space for this character string is malloc'ed and the chars are copied into this space. A pointer to this space is cast into an integer and pushed onto the stack. If the string begins or ends before the start of the file or after the end of the file then a null string is malloced and a pointer to it is cast into an integer and pushed onto the stack. |

Executive Match Rule class definition

```
#define CACHESIZE 512
class Executive {
        char Cache[CACHESIZE];      // cache of first few bytes in file.
        int AlreadyAsciiTested;     // 1 if this file has been ASCII tested.
        int AsciiTestResult;        // The result of the ASCII test.
public:
        Executive( );
        ~Executive( );
        void SetFile(char *filename);
        void UnSetFile( );
        int run(char *inst, void *dspace, char *sspace);
        char *CurrentFileName;
        char *CurrentBaseName;      // Base name for CurrentFileName.
        int Stattable;              // 1 if the stat worked, else 0
        int Cacheable;              // 1 if it can be, and therefore is, cached.
        int fd;                     // File descriptor for CurrentFileName
        int Openable;               // 1 if the open worked, else 0
        int Specialfile;            // 1 if it's not a plain file.
        struct stat statbuf;
        int CacheSize;              // No. of bytes really in the cache
};
```

Executive Match Rule var structure

The var structure is a typedef for a struct which can hold ints floats or up to 4 characters.

```
        typedef union {
                char c[4]
                int integer;
                float flt;
        }var;
```

Executive Match Rule Class Variables

| Name | Type | Purpose |
|---|---|---|
| CurrentFileName | char * | Holds the full path name of the file whos type is to be determined. |
| CurrentBaseName | char * | Holds the last level of the full path name of the file whos type is to be determined. |
| Specialfile | int | Set to 1 if a file is not a plain unix file. (E.g., a device node, a fifo, . . . etc). Set to 0 otherwise. |
| Openable | int | Set to 1 if the file has been opened. Set to zero if the file has not been opened. Special files are never opened. If a file does not have read permission set, then it can not be opened. |
| fd | int | The file descriptor of the file to whos type is to be determined. If Openable == 0, then fd is unused. |
| Stattable | int | Set to 1 if a Unix stat procedure call on the file was successful. Set to 0 otherwise. If successful, the result of the stat call is stored in the structure statbuf, below. |
| statbuf | struct stat | If the stat call on the file was successful, the result is stored in statbuf, a UNIX stat |

-continued

| | | |
|---|---|---|
| | | structure. Subsequently, if any of the cases in Executive:run need to make decisions based on stat information, they can get the information from statbuf and avoid the cost of calling stat. |
| Cacheable | int | Set to 1 if some of the contents of the file are stored in a cache in order to reduce the number of references to the file. |
| Cache | char[ ] | If Cacheable = = 1 then Cache contains the contents of the cache. Otherwise Cache is unused. |
| CACHESIZE | #define | The size, in bytes, of the cache. 512 bytes works well. |
| CacheSize | int | The number of bytes actually held in the cache. CacheSize may be less than CACHESIZE because the file contains less than CACHESIZE bytes. When Cacheable = = 0, CacheSize is unused. |
| AlreadyAsciiTested | int | Set to 1 if the OP_ASCII case is performed in Executive:run. Set to 0 otherwise. |
| AsciiTestResult | int | Set to the result of the OP_ASCII case in Executive:run. If AlreadyAsciiTested = = 0, then AsciiTest Result is unused. AsciiTestResult is used to eliminate the cost of repeatedly performing the Op_ASCII case because if it is repeated, the result can be fetched here, instead of being fully recomputed. |

Executive:run Match Rule Variables

This table lists the variables in Executive:run which are used for processing match rule programs.

| Name | Type | Purpose |
|---|---|---|
| pc0 | parameter, char* | Points to the first stack machine instruction of the match rule program. |
| dspace | parameter, void* | Points to the numeric constants of the match rule program. |
| sspace | parameter, char* | Points to the string constants of the match rule program. |
| pc | char* | The program counter for the stack machine. |
| stackp | var* | The stack pointer for the stack machine. |
| stack | var[1000] | The stack for the stack machine. 1000 elements seems to be plenty. |
| af,bf,cf,df,ef | float | These are temporary variables used throughout Executive:run to hold intermediate results within a case. To make Executive:run simples to analyze, The values they hold are never re-used after the case that they are used in has been exited. |
| ai,bi,i | int | These are temporary variables used throughout Executive:run to hold intermediate results within a case. To make Executive:run simples to analyze, The values they hold are never re-used after the case that they are used in has been exited. |
| operand | var | The operand of the current intruction. It is set up by the GETOPERAND procedre in the cases for opcodes which have operands. |
| chartmp | char | Temporary variable used for conversions into type char. |
| shorttmp | short | Temporary variable used for conversions into type short. |
| longtmp | long | Temporary variable used for conversions into type long. |
| uchartmp | unsigned char | Temporary variable used for conversions into type unsigned char. |
| ushorttmp | unsigned short | Temporary variable used for conversions into type unsigned short. |
| ulongtmp | unsigned long | Temporary variable used for conversions into type unsigned short. |
| p,p2 | char * | These are temporary variables used throughout Executive:run to hold intermediate results within a case. To make Executive:run simples to analyze, The values they hold are never re-used after the case that they are used in has been exited. |
| status | int | Temporary variable used throughout Executive:run to hold the return codes from procedure calls. |
| Searchfilename | char[257] | A place to assemble the full path name of the file to search for in the OP_DIRCONTAINS case. |
| dircontainsbuf | struct stat | The UNIX stat structure returned from the stat |

| | -continued |
|---|---|
| | system call in the OP_DIRCONTAINS case. |

Opcodes for rendering icons are given below:

Bitwise Logical Operators

| | |
|---|---|
| OP_ANDf | Pops the top two vars off the stack. They are both treated as floats and converted to integers and bitwise anded. The result is pushed onto the stack as a float. |
| OP_ORf | Pops the top two vars off the stack. They are both treated as floats and converted to integers and bitwise ored. The result is pushed onto the stack as a float. |
| OP_XORf | Pops the top two vars off the stack. They are both treated as floats and converted to integers and bitwise exclusive ored. The result is pushed onto the stack as a float. |

Logical Operators

| | |
|---|---|
| OP_ANDANDf | Pops the top two vars off the stack. If they are both non-zero, taken as floats, then a float one is pushed onto the stack. Otherwise, a float zero is pushed onto the stack. |
| OP_ORORf | Pops the top two vars off the stack. If either of them is non-zero, taken as a float, then a float one is pushed onto the stack. Otherwise, a float zero is pushed onto the stack. |
| OP_COMPLEMENTf | Tests whether or not the top var on the stack, taken as a float, is zero. If it is zero, it is replaced with a float one. Otherwise it is replaced with a float zero. |

Branch Operators

| | |
|---|---|
| OP_BEQf | If the top var on the stack, taken as a float is zero, then the program counter is incremented by the signed value of the operand. In any case, the stack remains unchanged by OP_BEQi. |
| OP_BNEf | If the top var on the stack, taken as a float, is non-zero, then the program counter is incremented by the signed value of the operand. In any case, the stack remains unchanged by OP_BNEi. |
| OP_BR | The program counter is incremented by the signed value of the operand. |

Comparison Operators

| | |
|---|---|
| OP_EQEQf | Pops the top two vars off the stack and compares them as floats. If they are equal, a float 1 is pushed onto the stack. Otherwise, a float 0 is pushed onto the stack. |
| OP_GEf | Pops the top two vars off the stack and compares them as floats. If the second var popped off the stack is greater than or equal to the first var, then an floats 1 is pushed onto the stack. Otherwise, a float 0 is pushed onto the stack. |
| OP_GTf | Pops the top two vars off the stack and compares them as floats. If the second var popped off the stack is greater than the first var, then an float 1 is pushed onto the stack. Otherwise, float 0 is pushed onto the stack. |
| OP_LEf | Pops the top two vars off the stack and compares them as floats. If the second var popped off the stack is less than or equal to the first var, then a float 1 is pushed onto the stack. Otherwise, a float 0 is pushed onto the stack. |
| OP_LTf | Pops the top two vars off the stack and compares them as floats. If the second var popped off the stack is less than the first var, then an float 1 is pushed onto the stack. Otherwise, a float 0 is pushed onto the stack. |
| OP_NEf | Pops the top two vars off the stack and compares them as floats. If they are unequal, an float 1 is pushed onto the stack. Otherwise, a float 0 is pushed onto the stack. |

Arithmetic Operators

| | |
|---|---|
| OP_MINUSf | Pops the top two vars off the stack and subtracts the first one popped from the second one, as floats. The result is pushed onto the stack as a float. |
| OP_MODf | Pops the top two vars off the stack. They are both treated as floats and converted to integers and their remainder upon division is computed according to the rules of the C++ % operator. The result is pushed onto the stack as a float. |
| OP_PLUSf | Pops the top two vars off the stack and adds the first one popped to the second one, as floats. The result is pushed onto the stack as a float. |
| OP_SLASHf | Pops the top two vars off the stack and divides the second one popped by the first one, as floats. The quotient is pushed onto the stack as a float. |

|  |  |
|---|---|
| OP_TIMESf | Pops the top two vars off the stack and multiplies the first one popped times the second one, as floats. The result is pushed onto the stack as a float. |

Stack Manipulation

|  |  |
|---|---|
| OP_LOADCf | The operand is pushed onto the stack as a float. |
| OP_LOADf | The float at the location dspace + the operand is pushed as a float onto the stack. |
| OP_POPf | The top var is popped from the stack and discarded. |
| OP_PUSHSTRING | The address of the string which begins at an offset from sspace given by the operand is pushed onto the stack.<br>The operand is the offset from sspace (in bytes) of a character string. The character string is copied into malloc'ed memory and the address of this malloc'ed memory is pushed onto the stack. |
| OP_STOREf | The top var is stored as a float into the location whos address is dspace + the operand. |

Graphics Operations

|  |  |
|---|---|
| OP_ARC | Draws an arc of a circle. Five vars are popped off the stack and interpreted as floats. They are (in order of being popped): |
| endang | the measure of the end angle of the arc. The end angle of the arc is measured from the positive x-axis. |
| startang | the measure of the start angle of the arc. The start angle of the arc is measured from the positive x-axis. |
| y | the length of the radius of the arc. The radius of the arc is the radius of the circle that would contain the arc. |
| y | the y coordinate of the center of the arc. The center of the arc is the center of the circle that would contain the arc. |
| x | the x coordinate of the center of the arc. The center of the arc is the center of the circle that would contain the arc. |
| OP_ARCF | Draws a solid filled arc of a circle. Five vars are popped off the stack and interpreted as floats. They are (in order of being popped): |
| endang | the measure of the end angle of the arc. The end angle of the arc is measured from the positive x-axis. |
| startang | the measure of the start angle of the arc. The start angle of the arc is measured from the positive x-axis. |
| radius | the length of the radius of the arc. The radius of the arc is the radius of the circle that would contain the arc. |
| y | the y coordinate of the center of the arc. The center of the arc is the center of the circle that would contain the arc. |
| x | the x coordinate of the center of the arc. The center of the arc is the center of the circle that would contain the arc. |
| OP_BCLOS | Pops one var off the stack and interprets it as a float. It is used as an border color. The polygon described by the vertice list is filled in the current color and outlined by the border color. Then the vertice list is cleared. |
| OP_BGN | Clears the vertice list. |
| OP_COLOR | Pops one var off the stack and interprets it as a float. The current drawing color is set to this value. |
| OP_DRAW | Pops two vars off the stack and interprets them as floats. The first one popped is taken as a y coordinate and the second one is taken as the x coordinate. A line is drawn from the current graphics position to (x,y). |
| OP_ENDCLOSEDLINE | The border of the polygon described by the vertice list is drawn in the current color. The vertice list is cleared. |
| OP_ENDLINE | A series of lines are drawn, in order, in the current color which connect the vertices of the polygon described by the vertice list. No line is drawn which connects the last vertice with the first. The vertice list is cleared. |
| OP_ENDOUTLINEPOLYGON | Pops one var off the stack and interprets it as a float. It is used as an border color. The polygon described by the vertice list is filled in the current color and outlined by the border color. Then the vertice list is cleared. |
| OP_ENDPOINT | The vertices in the vertice lists are drawn as single pixel points in the current color. The vertice list is cleared. |
| OP_ENDPOLYGON | The the polygon described by the vertice list is filled in the current color. The vertice list is cleared. |
| OP_ICONCOLOR | The recommended icon color is pushed onto the stack as a float.<br>(The recommended icon color is defined by calline the procedure Executive:setcolors). |
| OP_MOVE | Pops two vars off the stack and interprets them as floats. The first one popped is taken as a y coordinate and the second one is taken as the x coordinate. The current graphics position is |

| | |
|---|---|
| | set to (x,y) and the vertice list is cleared. |
| OP_OUTLINECOLOR | The recommended outline color is pushed onto the stack as a float. (The recommended icon color is defined by calline the procedure Executive:setcolors). |
| OP_PCLOS | The the polygon described by the vertice list is filled in the current color. The vertice list is cleared. |
| OP_PDR | Pops two vars off the stack and interprets them as floats. The first one popped is taken as a y coordinate and the second one is taken as the x coordinate. If the vertice list contains less than 255 vertices then (x,y) is then added to it as the last vertice. |
| OP_PMV | Pops two vars off the stack and interprets them as floats. The first one popped is taken as a y coordinate and the second one is taken as the x coordinate. The vertice list is cleared and (x,y) is then added to it as the first vertice. |
| OP_SHADOWCOLOR | The recommended shadow color is pushed onto the stack as a float. (The recommended icon color is defined by calline the procedure Executive:setcolors). |
| OP_STATECURRENT | The current state is pushed onto the stack as a float. (The current state is defined by calline the procedure Executive:setstate). |
| OP_STATEDISABLED | The disabled state is pushed onto the stack as a float. (The disabled state is defined by calline the procedure Executive:setstate). |
| OP_STATELOCATED | The located state is pushed onto the stack as a float. (The located state is defined by calline the procedure Executive:setstate). |
| OP_STATEOPENED | The opened state is pushed onto the stack as a float. (The opened state is defined by calline the procedure Executive:setstate). |
| OP_STATESELECTED | The selected state is pushed onto the stack as a float. (The selected state is defined by calline the procedure Executive:setstate). |
| OP_VERTEX | Pops two vars off the stack and interprets them as floats. The first one popped is taken as a y coordinate and the second one is taken as the x coordinate. If the vertice list contains less than 255 vertices then (x,y) is then added to it as the last vertice. |
| | Miscellaneous Opcodes |
| OP_ENDPROG | |
| OP_LABEL | No operation is performed by OP_LABEL. |
| OP_PRINTf | The top var is popped from the stack, interpreted as a float printed to standard output. |
| OP_PRINTs | The top var is popped from the stack, interpreted as an integer and cast into a char *. The string that is pointed to is printed on standart out and its memory is free'd. |

Executive Icon Rule class definition

```
class Executive {
        float IconOpenedState;          // Icon state variables.
        float IconDisabledState;
        float IconLocatedState;
        float IconSelectedState;
        float IconCurrentState;
        float IconShadowcolor;          // Icon color variables.
        float IconIconcolor;
        float IconOutlinecolor;
public:
        Executive( );
        ~Executive( );
        void setstate(int,int,int,int,int);
        void setcolors(int,int,int);
        int run(char *inst, void *dspace, char *sspace);
};
```

Executive Icon Rule var structure

The var structure is a typedef for a struct which can hold ints floats or up to 4 characters.

```
        typedef union {
                char c[4];
                int integer;
                float flt;
        }var;
```

Executive Icon Rule Class Variables

| Name | Type | Purpose |
|---|---|---|
| IconOpenedState | float | Pushed onto the stack by the OP_STATEOPENED case. Set by the Executive:setcolors procedure call. |
| IconDisabledState | float | Pushed onto the stack by the OP_STATEDISABLED case. Set by the Executive:setcolors procedure call. |

-continued

| | | |
|---|---|---|
| IconLocatedState | float | Pushed onto the stack by the OP_STATELOCATED case. Set by the Executive:setcolors procedure call. |
| IconSelectedState | float | Pushed onto the stack by the OP_STATESELECTED case. Set by the Executive:setcolors procedure call. |
| IconCurrentState | float | Pushed onto the stack by the OP_STATECURRENT case. Set by the Executive:setcolors procedure call. |
| IconShadowcolor | float | Pushed onto the stack by the OP_SHADOWCOLOR case. Set by the Executive:setcolors procedure call. |
| IconIconcolor | float | Pushed onto the stack by the OP_ICONCOLOR case. Set by the Executive:setcolors procedure call. |
| IconOutlinecolor | float | Pushed onto the stack by the OP_OUTLINECOLOR case. Set by the Executive:setcolors procedure call. |

Executive:run Match Rule Variables

This table lists the variables in Executive:run which are used for processing icon rule programs.

| Name | Type | Purpose |
|---|---|---|
| pc0 | parameter,char* | Points to the first stack machine instruction of the match rule program. |
| dspace | parameter,void* | Points to the numeric constants of the match rule program. |
| sspace | parameter,char* | Points to the string constants of the match rule program. |
| pc | char* | The program counter for the stack machine. |
| stackp | var* | The stack pointer for the stack machine. |
| stack | var[1000] | The stack for the stack machine. 1000 elements seems to be plenty. |
| af,bf,cf,df,ef | float | These are temporary variables used throughout Executive:run to hold intermediate results within a case. To make Executive:run simples to analyze, The values they hold are never re-used after the case that they are used in has been exited. |
| ai,bi,i | int | These are temporary variables used throughout Executive:run to hold intermediate results within a case. To make Executive:run simples to analyze, The values they hold are never re-used after the case that they are used in has been exited. |
| operand | var | The operand of the current instruction. It is set up by the GETOPERAND procedre in the cases for opcodes which have operands. |
| pos | struct { float x,y; } [256]; | Pos is the vertice list. It is used for assembling together vertices as supplied by OP_PMV, OP_PDR and OP_VERTEX. |
| nverts | int | The number of vertices in the vertice list. |
| cx,cy | float | The x and y coordinates of the current graphics position. |
| curcolor | int | The current graphics color. |

We claim:

1. The method of characterizing files in a computer system having an operating and file management system, said method comprising the following steps:

deriving the file typing rules according to a preselected command structure, each of said file typing rules including a rule key; and an expression following said rule key defining said file typing rule;

defining a plurality of file types to produce defined file types, said defined file types stored in a file type file;

defining a plurality of type declarations in a file type file, each of said plurality of type declarations associated with and identifying a unique file type;

defining a plurality of file typing rule sets, each of said file typing rule sets associated with at least one of said defined file types, each of said plurality of file typing rule sets further including one of said plurality of type declarations identifying said associated file type, at least one file typing rule defining file functions executable by a user;

compiling said file typing rules to produce compiled file typing rules;

storing said compiled file typing rules; and characterizing files according to said file typing rules in response to commands received from said operating and file management system.

2. The method as in claim 1 further comprising the step of defining each of said plurality of file typing rule sets to include at least one file typing rule defining the format of said unique file type associated therewith.

3. The method as in claim 1 further comprising the step of defining each of said plurality of file typing rule sets to include at least one match rule, executing said match rule in response to a user input, said match rule assigning a defined file type to a file.

4. The method as in claim 3 further comprising the step of testing a file for a single distinguishing characteristic of the associated file type for said match rule, said match rule evaluates to true if each of said match functions is true when compared to the corresponding distinguishing characteristics of a file under test, a file type being assigned to a file under test if said associated match rule evaluates to true.

5. The method of claim 4 further comprising the step of arranging said match functions in a predetermined sequence from the left, such that the more likely a match function is to be false, when compared to the corresponding distinguishing characteristic of a file under test, the further to the left the match function will be in said predetermined sequence.

6. The method of claim 5 further comprising the step of arranging said plurality of file typing rule sets in a predetermined sequence such that a file under test is compared with the match rule of each of said file typing rule sets in the order of said predetermined sequence, the testing of said file under test terminating as soon as a match rule encountered in said sequence evaluates as true.

7. Apparatus for characterizing files in a computer system having an operating and file management system, said apparatus comprising:
file typing means for deriving file typing rules according to the preselected command structure, each of said file typing rules including a rule key; and an expression following said rule key defining said file typing rule;
said file typing means including a file type file, means for defining a plurality of file types to produce defined file types, said defined file types stored in said file type file, means for defining a plurality of type declarations in a file type file, each of said plurality of type declarations associated with and identifying a unique file type;
said file typing means further including means for defining a plurality of file typing rule sets, each of said file typing rule sets associated with at least one of said defined file types, each of said plurality of file typing rule sets further including one of said plurality of type declarations identifying said associated file type, at least one file typing rule defining file functions executable by a user;
compiling means coupled to said file typing means for compiling said file typing rules to produce compiled file typing rules;
storage means coupled to said compiling means for storing said compiled file typing rules; and
processing means coupled to said storage means for characterizing files according to said file typing rules in response to commands received from said operating and file management system.

8. Apparatus as in claim 7 wherein each of said plurality of file typing rule sets further comprises at least one file typing rule defining the format of said unique file type associated therewith.

9. Apparatus as in claim 7 wherein each of said plurality of file typing rule sets further comprises at least one match rule, said means for determining the file type of a file responsive to a user input for executing said match rule, said match rule assigning a defined file type to a file.

10. Apparatus as in claim 9 wherein said plurality of file typing rule sets are arranged in a predetermined sequence such that a file under test is compared with the match rule of each of said file typing rule sets in the order of said predetermined sequence, the testing of said file under test terminating as soon as a match rule encountered in said sequence evaluates as true.

11. Apparatus as in claim 9 wherein said match rule forms a logical expression comprising a set of match functions conjoined by logical operators, each of said match functions testing a file for a single distinguishing characteristic of the associated file type for said match rule, said match rule evaluates to true if each of said match functions is true when compared to the corresponding distinguishing characteristics of a file under test, a file type being assigned to a file under test if said associated match rule evaluates to true.

12. Apparatus as in claim 11 wherein said match functions forming said logical expression are arranged in a predetermined sequence from the left, the more likely a match function is to be false, when compared to the corresponding distinguishing characteristic of a file under test, the further to the left the match function will be in said predetermined sequence.

13. Apparatus as in claim 7 wherein said computer system further includes:
a graphical description language for generating a plurality of icons providing a graphical user interface representing operations and functions of said computer system; and
said file typing means includes control means for controlling the appearance and functionality of said icons.

14. Apparatus as in claim 13 wherein said graphical user interface provides a visual overview of the file management system utilized by said computer system.

15. Apparatus as in claim 13 wherein said graphical user interface provides a visual overview of file management functions accessible by a user via an input means.

16. Apparatus as in claim 13 wherein said file typing rules include a plurality of icon bounds rules, each of said icon bounds rules associated with a different icon, each of said icon bounds rules defining a selectable coordinate space in which said associated icon is displayed and scales said associated icon consistent with said defined coordinate space.

17. Apparatus as in claim 13 wherein said graphical description language includes selectable instruction sets for defining and generating said icons having selectable size, shape and color.

18. Apparatus as in claim 17 wherein said selectable instruction sets include routines defining icon foreground coloring, icon outlining color and shadow contrast.

19. Apparatus as in claim 13 wherein said plurality of icons are organized in a tree structure representing a hierarchy of said file system.

20. Apparatus as in claim 19 wherein the shape of the visual image representing an icon is representative of said unique file type associated therewith.

21. Apparatus as in claim 19 wherein a number of file operations are defined, each of said file operations associated with at least one of said icons.

22. Apparatus as in claim 21 where the shape of the visual image representing an icon is representative of said defined file operation associated therewith.

* * * * *